(12) United States Patent
Jo et al.

(10) Patent No.: US 12,532,596 B2
(45) Date of Patent: Jan. 20, 2026

(54) DISPLAY DEVICE PROVIDING SPACE FOR FINGERPRINT DRIVER WITHOUT REDUCING SPACE FOR DISPLAY PIXELS

(71) Applicant: SAMSUNG DISPLAY CO., LTD., Yongin-si (KR)

(72) Inventors: Kang Bin Jo, Suwon-si (KR); Dong Wook Yang, Suwon-si (KR); Jong Hyun Lee, Suwon-si (KR); Il Nam Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/814,151

(22) Filed: Jul. 21, 2022

(65) Prior Publication Data

US 2023/0108746 A1 Apr. 6, 2023

(30) Foreign Application Priority Data

Sep. 30, 2021 (KR) .................. 10-2021-0130074

(51) Int. Cl.
*G06V 40/13* (2022.01)
*G09G 3/3233* (2016.01)
(Continued)

(52) U.S. Cl.
CPC ......... *H10K 39/32* (2023.02); *G06V 40/1318* (2022.01); *G09G 3/3233* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS 11,158,258 B2 10/2021 Cha et al.
11,830,293 B2 * 11/2023 Lee .................. G06F 21/45
(Continued)

FOREIGN PATENT DOCUMENTS

CN 109842491 6/2019
CN 109858398 6/2019
(Continued)

OTHER PUBLICATIONS

Seol, et al., "An AMOLED Panel Test System Using Universal Data Driver ICs for Various Pixel Structures", in IEEE Transactions on Electron Devices, vol. 64, No. 1, Jan. 2017, pp. 189-194.
(Continued)

*Primary Examiner* — Ke Xiao
*Assistant Examiner* — Nelson Lam
(74) *Attorney, Agent, or Firm* — F. CHAU & ASSOCIATES, LLC

(57) ABSTRACT

A display device includes a substrate that includes a display area that displays an image and a non-display area disposed around the display area, display pixels that each include a light emitting element disposed in the display area and a pixel driver connected to the light emitting element, and light sensing pixels that each include a light receiving element and a fingerprint driver connected to the light receiving element. The fingerprint driver includes at least one transistor, the light receiving element is disposed in the display area, and the at least one transistor of the fingerprint driver is disposed in the non-display area.

14 Claims, 28 Drawing Sheets

(51) Int. Cl.
| | |
|---|---|
| *G09G 3/3266* | (2016.01) |
| *H10F 39/00* | (2025.01) |
| *H10K 39/32* | (2023.01) |
| *H10K 59/121* | (2023.01) |
| H10D 86/40 | (2025.01) |
| H10D 86/60 | (2025.01) |
| H10K 59/38 | (2023.01) |
| H10K 59/65 | (2023.01) |
| H10K 65/00 | (2023.01) |

(52) U.S. Cl.
CPC ......... *G09G 3/3266* (2013.01); *H10F 39/802* (2025.01); *H10K 59/1213* (2023.02); *G09G 2300/0426* (2013.01); *G09G 2300/0465* (2013.01); *G09G 2300/0819* (2013.01); *G09G 2300/0842* (2013.01); *G09G 2310/08* (2013.01); *G09G 2360/14* (2013.01); *H10D 86/441* (2025.01); *H10D 86/60* (2025.01); *H10K 59/38* (2023.02); *H10K 59/65* (2023.02); *H10K 65/00* (2023.02)

(58) Field of Classification Search
CPC .. G09G 3/3233; G09G 3/3241; G09G 3/3266; G09G 3/3275; G09G 3/3283; G09G 3/3291; G09G 2360/14; G09G 2360/141; G09G 2360/142; G09G 2360/145; G09G 2360/147; G09G 2360/148; G06V 40/12; G06V 40/13; G06V 40/1312; G06V 40/1318; G06V 40/1335; G06V 40/1341; G06V 40/1347; G06V 40/1353; G06V 40/1359; G06V 40/1371; G06V 40/1376; G06V 40/1382; G06V 40/1388; G06V 40/1394
USPC ...................................... 345/76–83, 173–179
See application file for complete search history.

(56) References Cited

U.S. PATENT DOCUMENTS

| | | | | |
|---|---|---|---|---|
| 12,317,701 | B2* | 5/2025 | Jo ..................... | H10K 59/1213 |
| 12,354,400 | B2* | 7/2025 | Lee .................... | G06V 40/1318 |
| 2002/0180585 | A1* | 12/2002 | Kim .................... | G06V 40/1318 |
| | | | | 340/5.74 |
| 2008/0007507 | A1* | 1/2008 | Kim ..................... | G09G 3/3648 |
| | | | | 345/92 |
| 2008/0231564 | A1* | 9/2008 | Harada ................. | G06F 1/3203 |
| | | | | 345/81 |
| 2010/0020040 | A1* | 1/2010 | Han ................... | H03K 17/9631 |
| | | | | 345/82 |
| 2010/0164906 | A1* | 7/2010 | Fukunaga ............. | G06F 3/0412 |
| | | | | 345/175 |
| 2011/0007047 | A1* | 1/2011 | Fujioka ............. | G02F 1/133509 |
| | | | | 345/207 |
| 2012/0092302 | A1* | 4/2012 | Imai .................... | G02F 1/13318 |
| | | | | 345/175 |
| 2017/0220838 | A1* | 8/2017 | He .......................... | G06F 3/042 |
| 2018/0151656 | A1* | 5/2018 | Choo ................... | G09G 3/3258 |
| 2019/0018540 | A1 | 1/2019 | Ko et al. | |
| 2019/0213373 | A1* | 7/2019 | Kim ................... | G06V 40/1306 |
| 2020/0042759 | A1* | 2/2020 | Kim ................... | G06F 3/0446 |
| 2020/0144334 | A1* | 5/2020 | Jang ................... | G06V 40/1318 |
| 2020/0192522 | A1* | 6/2020 | Reynolds ............. | H03K 17/941 |
| 2020/0311373 | A1 | 10/2020 | Lee et al. | |
| 2021/0020716 | A1 | 1/2021 | Kim et al. | |
| 2021/0158751 | A1* | 5/2021 | Cha ..................... | G09G 3/3233 |
| 2021/0200366 | A1 | 7/2021 | Bok et al. | |
| 2022/0165834 | A1 | 5/2022 | Jo et al. | |
| 2022/0254844 | A1* | 8/2022 | Ryu ..................... | H01L 27/3234 |
| 2022/0336661 | A1 | 10/2022 | Cha et al. | |
| 2023/0075463 | A1 | 3/2023 | Lee et al. | |

FOREIGN PATENT DOCUMENTS

| | | |
|---|---|---|
| KR | 20170030735 | 3/2017 |
| KR | 20170123678 | 11/2017 |
| KR | 20200115832 | 10/2020 |
| KR | 20210086907 | 7/2021 |
| KR | 10-2023-0035167 | 3/2023 |

OTHER PUBLICATIONS

Kim, et al., "A Low Noise Read-Out IC Gate Driver for Full Front Display Area Optical Fingerprint Sensors", IEEE 2020, 2 pages.
Extended European Search Report dated Jul. 8, 2025 in corresponding European Patent Application EP 22876646.5, 7 pages.

* cited by examiner

DISPLAY DEVICE PROVIDING SPACE FOR FINGERPRINT DRIVER WITHOUT REDUCING SPACE FOR DISPLAY PIXELS

CROSS-REFERENCE TO RELATED APPLICATION

This application claims priority under 35 U.S.C. § 119 from Korean Patent Application No. 10-2021-0130074, filed on Sep. 30, 2021 in the Korean Intellectual Property Office, the contents of which are herein incorporated by reference in their entirety.

BACKGROUND

1. Technical Field

Embodiments of the present disclosure are directed to a display device.

2. Discussion of the Related Art

Display devices are used by various electronic devices such as smartphones, tablets, notebook computers, monitors, and/or televisions (TVs). The use of portable electronic devices such as smartphones, tablets, and/or notebook computers has increased enormously in recent years. Privacy information can be stored in portable electronic devices. Accordingly, to protect privacy information in portable electronic devices, fingerprint authentication has been used, in which biometric information, such as a user's fingerprint, is used for authentication.

For example, a display device can authenticate a user's fingerprint by using an optical method, an ultrasonic method, a capacitive method, etc. An optical method can authenticate a user's fingerprint by detecting light reflected from the user's fingerprint.

A display device typically includes a display panel that includes display pixels that display an image and light sensing pixels that sense light, to optically authenticate the user's fingerprint. In this case, not only the display pixels but also the light sensing pixels should be arranged in the display panel, in which case a space for arranging the light sensing pixels may be insufficient.

SUMMARY

Embodiments of the present disclosure provide a display device that provides a display panel in which a space for display pixels need not be reduced to provide a space for the light sensing pixels.

According to an embodiment of the present disclosure, a display device includes a substrate that includes a display area that displays an image and a non-display area disposed around the display area, display pixels that each include a light emitting element disposed in the display area and a pixel driver connected to the light emitting element, and light sensing pixels that each include a light receiving element and a fingerprint driver connected to the light receiving element. The fingerprint driver includes at least one transistor, the light receiving element is disposed in the display area, and the at least one transistor of the fingerprint driver is disposed in the non-display area.

In an embodiment, the fingerprint driver is disposed on a first side of the display area.

In an embodiment, the display device further includes a display scan driver disposed in the non-display area and that outputs scan signals to the pixel driver; and a fingerprint scan driver disposed in the non-display area and that outputs fingerprint scan signals to the fingerprint driver.

In an embodiment, the display scan driver is disposed on a second side of the display area.

In an embodiment, the fingerprint scan driver is disposed at a corner where the first side and the second side of the display area meet.

In an embodiment, the fingerprint scan driver is disposed on the first side of the display area.

In an embodiment, the fingerprint scan driver is disposed at a corner where the first side and the second side of the display area meet and on the first side of the display area.

In an embodiment, the pixel driver includes a driving transistor that controls a driving current that flows through the light emitting element according to a data voltage transmitted to a gate electrode, a first transistor that connects the gate electrode of the driving transistor to a driving voltage line through which a driving voltage is transmitted according to a display initialization signal, a second transistor that connects a source electrode of the driving transistor to a data line according to a display write signal, and a third transistor that connects an anode electrode of the light emitting element to the driving voltage line according to a display control signal.

In an embodiment, the fingerprint driver includes a first sensing transistor that connects a fingerprint connection line connected to a light receiving anode electrode of the light receiving element to a sensing line according to a fingerprint scan signal of a fingerprint scan line.

In an embodiment, the fingerprint scan signal is a same as the display initialization signal.

In an embodiment, the fingerprint scan signal is a same as the display control signal.

In an embodiment, the first sensing transistor is disposed in the non-display area.

In an embodiment, the fingerprint driver further includes a second sensing transistor that connects the fingerprint connection line to the driving voltage line through which the driving voltage is transmitted according to a fingerprint initialization signal of a fingerprint initialization line.

In an embodiment, the second sensing transistor is disposed in the non-display area.

In an embodiment, the fingerprint initialization signal is a same as the display write signal.

In an embodiment, the fingerprint driver includes a first sensing transistor that controls a sensing current that flows through a sensing line according to a voltage of a light receiving anode electrode of the light receiving element, a second sensing transistor that initializes the light receiving anode electrode according to a fingerprint initialization signal of a fingerprint initialization line, and a third sensing transistor that connects a drain electrode of the first sensing transistor to the sensing line according to a fingerprint scan signal of the fingerprint scan line.

In an embodiment, the first sensing transistor, the second sensing transistor, and the third sensing transistor are disposed in the non-display area.

In an embodiment, the first sensing transistor and the third sensing transistor are disposed in the non-display area, and the second sensing transistor is disposed in the display area.

In an embodiment, the fingerprint scan signal is a same as the display initialization signal, and the fingerprint initialization signal is a same as the display write signal.

According to an embodiment of the present disclosure, a display device includes a substrate that includes a display area that displays an image and a non-display area disposed around the display area, and light sensing pixels that each include a light receiving element and a fingerprint driver connected to the light receiving element. The fingerprint driver includes a plurality of transistors. The light receiving element is disposed in the display area, at least one of the plurality of transistors of the fingerprint driver is disposed in the non-display area, and another one of the plurality of transistors is disposed in the display area.

According to an embodiment of the present disclosure, a display device includes a substrate that includes a display area that displays an image and a non-display area disposed around the display area, display pixels that each include a light emitting element disposed in the display area and a pixel driver connected to the light emitting element, light sensing pixels that each include a light receiving element and a fingerprint driver connected to the light receiving element, and a scan driver disposed in the non-display area and that transmits scan signals to the pixel driver and transmits fingerprint scan signals to the fingerprint driver.

The fingerprint driver includes at least one transistor. The light receiving element is disposed in the display area, and the at least one transistor of the fingerprint driver is disposed in the non-display area.

In a display device according to embodiments of the present disclosure, light receiving elements of a light sensing portion are formed in a display area together with the light emitting elements of light emitting portions, and are connected in one-to-one correspondence to fingerprint drivers disposed in a non-display area using sensing connection lines. Accordingly, there is no need to reduce the space in which the first to fourth pixel drivers are disposed to provide a space for the fingerprint drivers.

DETAILED DESCRIPTION

Figure 1:
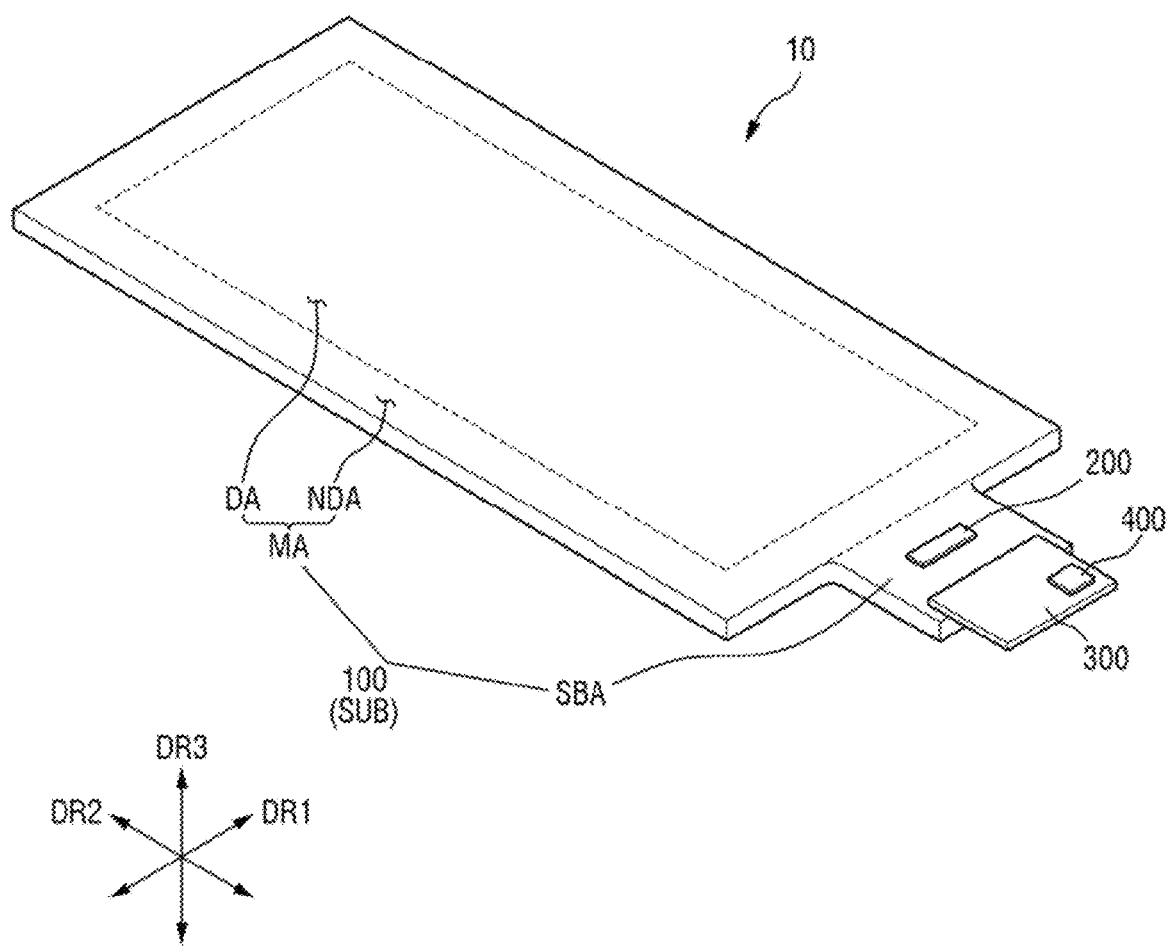
FIG. 1 is a perspective view of a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

Figure 2:
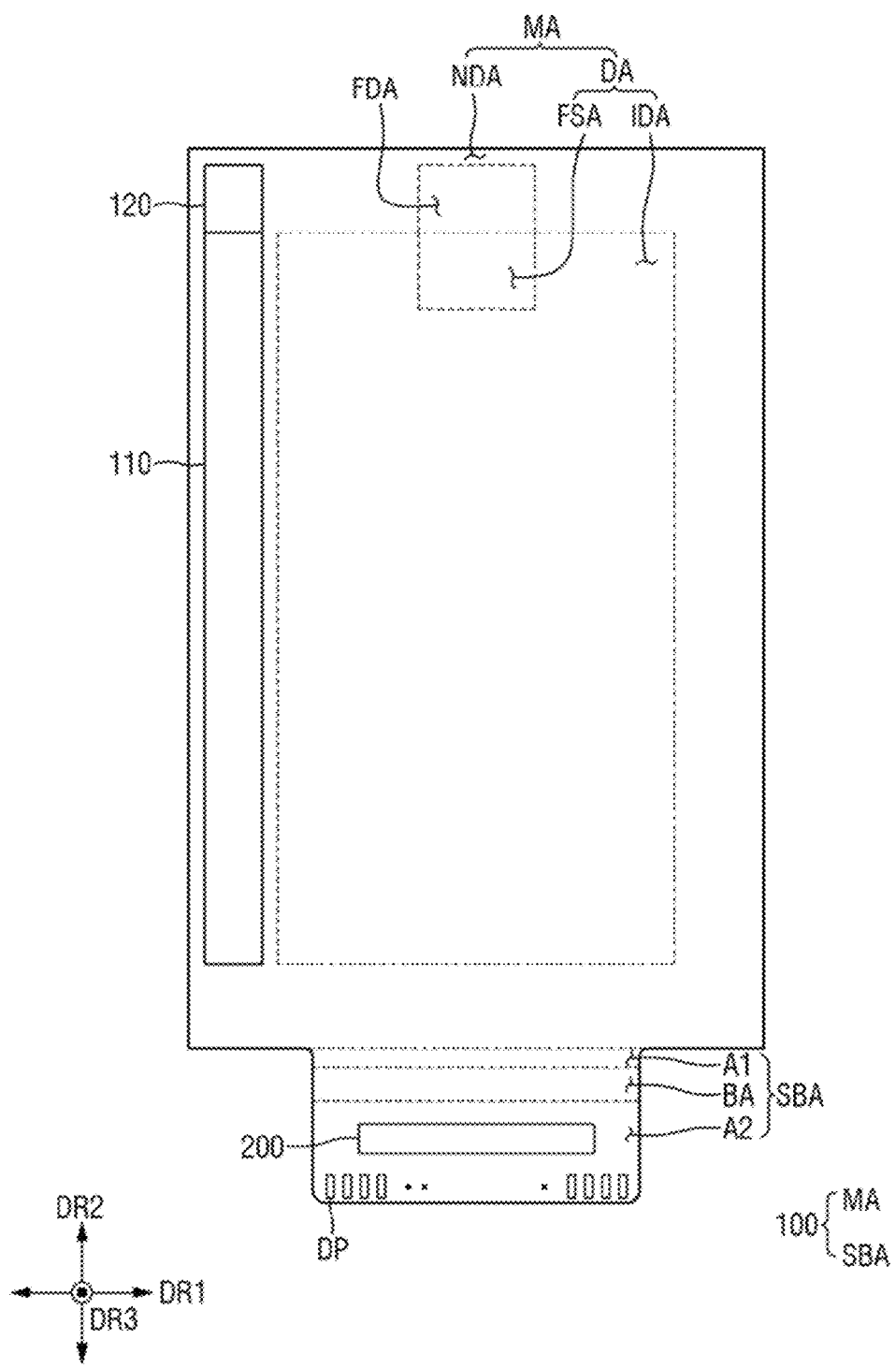
FIG. 2 is a plan view of a display panel and a display driving circuit according to an embodiment.

FIG. 1 is a perspective view of a display device according to an embodiment. FIG. 2 is a plan view of a display panel and a display driving circuit according to an embodiment.

Referring to FIGS. 1 and 2, in some embodiments, a display device 10 can display a moving image or a still image. The display device 10 may be used as a display screen for various devices, such as a television, a laptop computer, a monitor, a billboard or an Internet-of-Things (IOT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device or an ultra-mobile PC (UMPC).

The display device 10 may be a light emitting display device such as an organic light emitting display that uses an organic light emitting diode, a quantum dot light emitting display that includes a quantum dot light emitting layer, an inorganic light emitting display that includes an inorganic semiconductor, or a micro light emitting display that uses a micro or nano light emitting diode (LED). In the following description, it is assumed that the display device 10 is an organic light emitting display device, but embodiments of the present disclosure are not necessarily limited thereto.

The display device 10 includes a display panel 100, a display driving circuit 200, and a circuit board 300.

The display panel 100 has, in a plan view, a rectangular shape having short sides in a first direction DR1 and long sides in a second direction DR2 that crosses the first direction DR1. A corner where the short side and the long side meet may be right-angled or rounded with a predetermined curvature. The planar shape of the display panel 100 is not limited to a rectangular shape, and have another polygonal shape, a circular shape or an elliptical shape. The display panel 100 may be flat, but embodiments are not necessarily limited thereto. For example, the display panel 100 may include curved portions formed at left and right ends and that have a constant curvature or a varying curvature. In addition, the display panel 100 may be flexible so that it can be curved, bent, folded, or rolled.

A substrate SUB of the display panel 100 includes a main region MA and a sub-region SBA.

The main region MA includes a display area DA that displays an image and a non-display area NDA that is a peripheral area that surrounds the display area DA.

The display area DA includes display pixels ('SPX' in FIG. 4) that display an image. The display area DA occupies most of the main region MA. The display area DA is disposed at the center of the main region MA.

The display area DA includes an image display area IDA and a fingerprint sensing area FSA. The fingerprint sensing area FSA includes a light sensing portion PDU (see FIG. 5) for each of a plurality of light sensing pixels LSP (see FIG. 5) that not only displays an image but also senses light to detect a user's fingerprint. The image display area IDA is an area of the display area DA that excludes the fingerprint sensing area FSA, and displays an image without detecting a user's fingerprint.

The fingerprint sensing area FSA is a part of the display area DA, but embodiments of the present disclosure are not necessarily limited thereto. In an embodiment, the display area DA includes only the fingerprint sensing area FSA without including the image display area IDA. In this case, the fingerprint sensing area FSA is substantially the same as the display area DA. That is, the entire display area DA is the fingerprint sensing area FSA.

Although the fingerprint sensing area FSA is illustrated in FIG. 2 as being disposed at the center of one edge, e.g., the upper edge of the display area DA, embodiments of the present disclosure are not necessarily limited thereto. In an embodiment, the fingerprint sensing area FSA is spaced apart from one edge of the display area DA. Alternatively, in an embodiment, the fingerprint sensing area FSA is located at a side one of an edge of the display area DA. For example, the fingerprint sensing area FSA is disposed at the left or right side of the upper edge of the display area DA.

The non-display area NDA is adjacent to the display area DA. The non-display area NDA is outside the display area DA. The non-display area NDA surrounds the display area DA. The non-display area NDA borders an edge area of the display area DA.

As shown in FIG. 2, a fingerprint driving area FDA is provided in the non-display area NDA. The fingerprint driving area FDA includes a fingerprint driver FDU (see FIG. 5) for each of the light sensing pixels LSP (see FIG. 5). The fingerprint driving area FDA is a part of the non-display area NDA.

The fingerprint driving area FDA is located adjacent to the fingerprint sensing area FSA. For example, as shown in FIG. 2, the fingerprint driving area FDA is above the fingerprint sensing area FSA of the display area DA. In the fingerprint driving area FDA, the light sensing portion PDU of each of the light sensing pixels LSP (see FIG. 5) is connected to a sensing line that transmits a fingerprint scan signal from a fingerprint scan driver 120.

The sensing line is connected to a fingerprint driving circuit 400. The fingerprint driving circuit 400 is an integrated circuit (IC) that is attached to the circuit board 300.

The sub-region SBA protrudes from one side of the main region MA in the second direction DR2. The length of the sub-region SBA in the second direction DR2 is less than the length of the main region MA in the second direction DR2. The length of the sub-region SBA in the first direction DR1 is substantially equal to or less than the length of the main region MA in the first direction DR1. Although the sub-region SBA is illustrated as protruding from one side of the main region MA in the second direction DR2, embodiments are not necessarily limited thereto, and in an embodiment, sub-region SBA protrudes from one side of the main region MA in the first direction DR1.

Although the sub-region SBA is illustrated in an unfolded condition in FIGS. 1 and 2, the sub-region SBA may be bent, and in this case, the sub-region SBA is disposed below the main region MA. The sub-region SBA overlaps the main region MA in a third direction DR3 that is normal to a plane defined by the first direction DR1 and the second direction DR2.

The sub-region SBA includes a first area A1, a second area A2, and a bendable area BA.

The first area A1 protrudes from one side of the main region MA in the second direction DR2. One side of the first area A1 is in contact with the non-display area NDA of the main region MA, and the other side of the first region A1 is in contact with the bendable area BA.

The second area A2 is where pads DP and the display driving circuit 200 are disposed. The display driving circuit 200 is attached to driving pads of the second area A2 using a conductive adhesive member such as an anisotropic conductive film. The circuit board 300 is attached to the pads DP of the second area A2 using a conductive adhesive member. One side of the second area A2 is in contact with the bendable area BA.

The bendable area BA can be bent. When the bendable area BA is bent, the second area A2 is disposed under the first area A1 and under the main region MA. The bendable area BA is disposed between the first area A1 and the second area A2. One side of the bendable area BA is in contact with the first area A1, and the other side of the bendable area BA is in contact with the second area A2.

The display driving circuit 200 generates signals and voltages that drive the display panel 100. The display driving circuit 200 is an integrated circuit (IC) that is attached onto the display panel 100 by one of a chip on glass (COG) method, a chip on plastic (COP) method, or an ultrasonic bonding method, but embodiments of the present disclosure are not necessarily limited thereto. In an embodiment, the display driving circuit 200 is attached onto the circuit board 300 by a chip on film (COF) method.

The circuit board 300 is attached to one end of the sub-region SBA of the display panel 100. The circuit board 300 is electrically connected to the display panel 100 and the display driving circuit 200. The display panel 100 and the display driving circuit 200 receive digital image data, timing signals, and driving voltages from the circuit board 300. The circuit board 300 may be a flexible printed circuit board, a printed circuit board, or a flexible film such as a chip on film.

A display scan driver 110 is disposed in the non-display area NDA. Although the display scan driver 110 is illustrated as being disposed on one side (e.g., left side) of the display panel 100, embodiments of the present disclosure are not necessarily limited thereto. In embodiments, the display scan driver 110 may be disposed on both sides (e.g., left and right sides) of the display panel 100, or on the right side of the display panel 100. The display scan driver 110 is electrically connected to the display driving circuit 200 through scan fan-out lines. The display scan driver 110 receives a scan control signal from the display driving circuit 200, generates scan signals according to the scan control signal, and outputs the scan signals to scan lines.

The fingerprint scan driver 120 is disposed in the non-display area NDA. The fingerprint scan driver 120 is electrically connected to the display driving circuit 200 through fingerprint fan-out lines. The fingerprint scan driver 120 receives a fingerprint scan control signal from the display driving circuit 200, generates fingerprint scan signals according to the fingerprint scan control signal, and outputs the fingerprint scan signals to fingerprint scan lines.

Figure 3:
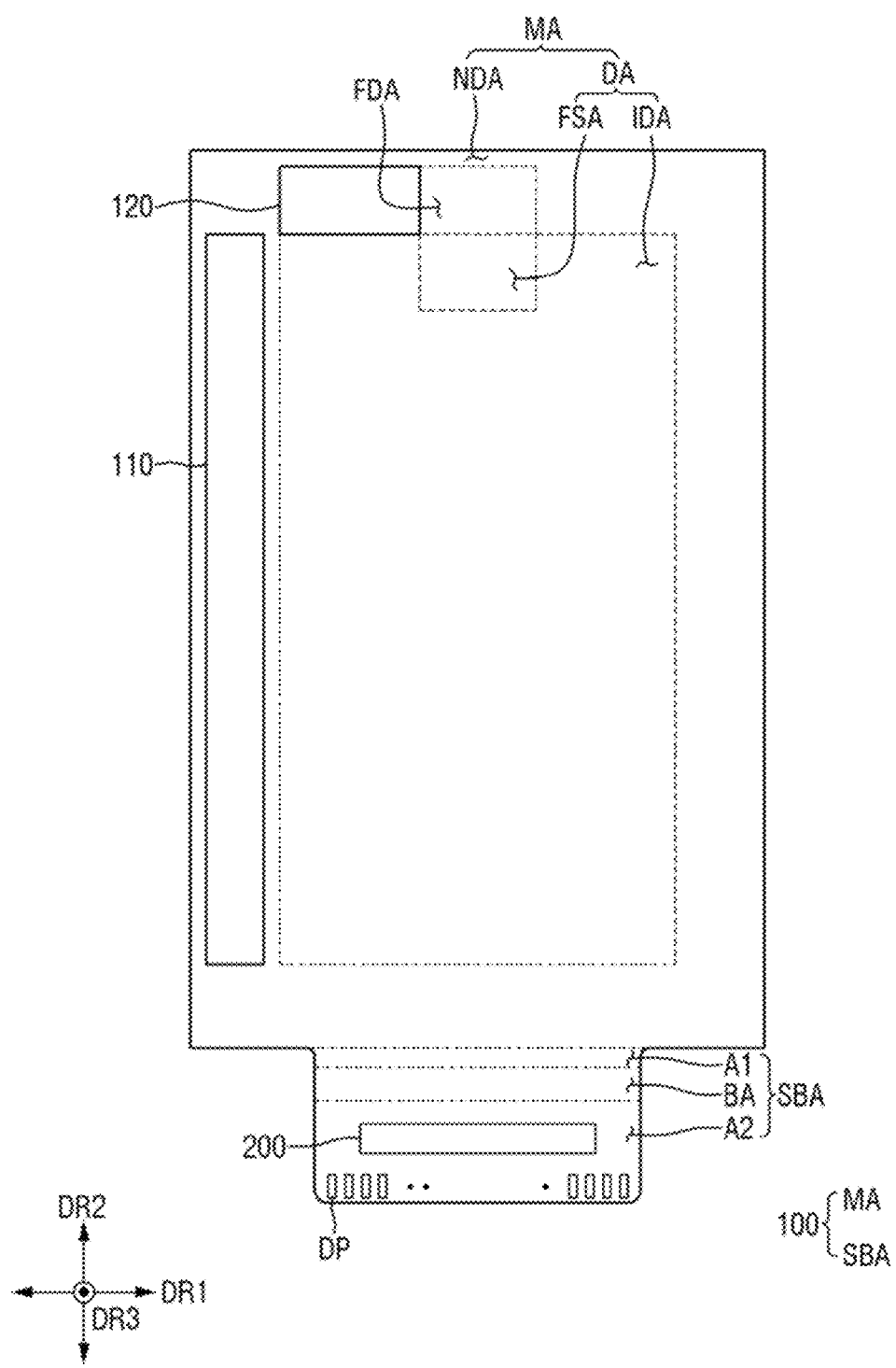
FIG. 3 is a plan view of a display panel and a display driving circuit according to an embodiment.
Figure 4:
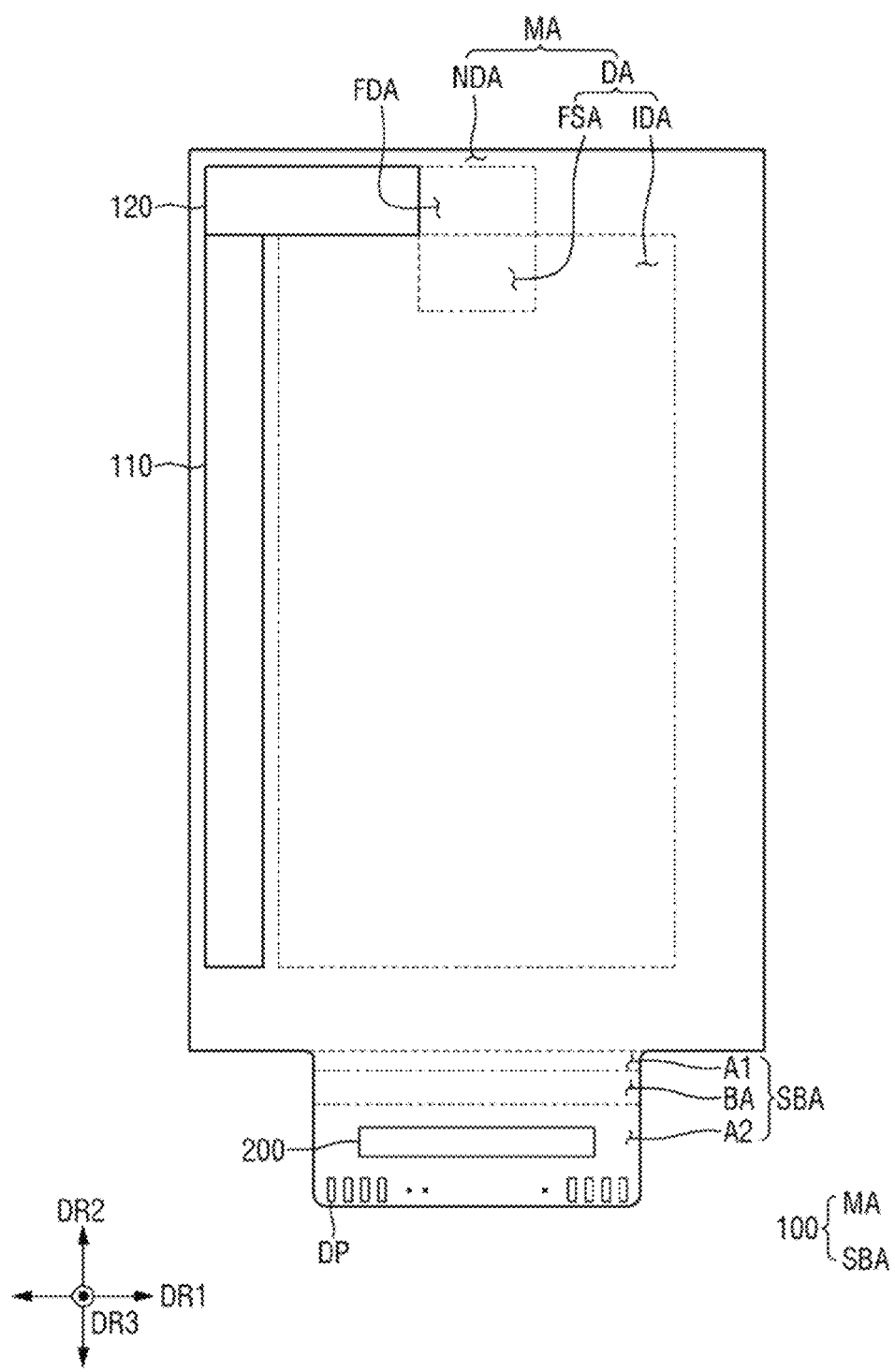
FIG. 4 is a plan view of a display panel and a display driving circuit according to an embodiment.

As shown in FIG. 2, in an embodiment, the fingerprint scan driver 120 is disposed at a corner where the left and upper sides of the display area DA meet, and is disposed above the display scan driver 110. Alternatively, in an embodiment, as shown in FIG. 3, the fingerprint scan driver 120 is disposed on the upper side of the display area DA and to the left of the fingerprint driving area FDA. Alternatively, in an embodiment, as shown in FIG. 4, the fingerprint scan driver 120 is disposed above the display scan driver 110 and on the upper side of the display panel 100 and to the left of the fingerprint driving area FDA.

Figure 5:
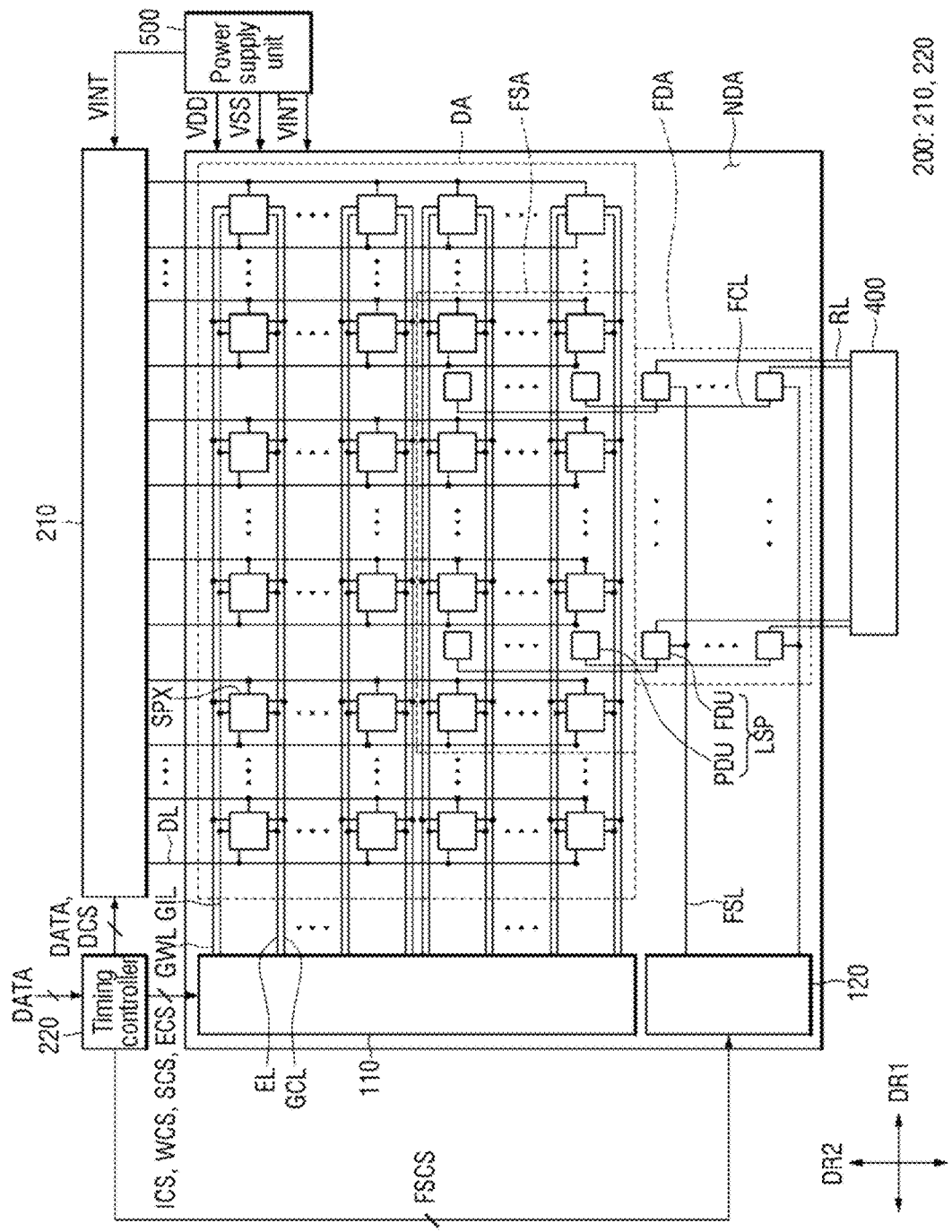
FIG. 5 is a block diagram of a display device according to an embodiment.

FIG. 5 is a block diagram of a display device according to one embodiment.

Referring to FIG. 5, in some embodiments, a display device according to an embodiment includes the display panel 100, the display scan driver 110, the fingerprint scan driver 120, the display driving circuit 200, and a power supply unit 500. The display driving circuit 200 includes a data driver 210 and a timing controller 220.

The display panel 100 includes the display pixels SPX disposed in the display area DA, the light sensing pixels LSP, display write lines GWL, display initialization lines GIL, display control lines GCL, emission lines EL, data lines DL, fingerprint scan lines FSL, sensing connection lines FCL, and sensing lines RL. The display panel 100 further includes the display scan driver 110, the fingerprint driver FDU, and the fingerprint scan driver 120 disposed in the non-display area NDA.

The display write lines GWL, the display initialization lines GIL, the display control lines GCL, the emission lines EL, and the fingerprint scan lines FSL extend in the first direction DR1. The data lines DL, the sensing connection lines FCL, and the sensing lines RL extend in the second direction DR2.

The display pixels SPX are arranged in the first direction DR1 and the second direction DR2 in a matrix form in the display area DA. Each of the display pixels SPX is connected to one of the display write lines GWL, one of the display initialization lines GIL, one of the display control lines GCL, and one of the emission lines EL. Each of the display pixels SPX receives a data voltage from the data line DL according to a display write signal received from the display write line GWL, a display initialization signal from the display initialization line GIL, a display control signal from the display control line GCL, and an emission signal from the emission line EL, and supplies a driving current to a light emitting element according to the data voltage to emit light.

Each of the light sensing pixels LSP includes the light sensing portion PDU and the fingerprint driver FDU. The light sensing portion PDU of each of the light sensing pixels LSP is disposed in the fingerprint sensing area FSA, and the fingerprint driver FDU thereof is disposed in the fingerprint driving area FDA.

The light sensing portions PDU are arranged in the first direction DR1 and the second direction DR2 in a matrix form in the fingerprint sensing area FSA. The light sensing portions PDU are connected to the fingerprint drivers FDU in one-to-one correspondence through the sensing connection lines FCL. That is, each light sensing portion PDU is connected to a corresponding fingerprint driver FDU through a sensing connection line FCL.

The fingerprint drivers FDU are arranged in the first direction DR1 and the second direction DR2 in a matrix form. Each of the fingerprint drivers FDU is connected to one of the fingerprint scan lines FSL, one of the sensing connection lines FCL, and one of the sensing lines RL. Each fingerprint driver FDU connects a sensing connection line FCL connected to a corresponding light sensing portion PDU to a corresponding sensing line RL according to a fingerprint scan signal received from the fingerprint scan line FSL.

The fingerprint driving circuit 400 is connected to the sensing lines RL. The fingerprint driving circuit 400 detects a fingerprint according to the sensing voltages of the sensing lines RL. For example, light output from the display panel 100 can be reflected from a ridge and a valley of a user's fingerprint disposed in the fingerprint sensing area FSA. In this case, the amount of light reflected from the ridge of the fingerprint and the amount of light reflected from the valley of the fingerprint may differ. Therefore, a sensing voltage of the anode electrode of a light receiving element of the light sensing portion PDU varies depending on whether it receives light reflected from the ridge of the fingerprint or light reflected from the valley of the fingerprint. Therefore, the sensing voltage detected by the light sensing portion PDU varies depending on whether it receives light reflected from the ridge of the fingerprint of a finger F or light reflected from the valley of the fingerprint of the finger F. The fingerprint driving circuit 400 recognizes the fingerprint according to the sensing voltages of the sensing lines RL.

The display scan driver 110 is connected to the display write lines GWL, the display initialization lines GIL, the display control lines GCL, and the emission lines EL. The display scan driver 110 includes a display signal output unit that outputs display write signals to the display write lines GWL, display initialization signals to the display initialization lines GIL, and display control signals to the display control lines GCL, and an emission signal output unit that outputs emission signals to the emission lines EL.

The display scan driver 110 receives a write control signal WCS, an initialization control signal ICS, a scan control signal SCS, and an emission control signal ECS from the timing controller 220. The display signal output unit of the display scan driver 110 generates the display write signals according to the write control signal WCS and outputs them to the display write lines GWL. In addition, the display signal output unit of the display scan driver 110 generates the display initialization signals according to the initialization control signal ICS and outputs them to the display initialization lines GIL. In addition, the display signal output unit of the display scan driver 110 generates the display control signals according to the scan control signal SCS and outputs them to the display control lines GCL. Further, the emission signal output unit of the display scan driver 110 generates the emission signals according to the emission control signal ECS and outputs them to the emission lines EL.

The fingerprint scan driver 120 is connected to the fingerprint scan lines FSL. The fingerprint scan driver 120 receives a fingerprint scan control signal FSCS from the timing controller 220. The fingerprint scan driver 120 generates the fingerprint scan signals according to the fingerprint scan control signal FSCS and outputs them to the fingerprint scan lines FSL.

The data driver 210 converts digital image data DATA into data voltages and outputs them to the data lines DL. The data driver 210 outputs data voltages in synchronization with the display write signals. Therefore, the display pixels SPX are selected by the display write signals of the display scan driver 110, and a data voltage is supplied to each of the selected display pixels SPX.

The timing controller 220 receives the timing signals and the digital image data DATA from an external device. For example, the external device may be a graphic card of a computer, a set-top box, a digital camera, etc., but embodiments of the present disclosure are not necessarily limited thereto.

The timing controller 220 generates the write control signal WCS, the initialization control signal ICS, the scan control signal SCS, and the emission control signal ECS that control the operation timing of the display scan driver 110 according to the timing signals. In addition, the timing controller 220 generates the fingerprint scan control signal FSCS that control the operation timing of the fingerprint scan driver 120 according to the timing signals. In addition, the timing controller 220 generates a data control signal DCS that controls the operation timing of the data driver 210 according to the timing signals.

The timing controller 220 outputs the write control signal WCS, the initialization control signal ICS, the scan control signal SCS, and the emission control signal ECS to the display scan driver 110. The timing controller 220 outputs the fingerprint scan control signal FSCS to the fingerprint scan driver 120. The timing controller 220 outputs the digital video data DATA and the data control signal DCS to the data driver 210.

The power supply unit 500 generates a plurality of driving voltages and outputs them to the display panel 100. The power supply unit 500 outputs a first driving voltage VDD, a second driving voltage VSS, and a third driving voltage VINT to the display panel 100. The first driving voltage VDD is a high potential driving voltage, the second driving voltage VSS is a low potential driving voltage, and the third driving voltage VINT is a voltage that initializes the gate electrode of a driving transistor of each of the display pixels.

As shown in FIG. 5, the light sensing portion PDU of each of the light sensing pixels LSP that detect a fingerprint are disposed in the fingerprint sensing area FSA, which is a part of the display area DA, and the fingerprint driver FDU is disposed in the fingerprint driving area FDA, which is a part of the non-display area NDA. Therefore, the space of the display pixels SPX in the display area DA need not be reduced to provide a space to dispose the light sensing pixels LSP.

Figure 6:
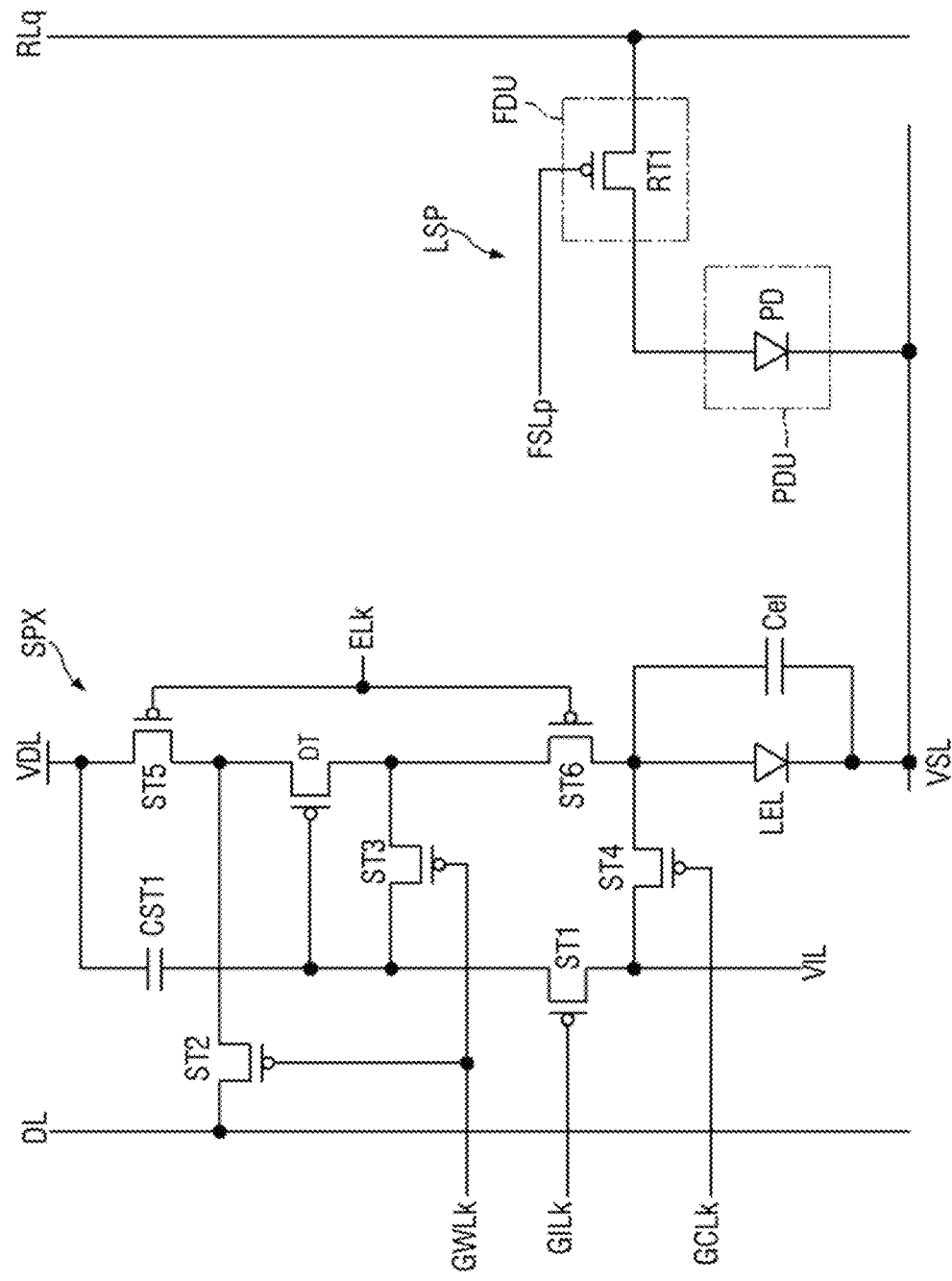
FIG. 6 is a circuit diagram of a display pixel and a light sensing pixel according to an embodiment.

FIG. 6 is a circuit diagram of a display pixel and a light sensing pixel according to an embodiment.

Referring to FIG. 6, in an embodiment, the display pixel SPX according to an embodiment is connected to a $k^{th}$, where k is a positive integer, display initialization line GILk, a $k^{th}$ display write line GWLk, and a $k^{th}$ display control line GCLk. In addition, the display pixel SPX is connected to a first driving voltage line VDL through which the first driving voltage is received, a second driving voltage line VSL through which the second driving voltage is received, and a third driving voltage line VIL through which the third driving voltage is received.

The display pixel SPX includes a light emitting portion ELU and a pixel driver DDU. The light emitting portion ELU includes a light emitting element LEL. The pixel driver DDU includes a driving transistor DT, switching elements, and a capacitor CST1. The switching elements include first to sixth transistors ST1, ST2, ST3, ST4, ST5, and ST6.

The driving transistor DT includes a gate electrode, a first electrode, and a second electrode. The driving transistor DT controls a drain-source current Ids, hereinafter referred to as a "driving current", that flows between the first electrode and the second electrode according to a data voltage applied to the gate electrode. The magnitude of the driving current Ids flowing through the channel of the driving transistor DT is proportional to the square of the difference between a threshold voltage and a voltage Vsg between the first electrode and the gate electrode of the driving transistor DT, as shown in Eq. (1).

$$Ids = k' \times (Vsg - Vth)^2 \qquad (1)$$

In Eq. (1), k' is a proportionality coefficient determined by the structure and physical characteristics of the driving transistor, Vsg is a voltage between the first electrode and the gate electrode of the driving transistor, and Vth is a threshold voltage of the driving transistor.

The light emitting element LEL emits light due to the driving current Ids. As the driving current Ids increases, the amount of light emitted from the light emitting element LEL increases.

The light emitting element LEL is an organic light emitting diode that includes an organic light emitting layer disposed between an anode electrode and a cathode electrode. Alternatively, in an embodiment, the light emitting element LEL is an inorganic light emitting element that includes an inorganic semiconductor disposed between an anode electrode and a cathode electrode. Alternatively, in an embodiment, the light emitting element LEL is a quantum dot light emitting element that includes a quantum dot light emitting layer disposed between an anode electrode and a cathode electrode. Alternatively, in an embodiment, the light emitting element LEL is a micro light emitting element that includes a micro light emitting diode disposed between an anode electrode and a cathode electrode.

The anode electrode of the light emitting element LEL is connected to a first electrode of the fourth transistor ST4 and a second electrode of the sixth transistor ST6, and the cathode electrode of the light emitting element LEL may be connected to the second driving voltage line VSL. A parasitic capacitance Cel forms between the anode electrode and the cathode electrode of the light emitting element LEL.

The first transistor ST1 is turned on by the display initialization signal of the $k^{th}$ display initialization line GILk and connects the gate electrode of the driving transistor DT to the third driving voltage line VIL. Accordingly, the third driving voltage VINT of the third driving voltage line VIL is transmitted to the gate electrode of the driving transistor DT. The gate electrode of the first transistor ST1 is connected to the $k^{th}$ display initialization line GILk, the first electrode thereof is connected to the gate electrode of the driving transistor DT, and the second electrode thereof is connected to the third driving voltage line VIL.

The second transistor ST2 is turned on by the display write signal of the $k^{th}$ display write line GWLk and connects the first electrode of the driving transistor DT to a $j^{th}$ data line Dj. Accordingly, the data voltage of the $j^{th}$ data line Dj is transmitted to the first electrode of the driving transistor DT. The gate electrode of the second transistor ST2 is connected to the $k^{th}$ display write line GWLk, the first electrode thereof is connected to the first electrode of the driving transistor DT, and the second electrode thereof is connected to the $j^{th}$ data line Dj.

The third transistor ST3 is turned on by the display write signal of the $k^{th}$ display write line GWLk and connects the gate electrode of the driving transistor DT to the second electrode thereof. When the gate electrode of the driving transistor DT is connected to the second electrode thereof, the driving transistor DT is driven as a diode. The gate electrode of the third transistor ST3 is connected to the $k^{th}$ display write line GWLk, the first electrode thereof is connected to the second electrode of the driving transistor DT, and the second electrode thereof is connected to the gate electrode of the driving transistor DT.

The fourth transistor ST4 is turned on by the display control signal of the $k^{th}$ display control line GCLk and connects the anode electrode of the light emitting element LEL to the third driving voltage line VIL. The third driving voltage of the third driving voltage line VIL is transmitted to the anode electrode of the light emitting element LEL. The gate electrode of the fourth transistor ST4 is connected to the $k^{th}$ display control line GCLk, the first electrode thereof is connected to the anode electrode of the light emitting element LEL, and the second electrode thereof is connected to the third driving voltage line VIL.

The fifth transistor ST5 is turned on by the emission signal of a $k^{th}$ emission line ELk and connects the first electrode of the driving transistor DT to the first driving voltage line VDL. The gate electrode of the fifth transistor ST5 is connected to the $k^{th}$ emission line ELk, the first electrode thereof is connected to the first driving voltage line VDL, and the second electrode thereof is connected to the first electrode of the driving transistor DT.

The sixth transistor ST6 is disposed between the second electrode of the driving transistor DT and the anode electrode of the light emitting element LEL. The sixth transistor ST6 is turned on by the emission control signal of the $k^{th}$ emission line ELk and connects the second electrode of the driving transistor DT to the anode electrode of the light emitting element LEL. The gate electrode of the sixth transistor ST6 is connected to the $k^{th}$ emission line ELk, the first electrode thereof is connected to the second electrode of the driving transistor DT, and the second electrode thereof is connected to the anode electrode of the light emitting element LEL.

When both the fifth transistor ST5 and the sixth transistor ST6 are turned on, the driving current Ids of the driving transistor DT flows to the light emitting element LEL.

The capacitor CST1 is formed between the gate electrode of the driving transistor DT and the first driving voltage line VDL. The first capacitor electrode of the capacitor CST1 is connected to the gate electrode of the driving transistor DT, and the second capacitor electrode thereof is connected to the first driving voltage line VDL.

When the first electrode of each of the driving transistor DT and the first to sixth transistors ST1 to ST6 is a source electrode, the second electrode thereof is a drain electrode. Alternatively, when the first electrode of each of the driving transistor DT and the first to sixth transistors ST1 to ST6 is a drain electrode, the second electrode thereof is a source electrode.

An active layer of each of the driving transistor DT and the first to sixth transistors ST1 to ST6 is formed from one of polysilicon, amorphous silicon, or an oxide semiconductor. In FIG. 6, the first to sixth transistors ST1 to ST6, and the driving transistor DT are formed of a P-type MOSFET, but embodiments of the present disclosure are not necessarily limited thereto. For example, in an embodiment, the first to sixth transistors ST1 to ST6, and the driving transistor DT are formed of an N-type MOSFET. Alternatively, in an embodiment, at least one of the first to sixth transistors ST1 to ST6 is formed of an N-type MOSFET.

The light sensing pixel LSP according to an embodiment is connected to a $p^{th}$, where p is a positive integer, fingerprint scan line FSLp and a $q^{th}$, where q is a positive integer, sensing line RLq. In addition, the light sensing pixel LSP is connected to the second driving voltage line VSL through which the second driving voltage is received.

The light sensing pixel LSP includes the light sensing portion PDU and the fingerprint driver FDU. The light sensing portion PDU includes a light receiving element PD. The fingerprint driver FDU includes a first sensing transistor RT1.

The voltage of a sensing anode electrode of the light receiving element PD varies depending on light incident on the light receiving element PD. For example, as the amount of light incident on the light receiving element PD increases, the voltage of the sensing anode electrode of the light receiving element PD increases.

The light receiving element PD is a photodiode that includes an anode electrode, a PIN semiconductor layer, and a cathode electrode. The sensing anode electrode of the light receiving element PD is connected to the first electrode of the first sensing transistor RT1, and the cathode electrode thereof is connected to the second driving voltage line VSL. The PIN semiconductor layer of the light receiving element PD includes a P-type semiconductor layer connected to the anode electrode, an N-type semiconductor layer connected to the cathode electrode, and an I-type semiconductor layer disposed between the P-type semiconductor layer and the N-type semiconductor layer. The I-type semiconductor layer is depleted by the P-type semiconductor layer and the N-type semiconductor layer and generates an electric field therein, and holes and electrons are generated by light drift by the electric field. Due to this, the holes are diffuse to the anode electrode through the P-type semiconductor layer and the electrons diffuse to the cathode electrode through the N-type semiconductor layer.

The first sensing transistor RT1 is turned on by the fingerprint scan signal of the $p^{th}$ fingerprint scan line FSLp and connects the sensing anode electrode of the light receiving element PD to the $q^{th}$ sensing line RLq. Accordingly, the voltage of the sensing anode electrode of the light receiving element PD is transmitted to the qth sensing line RLq. The gate electrode of the first sensing transistor RT1 is connected to the $p^{th}$ fingerprint scan line FSLp, the first electrode thereof is connected to the sensing anode electrode of the light receiving element PD, and the second electrode thereof is connected to the $q^{th}$ sensing line RLq.

Figure 7:
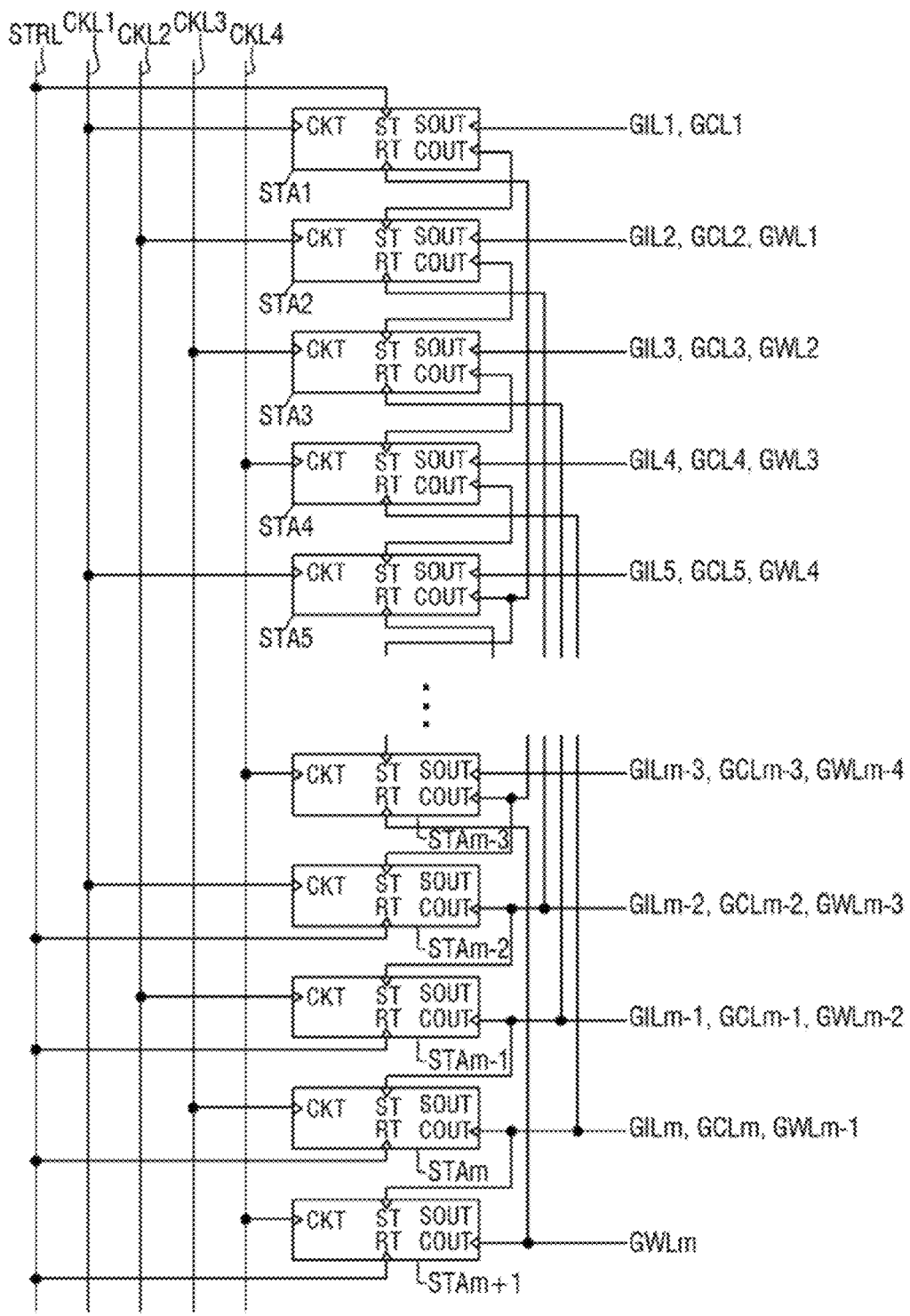
FIG. 7 illustrates a display scan driver according to an embodiment.

FIG. 7 illustrates a display signal output unit of a display scan driver according to an embodiment.

Referring to FIG. 7, in an embodiment, the display signal output unit of the display scan driver 110 includes a plurality of display stages STA1, STA2, STA3, STA4, . . . , STAm−1, STAm, and STAm+1, where m is a positive integer. Each of the plurality of display stages STA1 to STAm+1 includes a start signal input terminal ST, a reset signal input terminal RT, a clock signal input terminal CKT, a display signal output terminal SOUT, and a carry signal output terminal COUT.

The start signal input terminal ST of each of the plurality of display stages STA1 to STAm+1 is connected to a start line STRL or the carry signal output terminal COUT of a previous display stage. For example, the start signal input terminal ST of a first display stage STA1 is connected to the start line STRL through which a display start signal is received. In addition, the start signal input terminal ST of each of the plurality of display stages STA2 to STAm+1 is connected to the carry signal output terminal COUT of a previous display stage. For example, the start signal input terminal ST of a second display stage STA2 is connected to the carry signal output terminal COUT of the first display stage STA1, and the start signal input terminal ST of a third display stage STA3 is connected to the carry signal output terminal COUT of the second display stage STA2.

The reset signal input terminal RT of each of the plurality of display stages STA1 to STAm+1 is connected to the carry signal output terminal COUT of a subsequent display stage or the start line STR. For example, the reset signal input terminal RT of the first display stage STA1 is connected to the carry signal output terminal COUT of a fifth display stage STA5, and the reset signal input terminal RT of the $(m-2)^{th}$ display stage STAm−2 is connected to the start line STR.

The clock signal input terminal CKT of each of the plurality of display stages STA1 to STAm+1 is connected to one of clock lines CKL1, CKL2, CKL3, and CKL4.

The plurality of display stages STA1 to STAm+1 are alternately connected to the clock lines CKL1 to CKL4. For example, the clock signal input terminal CKT of the first display stage STA1 is connected to a first clock line CKL1, and the clock signal input terminal CKT of the second display stage STA2 is connected to a second clock line CKL2. The clock signal input terminal CKT of the third display stage STA3 is connected to a third clock line CKL3, the clock signal input terminal CKT of a fourth display stage STA4 is connected to a fourth clock line CKL4, and the clock signal input terminal CKT of the fifth display stage STA5 is connected to a first clock line CKL1.

The scan signal output terminal SOUT of each of the plurality of display stages STA1 to STAm+1 is connected to the display write line, the display initialization line, and the display control line that correspond thereto. For example, the first display stage STA1 is connected to a first display initialization line GIL1 and a first display control line GCL1. In addition, the second display stage STA2 is connected to a second display initialization line GIL2, a second display control line GCL2, and a first display write line GWL1. In addition, the third display stage STA3 is connected to a third display initialization line GIL3, a third display control line GCL3, and a second display write line GWL2. In addition, the fourth display stage STA4 is connected to a fourth display initialization line GIL4, a fourth display control line GCL4, and a third display write line GWL3. In addition, an $(m-1)^{th}$ display stage STAm−1 is connected to an $(m-1)^{th}$ display initialization line GILm−1, an $(m-1)^{th}$ display control line GCLm−1, and an $(m-2)^{th}$ display write line GWLm−2. In addition, an $m^{th}$ display stage STAm is connected to an $m^{th}$ display initialization line GILm, an $m^{th}$ display control line GCLm, and an $(m-1)^{th}$ display write line GWLm−1. Further, an $(m+1)^{th}$ display stage STAm+1 is connected to an $m^{th}$ display write line GWLm.

The carry signal output terminal COUT of each of the plurality of display stages STA1 to STAm+1 is connected to the reset signal input terminal RT of a previous display stage and the start signal input terminal ST of a subsequent display stage. However, the carry signal output terminal COUT of each of the first display stage STA1, the second display stage STA2, the third display stage STA3, and the fourth display stage STA4 is connected only to the start signal input terminal ST of a subsequent display stage.

Figure 8:
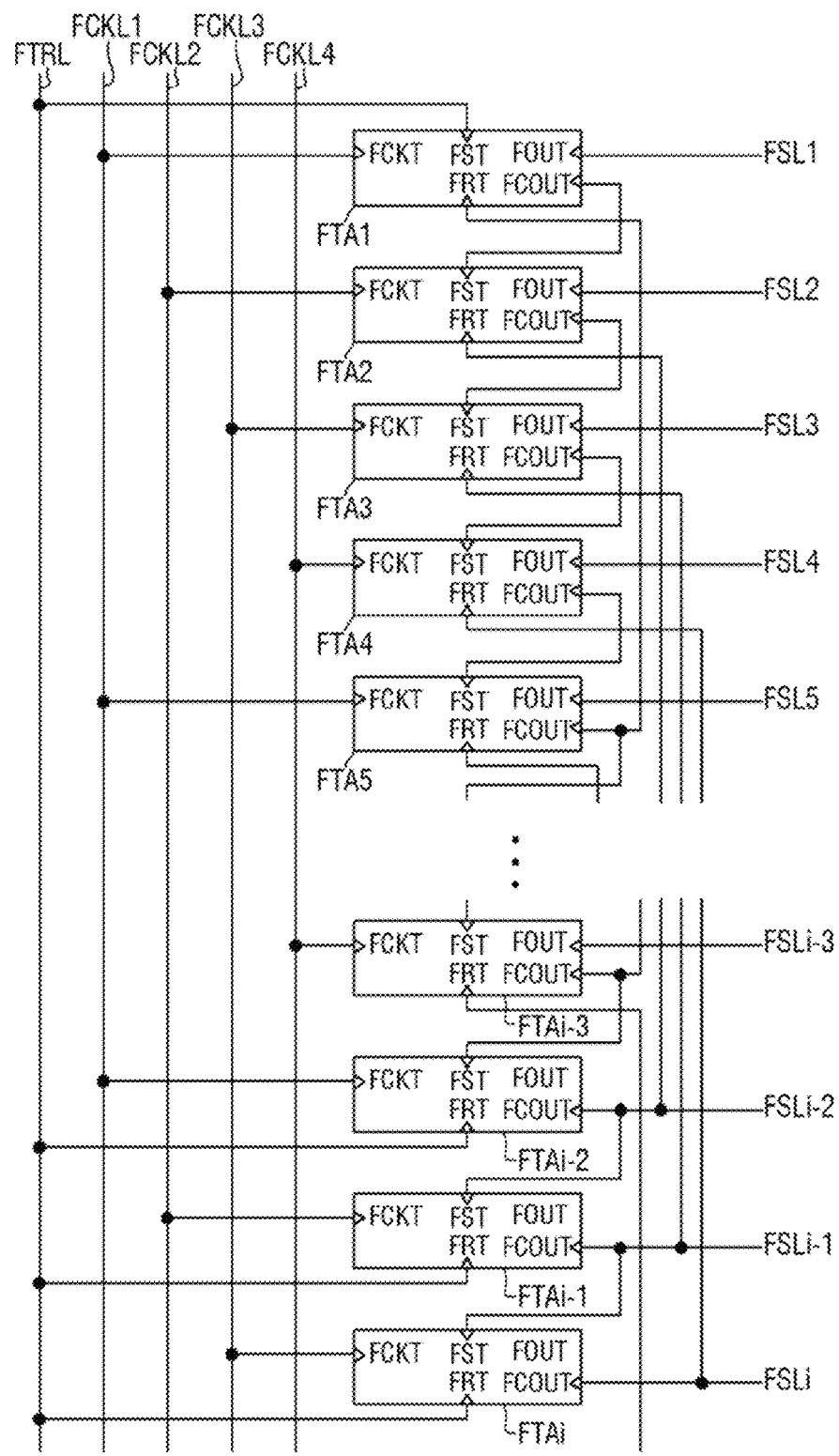
FIG. 8 illustrates a fingerprint scan driver according to an embodiment.

FIG. 8 illustrates a fingerprint scan driver according to an embodiment.

Referring to FIG. 8, in an embodiment, the fingerprint scan driver 120 includes a plurality of fingerprint stages FTA1, FTA2, FTA3, FTA4, . . . , FTAi−1, and FTAi, where i is an integer less than m. Each of the plurality of fingerprint stages FTA1 to FTAi includes a fingerprint start signal input terminal FST, a fingerprint reset signal input terminal FRT, a fingerprint clock signal input terminal FCKT, a fingerprint scan signal output terminal FOUT, and a fingerprint carry signal output terminal FCOUT.

The fingerprint start signal input terminal FST of each of the plurality of fingerprint stages FTA1 to FTAi is connected to a fingerprint start line FTRL or the fingerprint carry signal output terminal FCOUT of a previous fingerprint stage. For example, the fingerprint start signal input terminal FST of a first fingerprint stage FTA1 is connected to the fingerprint start line FTRL through which a fingerprint start signal is received. In addition, the fingerprint start signal input terminal FST of each of the plurality of fingerprint stages FTA2 to FTAi is connected to the fingerprint carry signal output terminal FCOUT of a previous fingerprint stage. For example, the fingerprint start signal input terminal FST of a second fingerprint stage FTA2 is connected to the fingerprint carry signal output terminal FCOUT of the first fingerprint stage FTA1, and the fingerprint start signal input terminal FST of a third fingerprint stage FTA3 is connected to the fingerprint carry signal output terminal FCOUT of the second fingerprint stage FTA2.

The fingerprint reset signal input terminal FRT of each of the plurality of fingerprint stages FTA1 to FTAi is connected to the fingerprint carry signal output terminal FCOUT of a subsequent fingerprint stage. For example, the fingerprint reset signal input terminal FRT of the first fingerprint stage FTA1 is connected to the fingerprint carry signal output terminal FCOUT of a fifth fingerprint stage FTA5.

The fingerprint clock signal input terminal FCKT of each of the plurality of fingerprint stages FTA1 to FTAi is connected to one of fingerprint clock lines FCKL1, FCKL2, FCKL3, and FCKL4.

The plurality of fingerprint stages FTA1 to FTAi are alternately connected to the fingerprint clock lines FCKL1 to FCKL4. For example, the fingerprint clock signal input terminal FCKT of the first fingerprint stage FTA1 is connected to a first fingerprint clock line FCKL1, and the fingerprint clock signal input terminal FCKT of the second fingerprint stage FTA2 is connected to a second fingerprint clock line FCKL2. The fingerprint clock signal input terminal FCKT of the third fingerprint stage FTA3 is connected to a third fingerprint clock line FCKL3, the fingerprint clock signal input terminal FCKT of a fourth fingerprint stage FTA4 is connected to a fourth fingerprint clock line FCKL4, and the fingerprint clock signal input terminal FCKT of a fifth fingerprint stage FTA5 is connected to a first fingerprint clock line FCKL1.

The plurality of fingerprint stages FTA1, FTA2, FTA3, FTA4, . . . , FTAi-1, and FTAi are respectively connected to fingerprint scan lines FSL1, FSL2, FSL3, FSL4, . . . , FSLi-1, and FSLi. The fingerprint scan signal output terminal FOUT of each of the plurality of fingerprint stages FTA1 to FTAi is connected to the corresponding fingerprint scan line. For example, the first fingerprint stage FTA1 is connected to a first fingerprint scan line FSL1, and the second fingerprint stage FTA2 is connected to a second fingerprint scan line FSL2. In addition, the third fingerprint stage FTA3 is connected to a third fingerprint scan line FSL3, and the fourth fingerprint stage FTA4 is connected to a fourth fingerprint scan line FSL4. In addition, an $(i-1)^{th}$ fingerprint stage FTAi-1 is connected to an $(i-1)^{th}$ fingerprint scan line FSLi-1, and an $i^{th}$ fingerprint stage FTAi is connected to an $i^{th}$ fingerprint scan line FSLi.

The fingerprint carry signal output terminal FCOUT of each of the plurality of fingerprint stages FTA1 to FTAi is connected to the fingerprint reset signal input terminal FRT of a previous fingerprint stage and the fingerprint start signal input terminal FST of a subsequent fingerprint stage. However, the fingerprint carry signal output terminal FCOUT of each of the first fingerprint stage FTA1, the second fingerprint stage FTA2, the third fingerprint stage FTA3, and the fourth fingerprint stage FTA4 is connected to the fingerprint start signal input terminal FST of a subsequent fingerprint stage, but not to the fingerprint reset signal input terminal FRT of a previous fingerprint stage.

The plurality of display stages STA1 to STAm+1 provide the display write signals, the display initialization signals, and the display control signals to the display pixels SPX of the display area DA. The plurality of fingerprint stages FTA1 to FTAi provide the fingerprint scan signals to the fingerprint drivers FDU connected to the light sensing portions PDU of the fingerprint sensing area FSA of the display area DA. Since the size of the fingerprint sensing area FSA is less than the size of the display area DA, the number of the fingerprint scan lines is less than the number of the display write signals, the number of the display initialization signals, and the number of the display control signals. Therefore, the number of the plurality of fingerprint stages FTA1 to FTAi is less than the number of the plurality of display stages STA1 to STAm+1.

Figure 9:
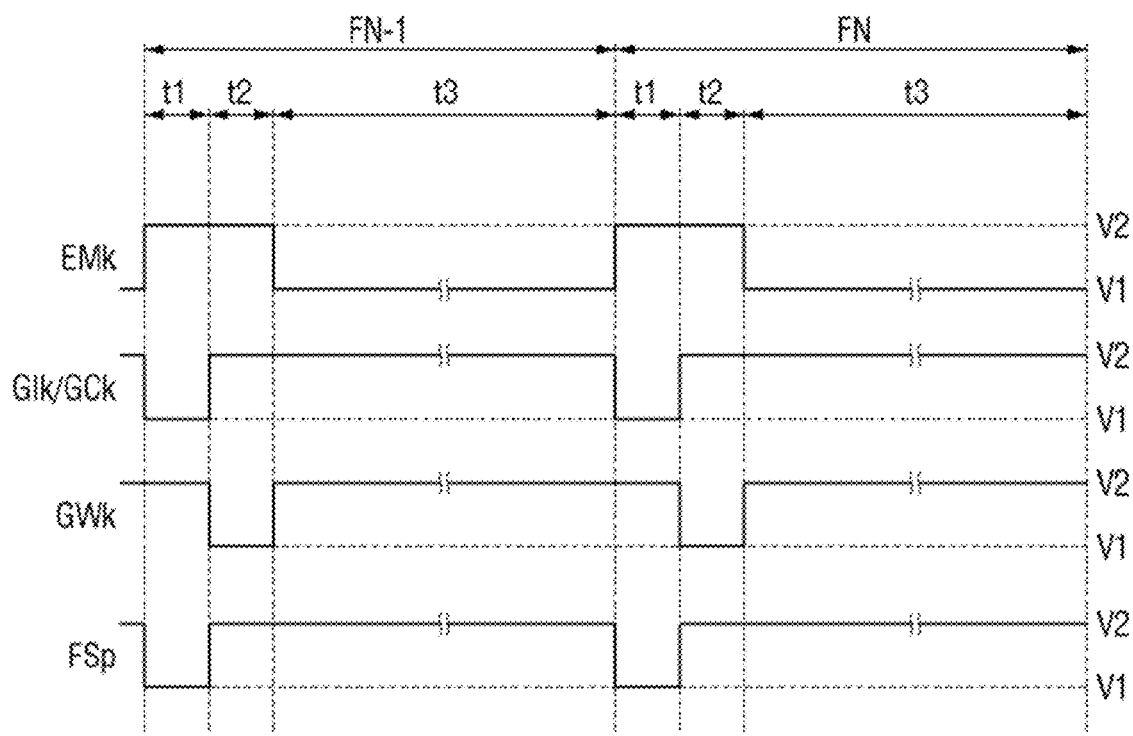
FIG. 9 is a waveform diagram of scan signals input into a light sensing pixel and a display pixel according to an embodiment.

FIG. 9 is a waveform diagram of scan signals input into a light sensing pixel and a first display pixel of a display pixel according to an embodiment.

In an embodiment, FIG. 9 shows a $k^{th}$ display emission signal EMk transmitted through the $k^{th}$ emission line ELk, a $k^{th}$ display initialization signal GIk transmitted through the $k^{th}$ display initialization line GILk, a $k^{th}$ display control signal GCk transmitted through the $k^{th}$ display control line GCLk, a $k^{th}$ display write signal GWk transmitted through the $k^{th}$ display write line GWLk, and a $p^{th}$ fingerprint scan signal FSp transmitted through the $p^{th}$ fingerprint scan line FSLp, during an $(N-1)^{th}$ frame period FN-1 and an $N^{th}$ frame period FN.

The $k^{th}$ display initialization signal GIk controls on/off of the first transistor ST1 of the display pixel SPX. The $k^{th}$ display control signal GCk controls on/off of the third transistor ST3 of the display pixel SPX. The $k^{th}$ display write signal GWk controls on/off of the second transistor ST2 and the fourth transistor ST4. The $k^{th}$ display emission signal EMk controls on/off of the fifth transistor ST5 and the sixth transistor ST6. The pth fingerprint scan signal FSp controls on/off of the first sensing transistor RT1.

Each of the $(N-1)^{th}$ frame period FN-1 and the $N^{th}$ frame period FN includes a first period t1, a second period t2, and a third period t3. The first period t1 is when the gate electrode of the driving transistor DT is initialized to the third driving voltage VINT. The second period t2 is when a data voltage is transmitted to the gate electrode of the driving transistor DT and a threshold voltage of the driving transistor DT is sampled. The third period t3 is when the light emitting element LEL emits light according to the gate voltage of the driving transistor DT. In addition, the first period t1 and the third period t3 are when the light receiving element PD is exposed to light, and the second period t2 is when the anode voltage of the light receiving element PD is detected.

The $k^{th}$ display emission signal EMk has a first level voltage V1 during the third period t3 and a second level voltage V2 during the first period t1 and the second period t2. The $k^{th}$ display write signal GWk has the first level voltage V1 during the second period t2 and the second level voltage V2 during the first period t1 and the third period t3.

The $k^{th}$ display initialization signal GIk and the $k^{th}$ display control signal GCk have the first level voltage V1 during the first period t1, and the second level voltage V2 during the second period t2 and the third period t3. That is, the $k^{th}$ display initialization signal GIk and the $k^{th}$ display control signal GCk are substantially the same.

The $p^{th}$ fingerprint scan signal FSp has the first level voltage V1 during the first period t1 and the second level voltage V2 during the second period t2 and the third period t3. The pth fingerprint scan signal FSp is substantially the same as the $k^{th}$ display initialization signal GIk.

Each of the first period t1 and the second period t2 is one horizontal period. One horizontal period refers to a period during which a data voltage is transmitted to each of the display pixels SPX in one horizontal line of the display panel 100, and thus is defined as one horizontal line scan period. The display pixels SPX in one horizontal line are sub-pixels connected to one display initialization line, one display write line, one display control line, and one emission line.

The first level voltage V1 is a turn-on voltage that turns on the first to sixth transistors ST1 to ST6 and the first sensing transistor RT1. The second level voltage V2 is a turn-off voltage that turns off the first to sixth transistors ST1 to ST6 and the first sensing transistor RT1. The second level voltage V2 has a higher level than the first level voltage V1.

Hereinafter, the operation of the display pixel SPX during the first period t1, the second period t2, and the third period t3 will be described with reference to FIGS. 6 and 9.

In the first period t1, the first level voltage V1 $k^{th}$ display initialization signal GIk is transmitted to the $k^{th}$ display initialization line GILk, and the first level voltage V1 $k^{th}$ display control signal GCk is transmitted to the $k^{th}$ display control line GCLk.

During the first period t1, the first transistor ST1 is turned on by the first level voltage V1 $k^{th}$ display initialization signal GIk. Due to the turn-on of the first transistor ST1, the third driving voltage VINT of the third driving voltage line VIL is transmitted to the gate electrode of the driving transistor DT. When the third driving voltage VINT is transmitted to the gate electrode of the driving transistor DT during the first period t1, the voltage Vsg between the first electrode and the gate electrode of the driving transistor DT is greater than the threshold voltage Vth of the driving transistor DT, so that the driving transistor DT is turned on. That is, since an on bias is applied to the driving transistor DT, a hysteresis characteristic of the driving transistor DT is reduced.

In addition, during the first period t1, the fourth transistor ST4 is turned on by the first level voltage V1 $k^{th}$ display control signal GCk. Therefore, due to the turn-on of the fourth transistor ST4 during the first period t1, the anode electrode of the light emitting element LEL is initialized to the third driving voltage VINT of the third driving voltage line VIL.

During the second period t2, the first level voltage V1 $k^{th}$ display write signal GWk is transmitted to the $k^{th}$ display write line GWLk. Therefore, during the second period t2, each of the second transistor ST2 and the third transistor ST3 is turned on by the first level voltage V1 $k^{th}$ display write signal GWk.

Due to the turn-on of the third transistor ST3 during the second period t2, the gate electrode and the second electrode of the driving transistor DT are connected to each other, and the driving transistor DT is driven as a diode. In addition, due to the turn-on of the second transistor ST2 during the second period t2, a data voltage Vdata is transmitted to the first electrode of the driving transistor DT. Since the voltage Vsg (=Vdata−VINT) between the first electrode and the gate electrode of the driving transistor DT is less than the threshold voltage Vth, the driving transistor DT forms a current path until the voltage Vsg between the first electrode and the gate electrode reaches the threshold voltage Vth. For this reason, during the second period t2, the voltages of the gate electrode and the second electrode of the driving transistor DT rise to a difference voltage Vdata−Vth between the data voltage Vdata and the threshold voltage Vth of the driving transistor DT.

During the third period t3, the first level voltage V1 $k^{th}$ emission signal EMk is transmitted to the $k^{th}$ emission line ELk. During the third period t3, each of the fifth transistor ST5 and the sixth transistor ST6 is turned on by the first level voltage V1 $k^{th}$ emission signal EMk.

Due to the turn-on of the fifth transistor ST5, the first electrode of the driving transistor DT is connected to the first driving voltage line VDL. Due to the turn-on of the sixth transistor ST6, the second electrode of the driving transistor DT is connected to the anode electrode of the light emitting element LEL.

When the fifth transistor ST5 and the sixth transistor ST6 are turned on, the driving current Ids that flows according to the voltage of the gate electrode of the driving transistor DT is transmitted to the light emitting element LEL. The driving current Ids is defined by Eq. (2):

$$Ids = k' \times \{VDD - (Vdata - Vth) - Vth\}^2 \qquad (2)$$

In Eq. (2), k' is a proportionality coefficient determined by the structure and physical characteristics of the driving transistor DT, Vth is the threshold voltage of the driving transistor DT, VDD is the first driving voltage of the first driving voltage line VDL, and Vdata is the data voltage. The voltage of the gate electrode of the driving transistor DT is Vdata-Vth, and the voltage of the first electrode thereof is VDD. By collecting terms in Eq. (2), Eq. (3) is derived:

$$Ids = k' \times (VDD - Vdata)^2. \qquad (3)$$

Consequently, as expressed by Eq. (3), the driving current Ids does not depend on the threshold voltage Vth of the driving transistor DT. That is, the threshold voltage Vth of the driving transistor DT may be compensated.

Hereinafter, the operation of the light sensing pixel LSP during the first period t1, the second period t2, and the third period t3 will be described with reference to FIGS. 6 and 9.

During the first period t1, the first level voltage V1 $p^{th}$ fingerprint scan signal FSp is transmitted to the pth fingerprint scan line FSLp. The first sensing transistor RT1 is turned on by the first level voltage V1 $p^{th}$ fingerprint scan signal FSp. Due to the turn-on of the first sensing transistor RT1, the sensing anode electrode of the light receiving element PD is connected to the qth sensing line RLq. Therefore, the fingerprint driving circuit 400 can detect the voltage of the sensing anode electrode of the light receiving element PD through the $q^{th}$ sensing line RLq.

During the second period t2 and the third period t3, the second level voltage V2 $p^{th}$ fingerprint scan signal FSp is transmitted to the $p^{th}$ fingerprint scan line FSLp. Therefore, the first sensing transistor RT1 is turned off during the second period t2 and the third period t3. Accordingly, the voltage of the sensing anode electrode of the light receiving element PD increases according to light incident during the second period t2 and the third period t3. For example, as the amount of light incident on the light receiving element PD increases, the voltage of the sensing anode electrode of the light receiving element PD increases.

As shown in FIG. 9, in an embodiment, the $k^{th}$ display initialization signal GIk and the pth fingerprint scan signal FSp are substantially the same. To this end, the plurality of fingerprint stages FTA1 to FTAi shown in FIG. 8 are driven with substantially the same timing as some of the plurality of display stages STA1 to STAm+1 shown in FIG. 7. That is, the plurality of fingerprint stages FTA1 to FTAi are driven with substantially the same timing as the $r^{th}$, where r is an integer less than m, to $s^{th}$, where s is an integer greater than r and less than or equal to m, display stages of the plurality of display stages STA1 to STAm+1. A description thereof will be given below with reference to FIG. 12.

In addition, a fingerprint start signal transmitted to the fingerprint start signal input terminal FST of the first fingerprint stage FTA1 is substantially the same as a carry signal of a previous stage transmitted to the start signal input terminal ST of the r<sup>th</sup> display stage. In addition, fingerprint clock signals transmitted through the fingerprint clock lines FCKL1, FCKL2, FCKL3 and FCKL4 are substantially the same as display clock signals transmitted through the display clock lines CKL1, CKL2, CKL3 and CKL4.

Figure 10:
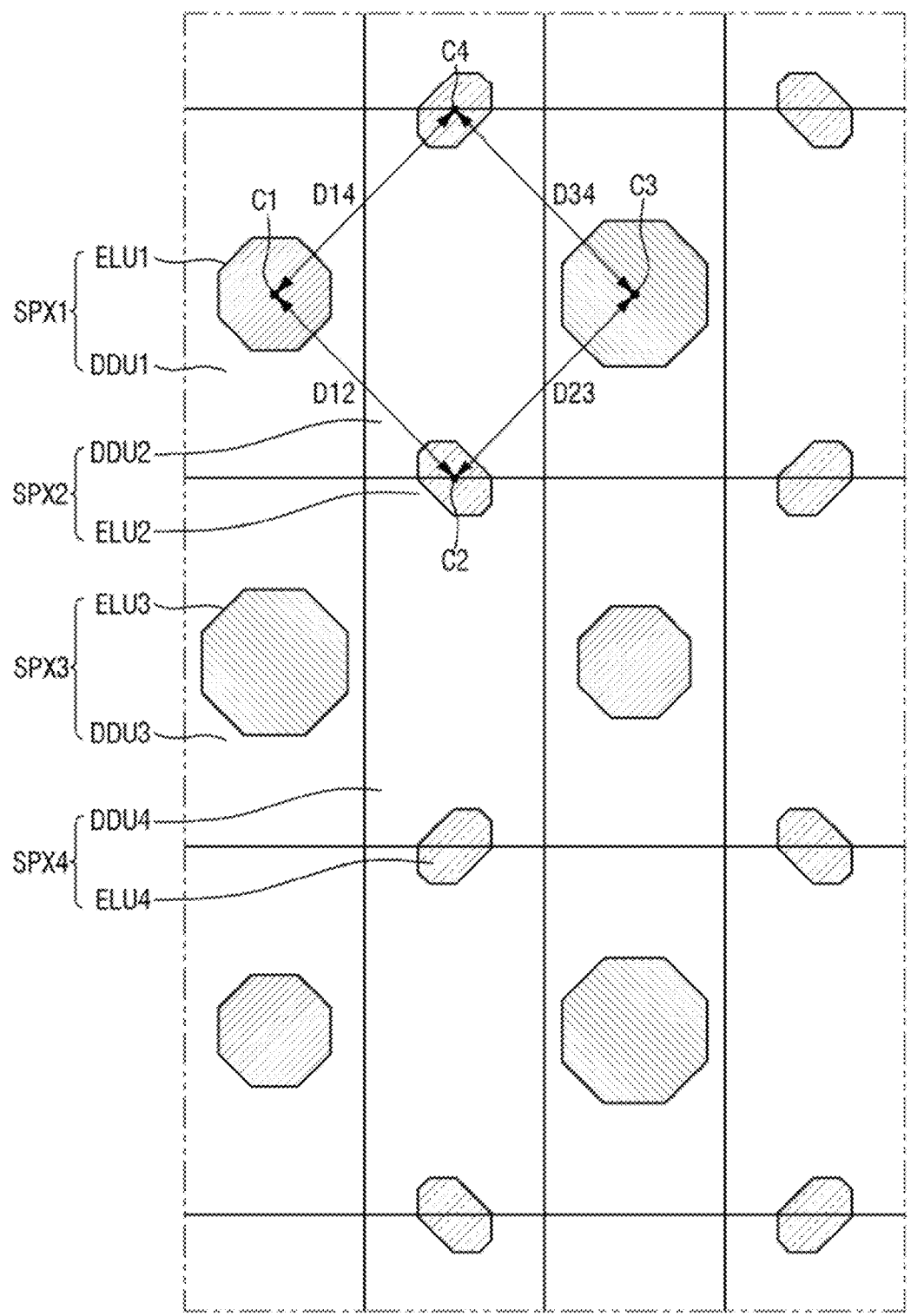
FIG. 10 is a layout diagram of an image display area according to an embodiment.

FIG. 10 is a layout diagram of an image display area according to an embodiment.

Referring to FIG. 10, in an embodiment, the display area DA includes first display pixels SPX1, second display pixels SPX2, third display pixels SPX3, and fourth display pixels SPX4. The display pixels SPX are divided into the first display pixels SPX1, the second display pixels SPX2, the third display pixels SPX3, and the fourth display pixels SPX4. The first display pixel SPX1, the second display pixel SPX2, the third display pixel SPX3, and the fourth display pixel SPX4 form a unit display pixel. The unit display pixel is the smallest unit of display pixels capable of displaying white.

The first display pixel SPX1 includes a first light emitting portion ELU1 that emits a first light, and a first pixel driver DDU1 that transmits a driving current to the light emitting element of the first light emitting portion ELU1. The first light is light of a red wavelength band. For example, the main peak wavelength of the first light is approximately 600 nm to 750 nm.

The second display pixel SPX2 includes a second light emitting portion ELU2 that emits a second light, and a second pixel driver DDU2 that transmits a driving current to the light emitting element of the second light emitting portion ELU2. The second light is light of a green wavelength band. For example, the main peak wavelength of the second light is approximately 480 nm to 560 nm.

The third display pixel SPX3 includes a third light emitting portion ELU3 that emits a third light, and a third pixel driver DDU3 that transmits a driving current to the light emitting element of the third light emitting portion ELU3. The third light is light of a blue wavelength band. For example, the main peak wavelength of the third light is approximately 370 nm to 460 nm.

The fourth display pixel SPX4 includes a fourth light emitting portion ELU2 that emits the second light, and a fourth pixel driver DDU4 that transmits a driving current to the light emitting element of the fourth light emitting portion ELU4.

In the unit display pixel, the first pixel driver DDU1 and the second pixel driver DDU2 are arranged in the first direction DR1, and the third pixel driver DDU3 and the fourth pixel driver DDU4 are arranged in the first direction DR1. In the unit display pixel, the first pixel driver DDU1 and the third pixel driver DDU3 are arranged in the second direction DR2, and the second pixel driver DDU2 and the fourth pixel driver DDU4 are arranged in the second direction DR2.

The first light emitting portion ELU1 overlaps the first pixel driver DDU1, and the third light emitting portion ELU3 overlaps the third pixel driver DDU3. Each of the second light emitting portion ELU2 and the fourth light emitting portion ELU4 overlaps the second pixel driver DDU2 and the fourth pixel driver DDU4. Each of the second light emitting portion ELU2 and the fourth light emitting portion ELU4 is disposed at a boundary between the second pixel driver DDU2 and the fourth pixel driver DDU4.

The first light emitting portion ELU1, the second light emitting portion ELU2, the third light emitting portion ELU3, and the fourth light emitting portion ELU4 have an octagonal shape in a plan view, but embodiments are not necessarily limited thereto. In some embodiments, the first light emitting portion ELU1, the second light emitting portion ELU2, the third light emitting portion ELU3, and the fourth light emitting portion ELU4 may have a quadrilateral shape such as a rhombus, or another polygonal shape other than a quadrilateral and an octagon in a plan view.

Due to the arrangement position and planar shape of the first light emitting portion ELU1, the second light emitting portion ELU2, the third light emitting portion ELU3, and the fourth light emitting portion ELU4, a distance D12 between a center C1 of the first light emitting portion ELU1 and a center C2 of the adjacent second light emitting portion ELU2, a distance D23 between the center C2 of the second light emitting portion ELU2 and a center C3 of the adjacent third light emitting portion ELU3, a distance D14 between the center C1 of the first light emitting portion ELU1 and a center C4 of the adjacent fourth light emitting portion ELU4, and a distance D34 between the center C3 of the third light emitting portion ELU3 and the center C4 of the adjacent fourth light emitting portion ELU4 are substantially equal.

Figure 11:
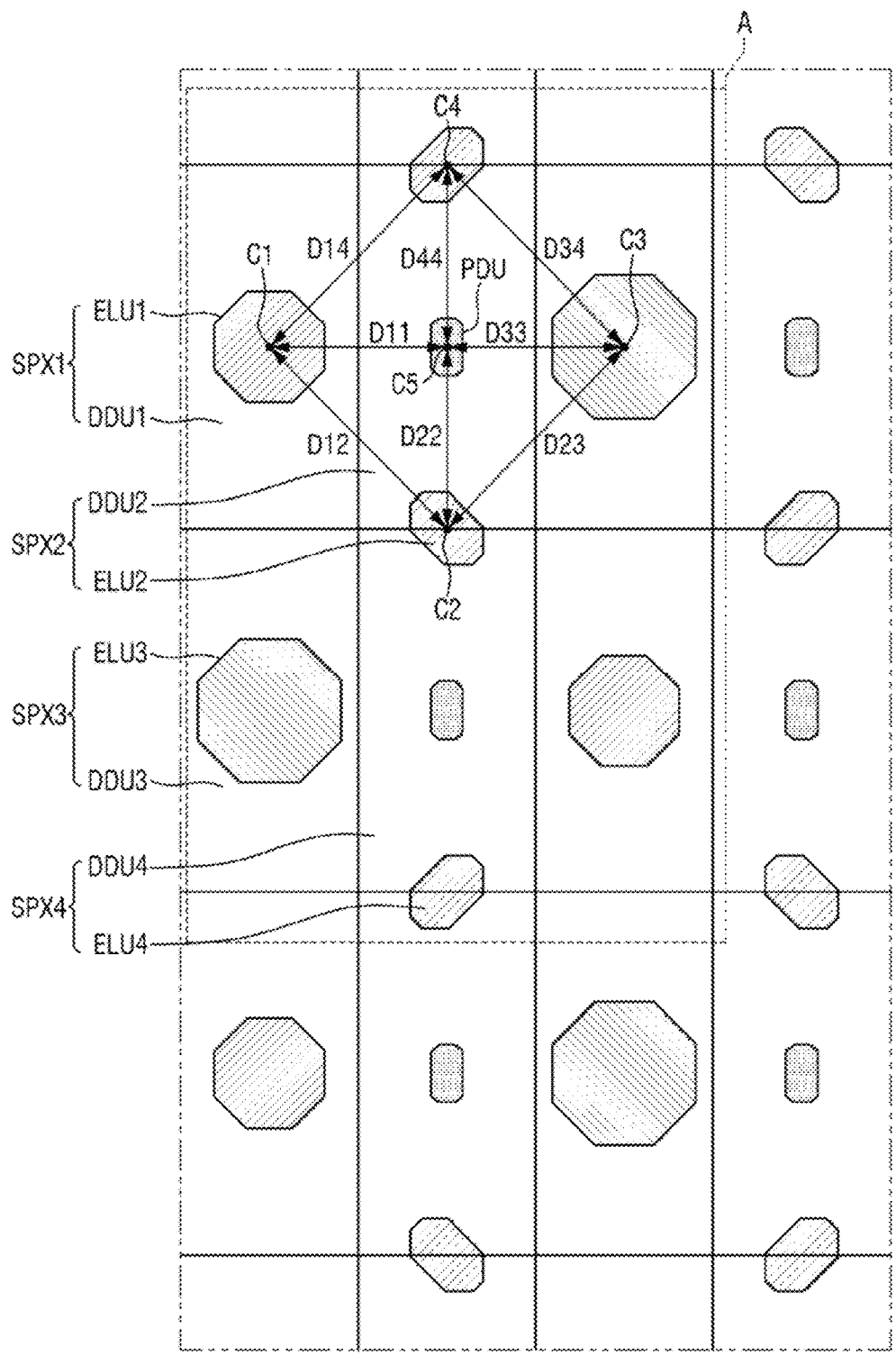
FIG. 11 is a layout diagram of a fingerprint sensing area according to an embodiment.

FIG. 11 is a layout diagram of a fingerprint sensing area according to an embodiment.

In FIG. 11, according to an embodiment, the fingerprint sensing area FSA differs from the image display area IDA shown in FIG. 10 in that it further includes light sensing portions PDU that include the light receiving element PD. In FIG. 11, redundant description of parts already described for an embodiment of FIG. 10 will be omitted.

Each of the light sensing portions PDU is disposed between the first light emitting portion ELU1 and the third light emitting portion ELU3 that are adjacent in the first direction DR1, and between the second light emitting portion ELU2 and the fourth light emitting portion ELU4 that are adjacent in the second direction DR2.

At least one light sensing portion PDU is disposed in the unit display pixel. The light sensing portion PDU overlaps the second pixel driver DDU2 or the fourth pixel driver DDU4. Since the second pixel driver DDU2 and the fourth pixel driver DDU4 are alternately disposed in the second direction DR2, the light sensing portion PDU is also alternately disposed in the second direction DR2.

Each of the light sensing portions PDU has an octagonal shape in a plan view, but embodiments are not necessarily limited thereto. In other embodiments, each of the light sensing portions PDU has a quadrilateral shape such as a rhombus, or another polygonal shape other than a quadrilateral or an octagon shape in a plan view.

In addition, due to the arrangement and planar shape of the first light emitting portion ELU1, the second light emitting portion ELU2, the third light emitting portion ELU3, the fourth light emitting portion ELU4, and the light sensing portion PDU, a distance D11 between the center C1 of the first light emitting portion ELU1 and a center C5 of the adjacent light sensing portion PDU, a distance D22 between the center C2 of the second light emitting portion ELU2 and the center C5 of the adjacent light sensing portion PDU, a distance D33 between the center C3 of the third light emitting portion ELU3 and the center C5 of the adjacent light sensing portion PDU, and a distance D44 between the center C4 of the fourth light emitting portion ELU4 and the center C5 of the adjacent light sensing portion PDU are substantially equal.

Figure 12:
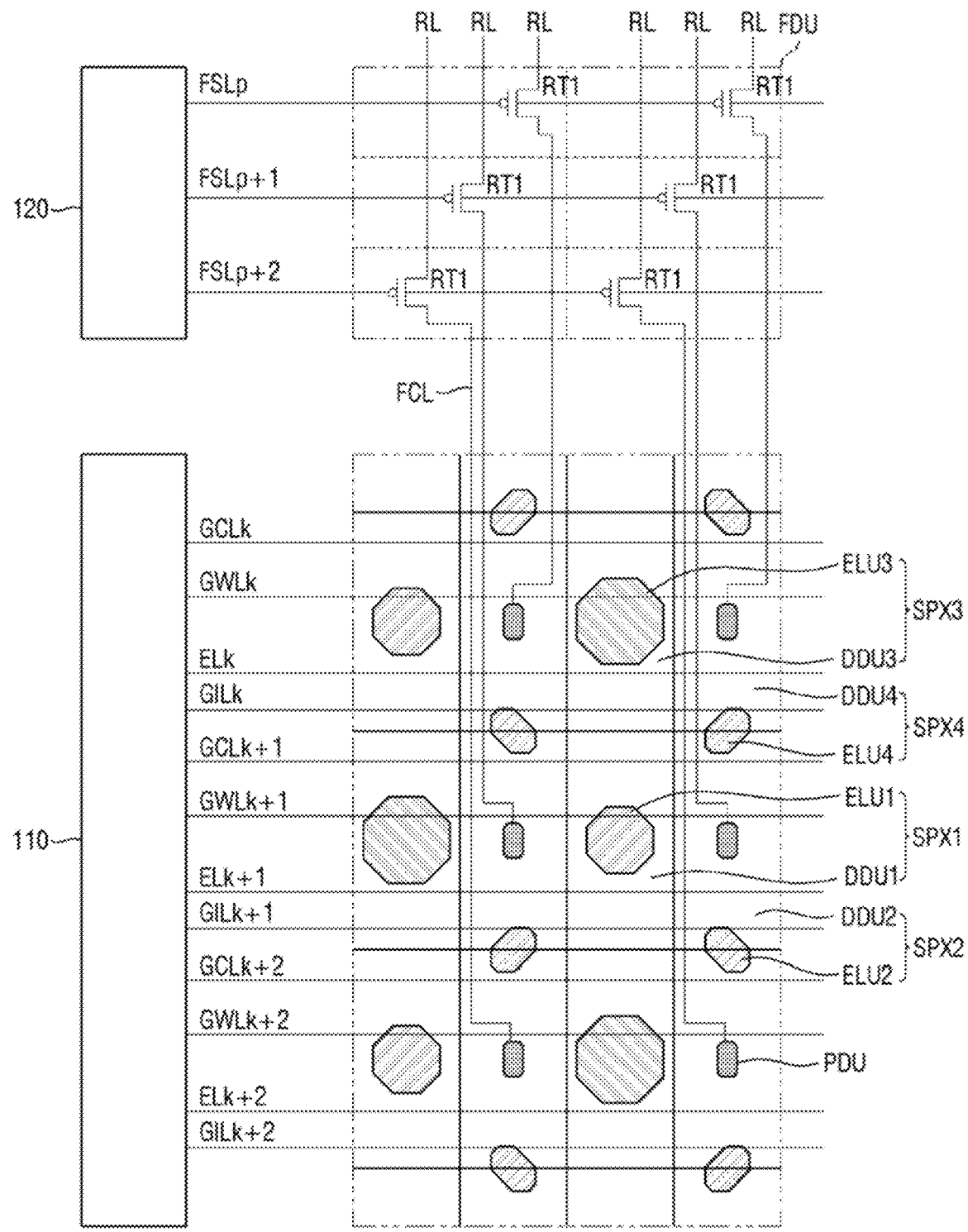
FIG. 12 illustrates light sensing portions of a fingerprint sensing area and fingerprint drivers according to an embodiment.

FIG. 12 illustrates light sensing portions of a fingerprint sensing area and fingerprint drivers of a fingerprint driving area according to an embodiment.

For simplicity of description, FIG. 12 illustrates the first to fourth sub-pixels SPX1, SPX2, SPX3, and SPX4 connected to $k^{th}$ to $(k+2)^{th}$ display write lines GWLk, GWLk+1, and GWLk+2, $k^{th}$ to $(k+2)^{th}$ display initialization lines GILk, GILk+1, and GILk+2, $k^{th}$ to $(k+2)^{th}$ display control lines GCLk, GCLk+1, and GCLk+2, and $k^{th}$ to $(k+2)^{th}$ emission lines ELk, ELk+1, and ELk+2, and the fingerprint drivers FDU connected $p^{th}$ to $(p+2)^{th}$ fingerprint scan lines FSLp, FSLp+1, and FSLp+2.

Referring to FIG. 12, in an embodiment, the fingerprint driver FDU connected to the $p^{th}$ fingerprint scan line FSLp is connected to the light sensing portion PDU that overlaps the second pixel driver DDU2 or the fourth pixel driver DDU4 connected to the $k^{th}$ display write line GWLk, the $k^{th}$ display initialization line GILk, the $k^{th}$ display control line GCLk, and the $k^{th}$ emission line Elk. In addition, the fingerprint driver FDU connected to the $(p+1)^{th}$ fingerprint scan line FSLp+1 is connected to the light sensing portion PDU that overlaps the second pixel driver DDU2 or the fourth pixel driver DDU4 connected to the $(k+1)^{th}$ display write line GWLk+1, the $(k+1)^{th}$ display initialization line GILk+1, and the $(k+1)^{th}$ display control line GCLk+1 and the $(k+1)^{th}$ emission line ELk+1.

Accordingly, the $k^{th}$ display initialization signal transmitted to the $k^{th}$ display initialization line GILk and the $p^{th}$ fingerprint scan signal transmitted to the $p^{th}$ fingerprint scan line FSLp are substantially the same. In addition, a $(k+1)^{th}$ display initialization signal transmitted to the $(k+1)^{th}$ display initialization line GILk+1 and a $(p+1)^{th}$ fingerprint scan signal transmitted to the $(p+1)^{th}$ fingerprint scan line FSLp+1 are substantially the same.

As such, when the $k^{th}$ display initialization signal transmitted to the $k^{th}$ display initialization line GILk and the $p^{th}$ fingerprint scan signal transmitted to the $p^{th}$ fingerprint scan line FSLp are substantially the same, an emission period t3 of the first to fourth light emitting portions ELU1 to ELU4 of the sub-pixels SPX1 to SPX4 connected to the $k^{th}$ display initialization line GILk can be set to be substantially equal to a period t3 during which the light receiving elements PD of the adjacent light sensing portions PDU are exposed to light. That is, a period during which light reflected from the user's fingerprint is incident on the light receiving element PD of the light sensing portion PDU can be optimized with an emission period of the adjacent first to fourth light emitting portions ELU1 to ELU4.

The light receiving elements PD of the light sensing portions PDU and the first sensing transistors RT1 of the fingerprint drivers FDU are connected in one-to-one correspondence through the sensing connection lines FCL. One end of each sensing connection line FCL is connected to the sensing anode electrode of the light receiving element PD of the light sensing portion PDU, and the other end of each sensing connection line FCL is connected to the second electrode of the first sensing transistor RT1 of the fingerprint driver FDU.

The sensing connection line FCL overlaps at least one second pixel driver DDU2 or fourth pixel driver DDU4. In addition, the sensing connection line FCL overlaps the light sensing portion PDU. In addition, as the length of the fingerprint sensing area FSA in the second direction DR2 increases, the number of the sensing connection lines FCL increases, and the sensing connection lines FCL may overlap the first pixel driver DDU1 or the third pixel driver DDU3.

As shown in FIG. 12, the light receiving elements PD of the light sensing portion PDU are formed in the display area DA together with the light emitting elements LEL of the light emitting portions ELU1, ELU2, ELU3, and ELU4, and are connected in one-to-one correspondence to the fingerprint drivers FDUs disposed in the non-display area NDA using the sensing connection lines FCL. Accordingly, there is no need to reduce a space in which the first to fourth pixel drivers DDU1 to DDU4 are disposed to provide a space in which to dispose the fingerprint drivers FDUs.

Figure 13:
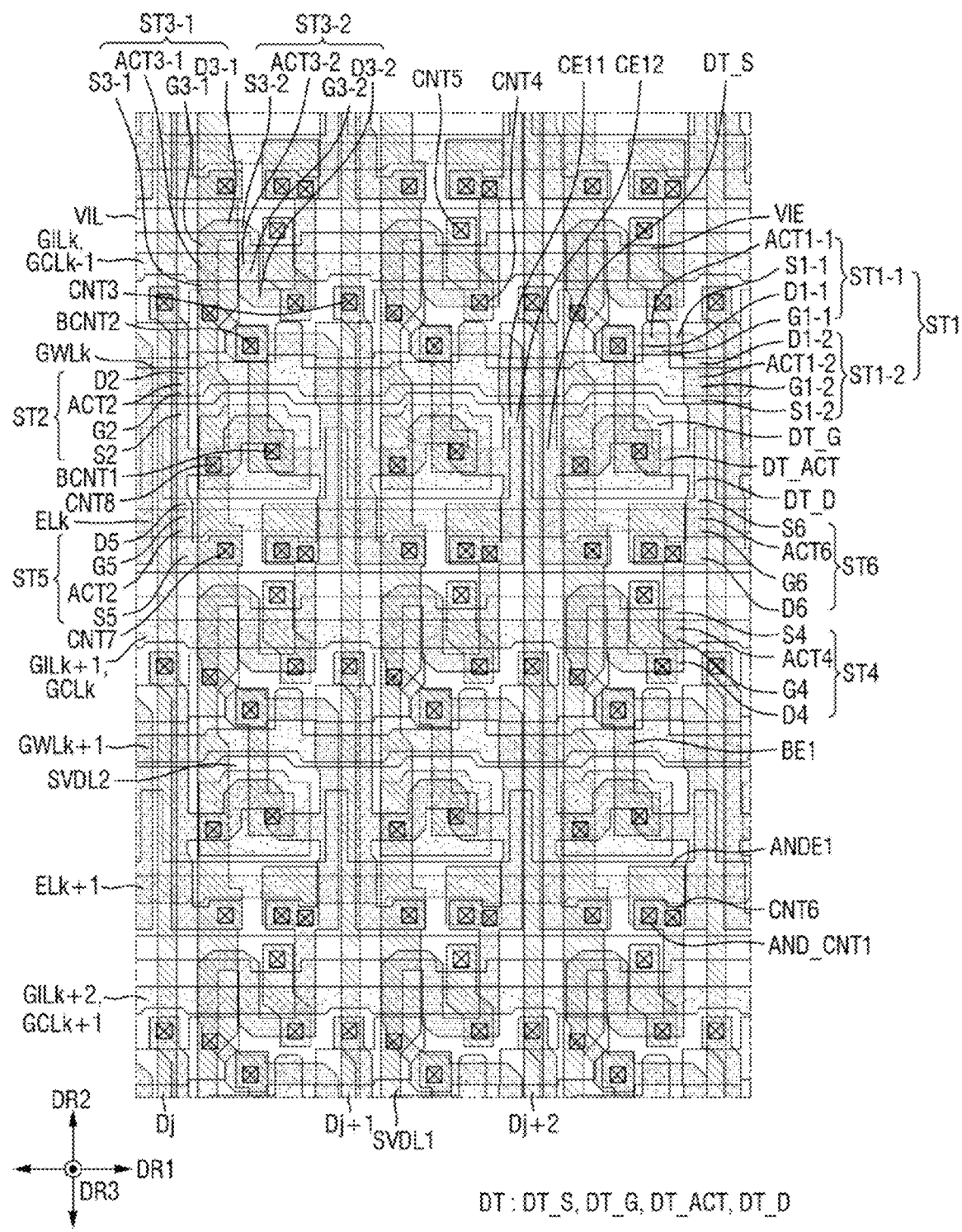
FIGS. 13 and 14 are detailed layout views of area A of FIG. 11.
Figure 14:
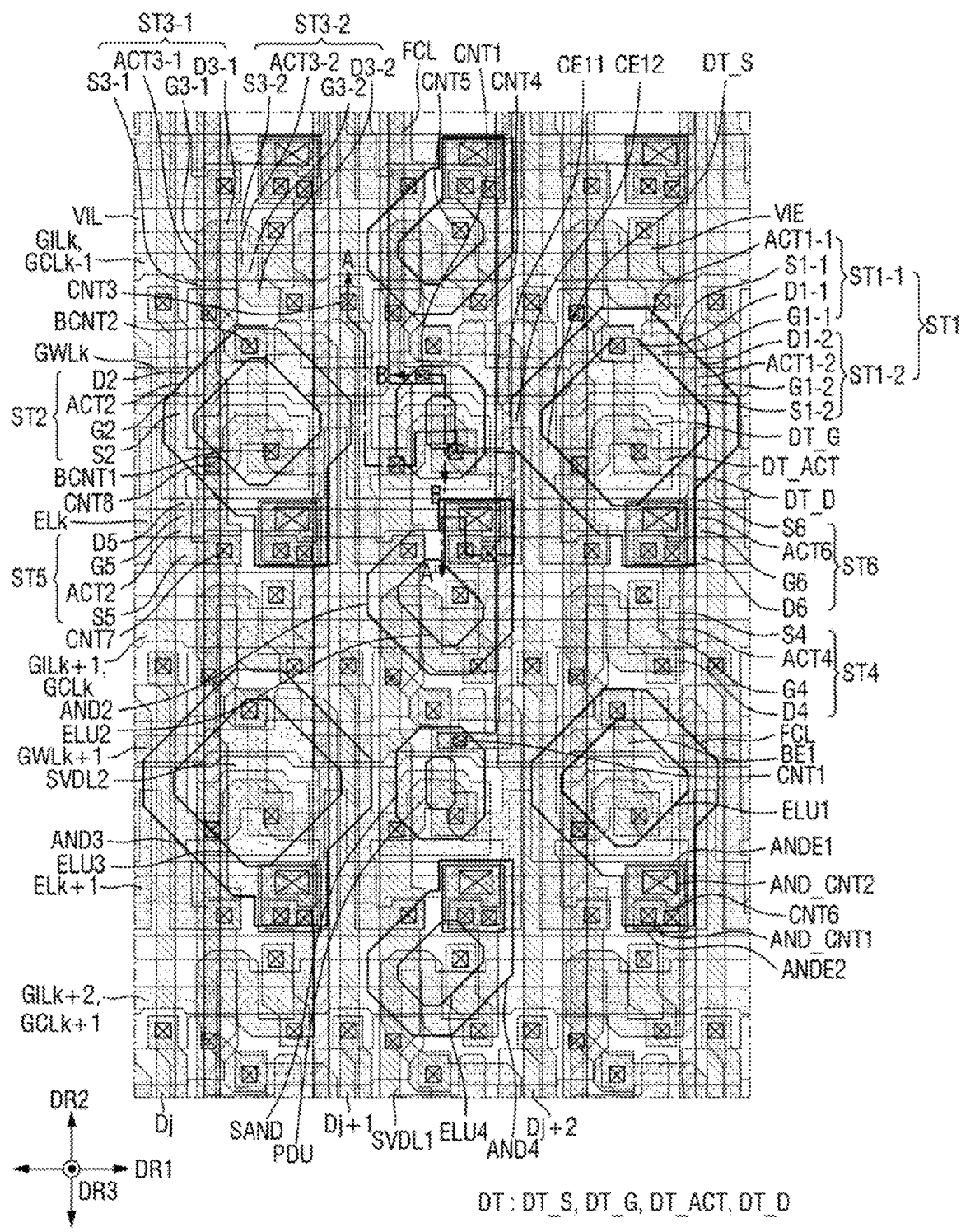

FIGS. 13 and 14 are layout views of area A of FIG. 11 in detail.

For simplicity of description, FIG. 13 illustrates the first pixel drivers PDU1, the second pixel drivers PDU2, the third pixel drivers PDU3, and the fourth pixel drivers PDU4. FIG. 14 illustrates, in addition to those shown in FIG. 13, a first anode electrode AND1, the first light emitting portion ELU1, a second anode electrode AND2, the second light emitting portion ELU2, a third anode electrode AND3, the third light emitting portion ELU3, a fourth anode electrode AND4, the fourth light emitting portion ELU4, the light sensing portion PDU, and the fingerprint connection lines FCL.

Referring to FIGS. 13 and 14, in an embodiment, each of the first pixel driver PDU1, the second pixel driver PDU2, the third pixel driver PDU3, and the fourth pixel driver PDU4 includes the driving transistor DT, the first to sixth transistors ST1 to ST6, the capacitor CST1, a first connection electrode BE1, a second connection electrode VIE, a first anode connection electrode ANDE1, and a second anode connection electrode ANDE2.

The $k^{th}$ and $(k+1)^{th}$ display write lines GWLk and GWLk+1, the $k^{th}$ and $(k+1)^{th}$ display initialization lines GILk and GILk+1, the $k^{th}$ and $(k+1)^{th}$ display control lines GCLk and GCLk+1, and the $k^{th}$ and $(k+1)^{th}$ emission lines ELk and ELk+1 extend in the first direction DR1. The $j^{th}$ to $(j+3)^{th}$ data lines Dj, Dj+1, Dj+2, and Dj+3 extend in the second direction DR2.

The $(k+1)^{th}$ display initialization line GILk+1 is substantially the same as the $k^{th}$ display control line GCLk. Similarly, the $k^{th}$ display initialization line GILk is substantially the same as the $(k-1)^{th}$ display control line, and the $(k+2)^{th}$ display initialization line is substantially the same as the $(k+1)^{th}$ display control line GCLk.

The first driving voltage line VDL includes a first sub-driving voltage line SVDL1 and a second sub-driving voltage line SVDL2. The first sub-driving voltage line SVDL1 extends in the second direction DR2, and the second sub-driving voltage line SVDL2 extends in the first direction DR1. The first sub-driving voltage line SVDL1 is disposed between each of the $j^{th}$ to $(j+3)^{th}$ data lines Dj, Dj+1, Dj+2, and Dj+3 and the first connection electrode BE1 in the first direction DR1. The second sub-driving voltage line SVDL2 is disposed between the $k^{th}$ display write line GWLk and the $k^{th}$ emission line ELk, and between the $(k+1)^{th}$ display write line GWLk+1 and the $(k+1)^{th}$ emission line Elk+1 in the second direction DR2. The first sub-driving voltage line SVDL1 is connected to the second sub-driving voltage line SVDL2 through an eighth contact hole CNT8.

Hereinafter, the first pixel driver DDU1 connected to the $k^{th}$ display write line GWLk will be described in detail. Since the second pixel driver DDU2, the third pixel driver DDU3, and the fourth pixel driver DDU4 connected to the $k^{th}$ display write line GWLk are substantially the same as the first pixel driver DDU1 connected to the $k^{th}$ display write line GWLk, a repeated description thereof will be omitted. In addition, since the first pixel driver DDU1, the second pixel driver DDU2, the third pixel driver DDU3, and the fourth pixel driver DDU4 connected to the $(k+1)^{th}$ display write line GWLk+1 are substantially the same as the first pixel driver DDU1 connected to the $k^{th}$ display write line GWLk, a repeated description thereof will be omitted.

The driving transistor DT includes a channel region DT_ACT, a gate electrode DT_G, a first electrode DT_S, and a second electrode DT_D. The channel region DT_ACT of the driving transistor DT overlaps the gate electrode DT_G of the driving transistor DT in the third direction DR3. The gate electrode DT_G is disposed on the channel region DT_ACT of the driving transistor DT.

The gate electrode DT_G is connected to the first connection electrode BE1 through a first connection contact hole BCNT1. The first connection electrode BE1 is connected to a second electrode D1-1 of a first-first transistor ST1-1 through a second connection contact hole BCNT2. Since the first connection electrode BE1 extends in the second direction DR2, it crosses the kth display write line GWLk.

The first electrode DT_S of the driving transistor DT is connected to a first electrode S2 of the second transistor ST2. The second electrode DT_D of the driving transistor DT is connected to a first electrode S1-2 of a first-second transistor ST1-2 and a first electrode S6 of the sixth transistor ST6.

The first transistor ST1 is a dual transistor. The first transistor ST1 includes a first-first transistor ST1-1 and the first-second transistor ST1-2.

The first-first transistor ST1-1 includes a channel region ACT1-1, a gate electrode G1-1, a first electrode S1-1, and the second electrode D1-1. The gate electrode G1-1 of the first-first transistor ST1-1 is a part of the $k^{th}$ display initialization line GILk, and is a region where the channel region ACT1-1 of the first-first transistor ST1-1 overlaps the $k^{th}$ display initialization line GILk in the third direction DR3. The first electrode S1-1 of the first-first transistor ST1-1 is connected to a second electrode D1-2 of the first-second transistor ST1-2. The second electrode D1-1 of the first-first transistor ST1-1 is connected to the first connection electrode BE1 through the second connection contact hole BCNT2.

The first-second transistor ST1-2 includes a channel region ACT1-2, a gate electrode G1-2, the first electrode S1-2, and the second electrode D1-2. The gate electrode G1-2 of the first-second transistor ST1-2 is a part of the $k^{th}$ display initialization line GILk, and is a region where the channel region ACT1-2 of the first-second transistor ST1-2 overlaps the $k^{th}$ display initialization line GILk in the third direction DR3. The first electrode S1-2 of the first-second transistor ST1-2 is connected to the second electrode DT_D of the driving transistor DT. The second electrode D1-2 of the first-second transistor ST1-2 is connected to the first electrode S1-1 of the first-first transistor ST1-1.

The second transistor ST2 includes a channel region ACT2, a gate electrode G2, the first electrode S2, and the second electrode D2. The gate electrode G2 of the second transistor ST2 is a part of the $k^{th}$ display write line GWLk, and is a region where the channel region ACT2 of the second transistor ST2 and the $k^{th}$ display write line GWLk overlap in the third direction DR3. The first electrode S2 of the second transistor ST2 is connected to the first electrode DT_S of the driving transistor DT. The second electrode D2 of the second transistor ST2 is connected to the $j^{th}$ data line Dj through a third contact hole CNT3.

The third transistor ST3 is a dual transistor. The third transistor ST3 includes a third-first transistor ST3-1 and a third-second transistor ST3-2.

The third-first transistor ST3-1 includes a channel region ACT3-1, a gate electrode G3-1, a first electrode S3-1, and a second electrode D3-1. The gate electrode G3-1 of the third-first transistor ST3-1 is a part of the $k^{th}$ display control line GCLk, and is a region where the channel region ACT3-1 of the third-first transistor ST3-1 overlaps the $k^{th}$ display control line GCLk. The first electrode S3-1 of the third-first transistor ST3-1 is connected to the first connection electrode BE1 through the second connection contact hole BCNT2. The second electrode D3-1 of the third-first transistor ST3-1 is connected to a first electrode S3-2 of the third-second transistor ST3-2.

The third-second transistor ST3-2 includes a channel region ACT3-2, a gate electrode G3-2, the first electrode S3-2, and a second electrode D3-2. The gate electrode G3-2 of the third-second transistor ST3-2 is a part of the $k^{th}$ display control line GCLk, and is a region where the channel region ACT3-2 of the third-second transistor ST3-2 overlaps the $k^{th}$ display control line GCLk. The first electrode S3-2 of the third-second transistor ST3-2 is connected to the second electrode D3-1 of the third-first transistor ST3-1. The second electrode D3-2 of the third-second transistor ST3-2 is connected to the second connection electrode VIE through a fourth contact hole CNT4.

The fourth transistor ST4 includes a channel region ACT4, a gate electrode G4, a first electrode S4, and a second electrode D4. The gate electrode G4 of the fourth transistor ST4 is a part of the $k^{th}$ display write line GWLk, and is a region where the channel region ACT4 of the fourth transistor ST4 and the $k^{th}$ display write line GWLk overlap. The first electrode S4 of the fourth transistor ST4 is connected to a first anode connection electrode ANDE1 through a sixth contact hole CNT6. The second anode connection electrode ANDE2 is connected to the first anode connection electrode ANDE1 through a first anode contact hole AND_CNT1. The second electrode D4 of the fourth transistor ST4 is connected to the second connection electrode VIE through the fourth contact hole CNT4. The third driving voltage line VIL is connected to the second connection electrode VIE through a fifth contact hole CNT5, and the second connection electrode VIE is connected to the second electrode D3-2 of the third-second transistor ST3-2 and the second electrode D4 of the fourth transistor ST4 through the fourth contact hole CNT4. The second connection electrode VIE extends in the second direction DR2 and crosses the $k^{th}$ display initialization line GILk.

The fifth transistor ST5 includes a channel region ACT5, a gate electrode G5, a first electrode S5, and a second electrode D5. The gate electrode G5 of the fifth transistor ST5 is a part of the $k^{th}$ emission line ELk, and is a region where the channel region ACT5 of the fifth transistor ST5 overlaps the $k^{th}$ emission line ELk. The first electrode S5 of the fifth transistor ST5 is connected to the first sub-driving voltage line SVDL1 through a seventh contact hole CNT7. The second electrode D5 of the fifth transistor ST5 is connected to the first electrode DT_S of the driving transistor DT.

The sixth transistor ST6 includes a channel region ACT6, a gate electrode G6, a first electrode S6, and a second electrode D6. The gate electrode G6 of the sixth transistor ST6 is a part of the $k^{th}$ emission line ELk, and is a region where the channel region ACT6 of the sixth transistor ST6 overlaps the $k^{th}$ emission line ELk. The first electrode S6 of the sixth transistor ST6 is connected to the second electrode DT_D of the driving transistor DT. The second electrode D6 of the sixth transistor ST6 is connected to a first anode connection electrode ANDE1 through a sixth contact hole CNT6.

A first electrode CE11 of the capacitor CST1 is a part of the second electrode DT_D of the driving transistor DT, and a second electrode CE12 of the capacitor CST1 is a part of the second sub-driving voltage line SVDL2 that overlaps the second electrode DT_D of the driving transistor DT in the third direction DR3.

Figure 15A:
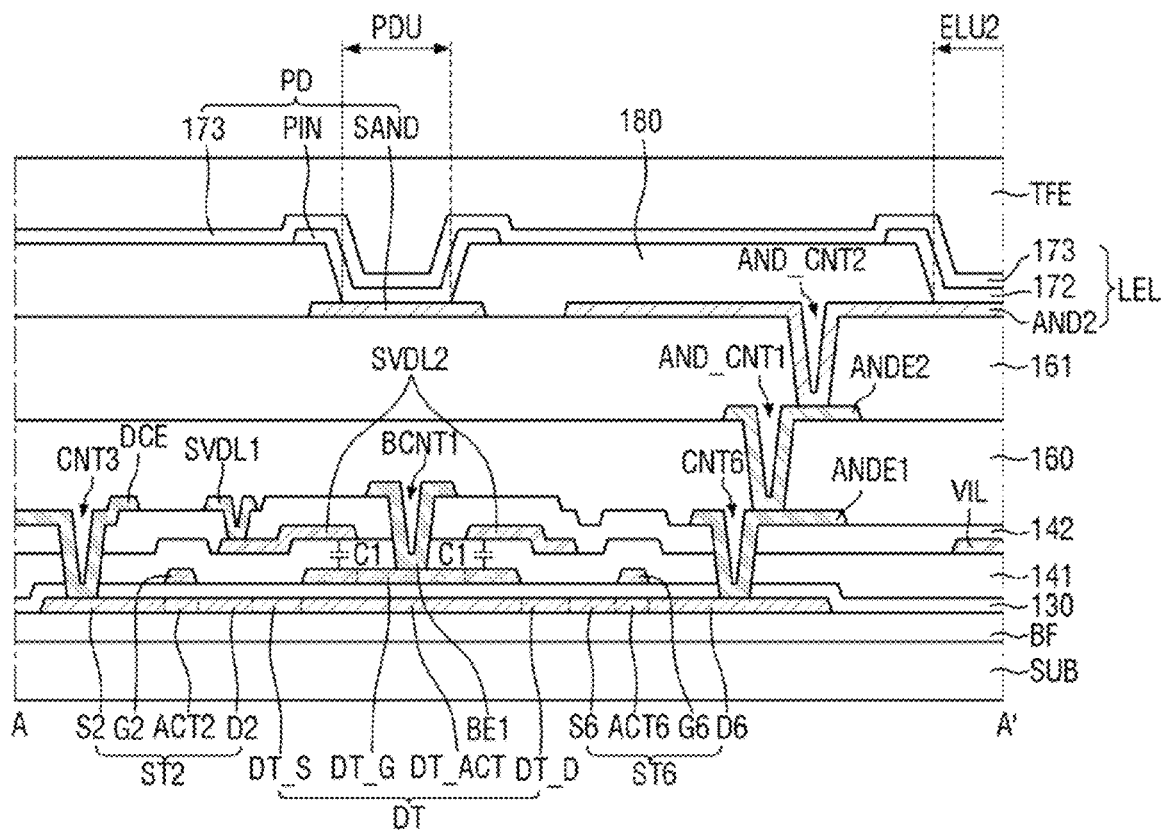
FIG. 15A is a cross-sectional view taken along line A-A' of a display panel of FIG. 14.
Figure 15B:
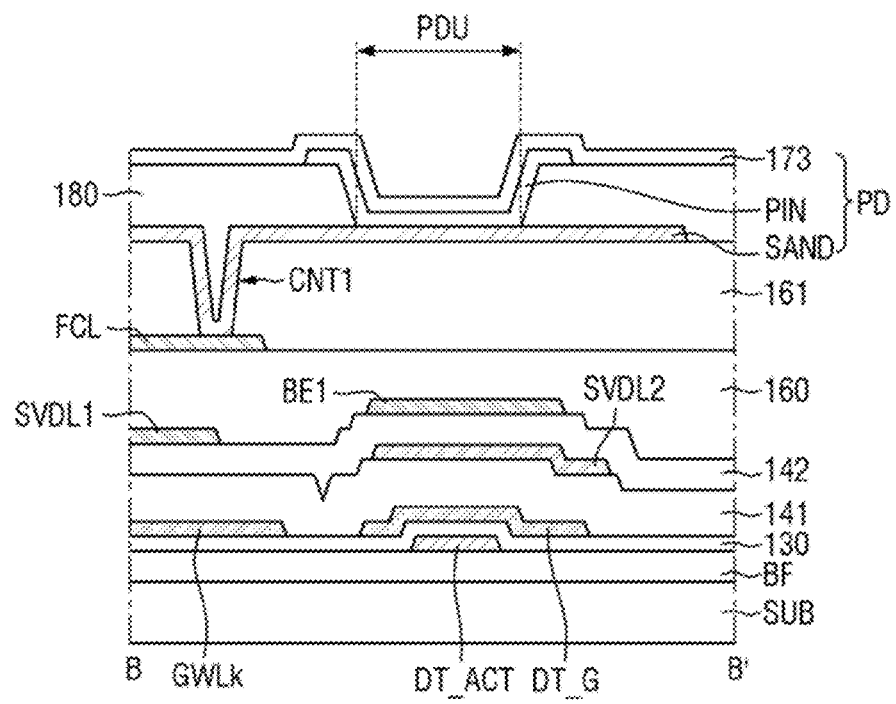
FIG. 15B is a cross-sectional view taken along line B-B' of a display panel of FIG. 14.

The first light emitting portion ELU1 is defined by the first anode electrode AND1 and a bank 180, shown in FIGS. 15A and 15B. The area of the first anode electrode AND1 is greater than the area of the first light emitting portion ELU1. The first anode electrode AND1 is connected to the second anode connection electrode ANDE2 of the first pixel driver DDU1 through a second anode contact hole AND_CNT2.

The second light emitting portion ELU2 is defined by the second anode electrode AND2 and the bank 180. The area of the second anode electrode AND2 is greater than the area of the second light emitting portion ELU2. The second anode electrode AND2 is connected to the second anode connection electrode ANDE2 of the second pixel driver DDU2 through the second anode contact hole AND_CNT2.

The third light emitting portion ELU3 is defined by the third anode electrode AND3 and the bank 180. The area of the third anode electrode AND3 is greater than the area of the third light emitting portion ELU3. The third anode electrode AND3 is connected to the second anode connection electrode ANDE2 of the third pixel driver DDU3 through the second anode contact hole AND_CNT2.

The fourth light emitting portion ELU4 is defined by the fourth anode electrode AND4 and the bank 180. The area of the fourth anode electrode AND4 is greater than the area of the fourth light emitting portion ELU4. The fourth anode electrode AND4 is connected to the second anode connection electrode ANDE2 of the fourth pixel driver DDU4 through the second anode contact hole AND_CNT2.

Each of the light sensing portions PDU includes a light sensing portion PDU defined by a sensing anode electrode SAND and the bank 180. The area of the sensing anode electrode SAND is greater than the area of the light sensing portion PDU. The sensing anode electrode SAND is connected to one of the sensing connection lines FCL through a first contact hole CNT1.

Each of the sensing connection lines FCL extends in the second direction DR2. The sensing connection line FCL do not overlap the data lines Dj, Dj+1, Dj+2, and Dj+3 in the third direction DR3 to minimize being affected by the voltage changes of the data line. The sensing connection line FCL overlaps the first driving voltage line VDL in the third direction DR3.

FIGS. 15A and 15B are cross-sectional views of a display panel taken along lines A-A' and B-B' of FIG. 14.

Referring to FIGS. 15A and 15B, in an embodiment, a thin film transistor layer TFTL, a light emitting element layer EML, and an encapsulation layer TFE are sequentially formed on the substrate SUB.

The thin film transistor layer TFTL is a layer in which the driving transistor DT is formed for each of the first pixel driver DDU1, the second pixel driver DDU2, the third pixel driver DDU3, and the fourth pixel driver DDU4, and in which the first to sixth transistors ST1 to ST6 and the capacitor CST1 are formed. The thin film transistor layer TFTL includes an active layer ACT, a first gate layer GTL1, a second gate layer GTL2, a first data metal layer DTL1, a second data metal layer DTL2, a buffer layer BF, a gate insulating layer 130, a first interlayer insulating layer 141, a second interlayer insulating layer 142, a first organic layer 160, and a second organic layer 161.

The buffer layer BF is disposed on one surface of the substrate SUB. The buffer layer BF protects the thin film transistors and an organic light emitting layer 172 of the light emitting element layer EML from moisture permeating through the substrate SUB, which is susceptible to moisture permeation. The buffer layer BF is formed of a plurality of inorganic layers that are alternately stacked. For example, the buffer layer BF is formed of multiple layers in which one or more inorganic layers of a silicon nitride layer, a silicon oxynitride layer, a silicon oxide layer, a titanium oxide layer and an aluminum oxide layer are alternately stacked. The buffer layer BF may be omitted.

The active layer ACT is formed on the buffer layer BF. The active layer ACT include at least one of polycrystalline silicon, monocrystalline silicon, low-temperature polycrystalline silicon, amorphous silicon, or an oxide semiconductor.

The active layer ACT includes the channel region DT_ACT, the source electrode DT_S, and the drain electrode DT_D of the driving transistor DT. The channel region DT_ACT overlaps the gate electrode DT_G of the driving transistor DT in the third direction DR3, which is the thickness direction of the substrate SUB. The source electrode DT_S is disposed on one side of the channel region DT_ACT, and the drain electrode DT_D is disposed on the other side of the channel region DT_ACT. The source electrode DT_S and the drain electrode DT_D do not overlap the gate electrode DT_G in the third direction DR3. The source electrode DT_S and the drain electrode DT_D are made conductive by doping a silicon semiconductor or an oxide semiconductor with ions or impurities.

In addition, the active layer ACT includes the channel regions ACT1 to ACT6, the source electrodes S1 to S6, and the drain electrodes D1 to D6 of the first to sixth transistors ST1 to ST6. The channel regions ACT1 to ACT6 of the first to sixth transistors ST1 to ST6 overlap the corresponding gate electrodes G1 to G6 in the third direction DR3, respectively. The source electrodes S1 to S6 and the drain electrodes D1 to D6 of the first to sixth transistors ST1 to ST6 are made conductive by doping a silicon semiconductor or an oxide semiconductor with ions or impurities.

The gate insulating layer 130 is formed on the active layer ACT. The gate insulating layer 130 is formed of an inorganic layer, such as a silicon nitride layer, a silicon oxynitride layer, a silicon oxide layer, a titanium oxide layer, or an aluminum oxide layer.

The first gate layer GTL1 is formed on the gate insulating layer 130. The first gate layer GTL1 includes the gate electrode DT_G of the driving transistor DT. In addition, the first gate layer GTL1 includes the gate electrodes G1 to G6 of the first to sixth transistors ST1 to ST6, the display write lines GWLk and GWLk+1, the display initialization lines GILk and GILk+1, the display control lines GCLk and GCLk+1, and the emission lines ELk and ELk+1. The first gate layer GTL1 may be formed as a single layer or as multiple layers made of one of molybdenum (Mo), aluminum (Al), chromium (Cr), gold (Au), titanium (Ti), nickel (Ni), neodymium (Nd) and copper (Cu) or an alloy thereof.

The first interlayer insulating layer 141 is formed on the first gate layer GTL1. The first interlayer insulating layer 141 is formed of an inorganic layer, such as a silicon nitride layer, a silicon oxynitride layer, a silicon oxide layer, a titanium oxide layer, or an aluminum oxide layer. The first interlayer insulating layer 141 may include a plurality of inorganic layers.

The second gate layer GTL2 is formed on the first interlayer insulating layer 141. The second gate layer GTL2 includes the third driving voltage line VIL and the second sub-driving voltage line SVDL2. The second gate layer GTL2 is formed as a single layer or as multiple layers of any one of molybdenum (Mo), aluminum (Al), chromium (Cr), gold (Au), titanium (Ti), nickel (Ni), neodymium (Nd) or copper (Cu), or an alloy thereof.

The second interlayer insulating layer 142 is formed on the second gate layer GTL2. The second interlayer insulating layer 142 is formed of an inorganic layer, such as a silicon nitride layer, a silicon oxynitride layer, a silicon oxide layer, a titanium oxide layer, or an aluminum oxide layer. The second interlayer insulating layer 142 may include a plurality of inorganic layers.

The first data metal layer DTL1 is formed on the second interlayer insulating layer 142. The first data metal layer DTL1 includes the first sub-driving voltage line SVDL1, the first connection electrode BE1, the second connection electrode VIE, and the first anode connection electrode ANDE1. The first data metal layer DTL1 may be formed as a single layer or as multiple layers of any one of molybdenum (Mo), aluminum (Al), chromium (Cr), gold (Au), titanium (Ti), nickel (Ni), neodymium (Nd) or copper (Cu), or an alloy thereof.

The first organic layer 160 is formed on the first data metal layer DTL1 to flatten stepped portions caused by the active layer ACT, the first gate layer GTL1, the second gate layer GTL2, and the first data metal layer DTL1. The first organic layer 160 is formed of an organic layer such as acryl resin, epoxy resin, phenolic resin, polyamide resin, or polyimide resin, etc.

The second data metal layer DTL2 is formed on the first organic layer 160. The second data metal layer DTL2 includes the second anode connection electrode ANDE2 and the sensing connection lines FCL. The second data metal layer DTL2 may be formed as a single layer or as multiple layers of any one of molybdenum (Mo), aluminum (Al), chromium (Cr), gold (Au), titanium (Ti), nickel (Ni), neodymium (Nd) or copper (Cu), or an alloy thereof.

The second organic layer 161 is formed on the second data metal layer DTL2 to flatten stepped portions. The second organic layer 161 is formed of an organic layer such as acryl resin, epoxy resin, phenolic resin, polyamide resin, or polyimide resin, etc.

The first connection contact hole BCNT1 penetrates the first interlayer insulating layer 141 and the second interlayer insulating layer 142 and exposes the gate electrode DT_G of the driving transistor DT. The first connection electrode BE1 is connected to the gate electrode DT_G of the driving transistor DT through the first connection contact hole BCNT1.

The second connection contact hole BCNT2 (see FIGS. 13 and 14) penetrates the gate insulating layer 130, the first interlayer insulating layer 141, and the second interlayer insulating layer 142 and exposes the second electrode D1-1 of the first-first transistor ST1-1. The first connection electrode BE1 mis connected to the second electrode D1-1 of the first-first transistor ST1-1 through the second connection contact hole BCNT2.

A first contact hole CNT1 penetrates the first organic layer 160 and exposes the sensing connection line FCL. The sensing anode electrode SAND is connected to the sensing connection line FCL through the first contact hole CNT1.

The third contact hole CNT3 penetrates the gate insulating layer 130, the first interlayer insulating layer 141, and the second interlayer insulating layer 142 and exposes the second electrode D2 of the second transistor ST2. Each of the data lines Dj, Dj+1, and Dj+2 is connected to the second electrode D2 of the second transistor ST2 through the third contact hole CNT3.

The fourth contact hole CNT4 penetrates the gate insulating layer 130, the first interlayer insulating layer 141, and the second interlayer insulating layer 142 and exposes the second electrode D1 of the first transistor ST1 and the second electrode D4 of the fourth transistor ST4. The second connection electrode VIE is connected to the second electrode D1-2 of the first-second transistor ST1-2 and the second electrode D4 of the fourth transistor ST4 through the fourth contact hole CNT4.

The fifth contact hole CNT5 penetrates the second interlayer insulating layer 142 and exposes the third driving voltage line VIL. The second connection electrode VIE is connected to the third driving voltage line VIL through the fifth contact hole CNT5.

The sixth contact hole CNT6 penetrates the gate insulating layer 130, the first interlayer insulating layer 141, and the second interlayer insulating layer 142 and exposes the second electrode D6 of the sixth transistor ST6. The first anode connection electrode ANDE1 is connected to the second electrode D6 of the sixth transistor ST6 through the sixth contact hole CNT6.

The seventh contact hole CNT7 (see FIGS. 13 and 14) penetrates the gate insulating layer 130, the first interlayer insulating layer 141, and the second interlayer insulating layer 142 and exposes the first electrode S5 of the fifth transistor ST5. The first sub-driving voltage line SVDL1 is connected to the first electrode S5 of the fifth transistor ST5 through the seventh contact hole CNT7.

The eighth contact hole CNT8 (see FIGS. 13 and 14) penetrates the second interlayer insulating layer 142 and exposes the second sub-driving voltage line SVDL2. The first sub-driving voltage line SVDL1 is connected to the second sub-driving voltage line SVDL2 through the eighth contact hole CNT8.

A first anode contact hole AND_CNT1 penetrates the first organic layer 160 and exposes the first anode connection electrode ANDE1. The second anode connection electrode ANDE2 is connected to the first anode connection electrode ANDE1 through the first anode contact hole AND_CNT1.

The second anode contact hole AND_CNT2 penetrates the second organic layer 161 and exposes the second anode connection electrode ANDE2.

The light emitting element layer EML is formed on the thin film transistor layer TFTL. The light emitting element layer EML includes the light emitting elements LEL, the light receiving elements PD, and the bank 180. The light emitting elements LEL, the light receiving elements PD, and the bank 180 are formed on the second organic layer 161.

Each of the light emitting elements LEL includes the anode electrode AND1/AND2/AND3/AND4, the organic light emitting layer 172, and a cathode electrode 173. Each of the light receiving elements PD includes the sensing anode electrode SAND, a PIN semiconductor layer PIN, and the cathode electrode 173.

The light emitting element LEL of the first light emitting portion ELU1 includes the first anode electrode AND1, and the light emitting element LEL of the second light emitting portion ELU2 includes the second anode electrode AND2. The light emitting element LEL of the third light emitting portion ELU3 includes the third anode electrode AND3, and the light emitting element LEL of the fourth light emitting portion ELU4 includes the fourth anode electrode AND4.

The anode electrode AND1/AND2/AND3/AND4 and the sensing anode electrode SAND are formed on the second organic layer 161. The anode electrode AND1/AND2/AND3/AND4 is connected to the second anode connection electrode ANDE2 through the second anode contact hole AND_CNT2. The sensing anode electrode SAND is connected to the sensing connection line FCL through the first contact hole CNT1. The anode electrode AND1/AND2/AND3/AND4 and the sensing anode electrode SAND are formed of a highly reflective metal such as a stacked structure (Ti/Al/Ti) of aluminum and titanium, a stacked structure (ITO/Al/ITO) of aluminum and ITO, an APC alloy, or a stacked structure (ITO/APC/ITO) of an APC alloy and ITO. The APC alloy is an alloy of silver (Ag), palladium (Pd) and copper (Cu).

The bank 180 is formed on the second organic layer 161 to partition the anode electrode AND1/AND2/AND3/AND4 and the sensing anode electrode SAND to define emission areas of the display pixels SPX1, SPX2, SPX3, and SPX4. The bank 180 covers the edges of the anode electrode AND1/AND2/AND3/AND4 and the sensing anode electrode SAND. The bank 180 is formed of an organic layer such as acryl resin, epoxy resin, phenolic resin, polyamide resin, or polyimide resin, etc.

In the emission areas of the display pixels SPX1, SPX2, SPX3, and SPX4, the anode electrode AND1/AND2/AND3/AND4, the organic light emitting layer 172, and the cathode electrode 173 are sequentially stacked so that holes from the anode electrode AND1/AND2/AND3/AND4 and electrons from the cathode electrode 173 are recombined in the organic light emitting layer 172 to emit light.

The organic light emitting layer 172 is formed on the anode electrode AND1/AND2/AND3/AND4 and the bank 180. The organic light emitting layer 172 includes an organic material and emits light of a predetermined color. For example, the organic light emitting layer 172 includes a hole transporting layer, an organic material layer, and an electron transporting layer. The organic light emitting layer 172 of the first light emitting portion ELU1 emits the first light, and the organic light emitting layer 172 of the second light emitting portion ELU2 emits the second light. The organic light emitting layer 172 of the third light emitting portion ELU3 emits the third light, and the organic light emitting layer 172 of the fourth light emitting portion ELU4 emits the second light.

Alternatively, in an embodiment, when the organic light emitting layer 172 is commonly formed in the emission areas of the display pixels SPX1, SPX2, SPX3, and SPX4, the first light emitting portion ELU1 overlaps a first color filter through which the first light is transmitted, and the second light emitting portion ELU2 overlaps a second color filter through which the second light is transmitted. In addition, the third light emitting portion ELU3 overlaps a third color filter through which the third light is transmitted, and the fourth light emitting portion ELU4 overlaps the second color filter through which the second light is transmitted.

The sensing anode electrode SAND, the PIN semiconductor layer PIN, and the cathode electrode 173 are sequentially stacked in the light sensing portion PDU. The PIN semiconductor layer includes a P-type semiconductor layer connected to the sensing anode electrode SAND, an N-type semiconductor layer connected to the cathode electrode 173, and an I-type semiconductor layer disposed between the P-type semiconductor layer and the N-type semiconductor layer. The I-type semiconductor layer is depleted by the P-type semiconductor layer and the N-type semiconductor layer to generate an electric field therein, and holes and electrons are generated by light drift by the electric field.

Due to this, the holes diffuse to the anode electrode through the P-type semiconductor layer and the electrons diffuse to the cathode electrode through the N-type semiconductor layer.

The cathode electrode 173 is disposed on the organic light emitting layer 172, the PIN semiconductor layer PIN, and the bank 180. The cathode electrode 173 covers the organic light emitting layer 172 and the PIN semiconductor layer PIN. The cathode electrode 173 is commonly formed in the emission areas and the light sensing portion PDU. A capping layer is formed on the cathode electrode 173.

In a top emission structure, the cathode electrode 173 is formed of a transparent conductive material (TCO) such as ITO or IZO capable of transmitting light or a semi-transmissive conductive material such as magnesium (Mg), silver (Ag), or an alloy of magnesium (Mg) and silver (Ag). When the cathode electrode 173 is formed of a semi-transmissive conductive material, the light emission efficiency can be increased due to a micro-cavity effect.

The encapsulation layer TFE is formed on the light emitting element layer EML. The encapsulation layer TFE includes at least one inorganic layer that prevents oxygen or moisture from permeating into the light emitting element layer EML. In addition, the encapsulation layer TFE includes at least one organic layer that protects the light emitting element layer EML from foreign substances such as dust.

As shown in FIGS. 13 to 15B, the light receiving elements PD of the light sensing portions PDU are formed in the light emitting element layer EML together with the light emitting elements LEL of the emission areas, and are connected in one-to-one correspondence with the fingerprint drivers FDU disposed in the non-display area NDA using the sensing connection lines FCL disposed on the first organic layer 160. Therefore, there is no need to form the fingerprint drivers FDU in the thin film transistor layer TFTL in which the first to fourth pixel drivers DDU1 to DDU4 are formed. Accordingly, to provide a space in which the fingerprint drivers FDUs are disposed, there is no need to reduce a space in which the first to fourth pixel drivers DDU1 to DDU4 are disposed.

Figure 16:
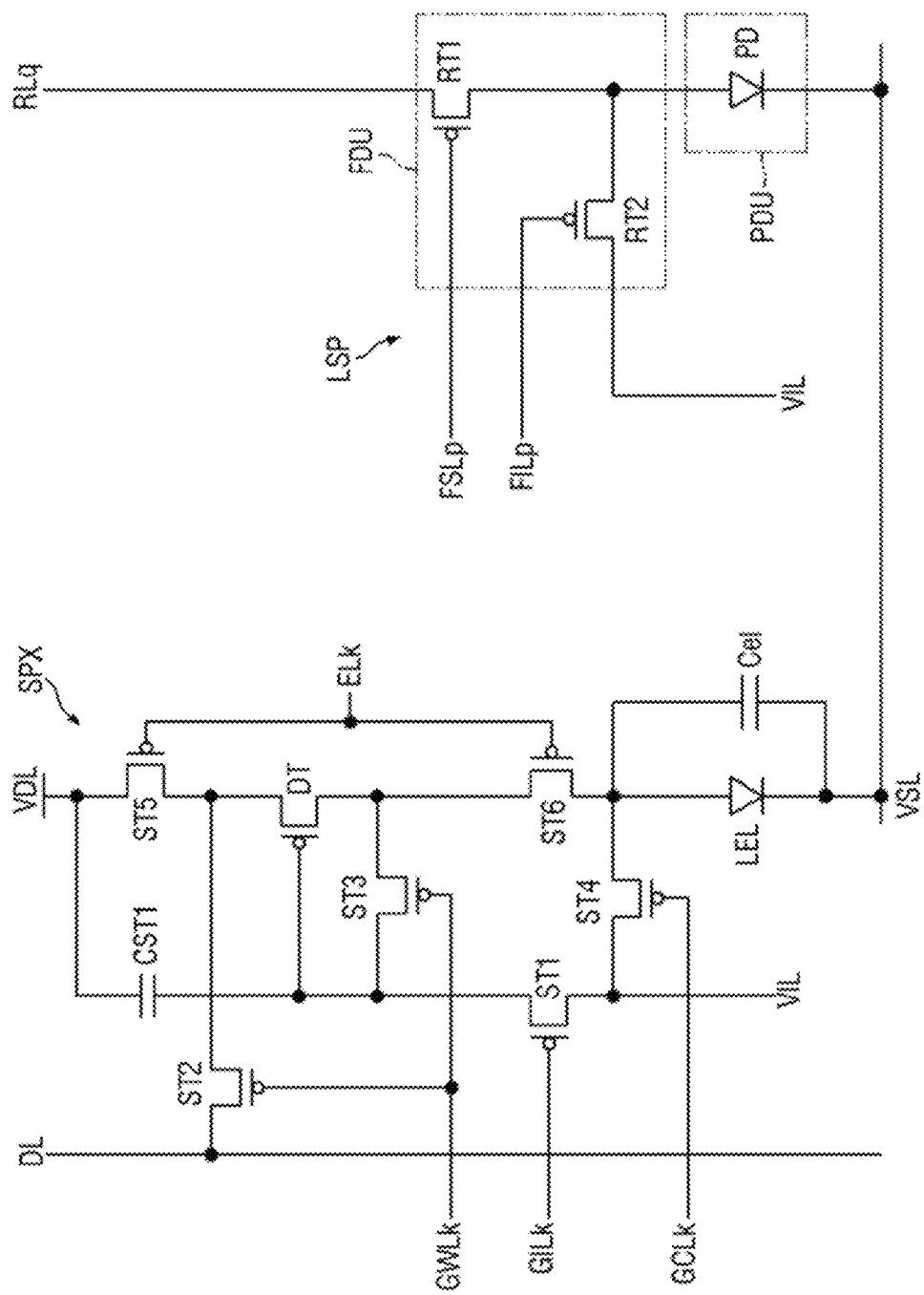
FIG. 16 is a circuit diagram of a light sensing pixel and a first display pixel of a display pixel according to an embodiment.

FIG. 16 is a circuit diagram of a light sensing pixel and a first display pixel of a display pixel according to an embodiment.

An embodiment of FIG. 16 differs from an embodiment of FIG. 6 in that the fingerprint driver FDU of the light sensing pixel LSP further includes a second sensing transistor RT2. In FIG. 16, redundant description of parts already described in the embodiment of FIG. 6 will be omitted.

Referring to FIG. 16, in an embodiment, the second sensing transistor RT2 is turned on by a fingerprint initialization signal of a pth fingerprint initialization line FILp to connect the sensing anode electrode of the light receiving element PD to the third driving voltage line VIL. Accordingly, the third driving voltage of the third driving voltage line VIL is transmitted to the sensing anode electrode of the light receiving element PD. The gate electrode of the second sensing transistor RT2 is connected to the $p^{th}$ fingerprint initialization line FILp, the first electrode thereof is connected to the sensing anode electrode of the light receiving element PD, and the second electrode thereof is connected to the third driving voltage line VIL.

Figure 17:
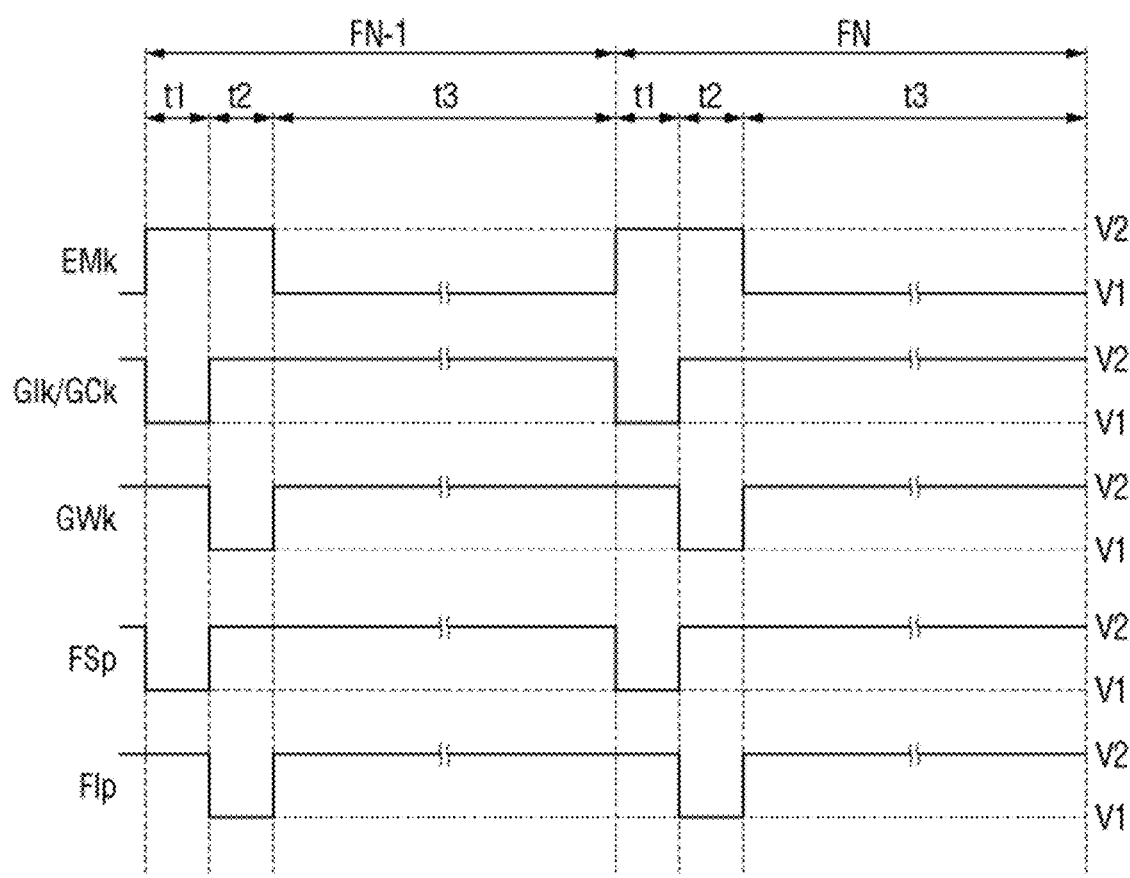
FIG. 17 is a waveform diagram of scan signals input into a light sensing pixel and a first display pixel of a display pixel according to an embodiment.

FIG. 17 is a waveform diagram of scan signals input into a light sensing pixel and a first display pixel of a display pixel according to an embodiment.

An embodiment of FIG. 17 differs from an embodiment of FIG. 9 in that there is an additional $p^{th}$ fingerprint initialization signal FIp transmitted to the $p^{th}$ fingerprint initialization line FILp. In FIG. 17, redundant description of parts already described in an embodiment of FIG. 9 will be omitted.

Referring to FIG. 17, in an embodiment, the $p^{th}$ fingerprint initialization signal FIp has the first level voltage V1 during the second period t2 and the second level voltage V2 during the first period t1 and the third period t3. The $p^{th}$ fingerprint initialization signal FIp is substantially the same as the $k^{th}$ display write signal GWk or the $k^{th}$ display control signal GCk.

Hereinafter, the operation of the light sensing pixel LSP during the first period t1, the second period t2, and the third period t3 will be described with reference to FIGS. 16 and 17.

Since the operation during the first period t1 is substantially the same as that described with reference to FIGS. 6 and 9, it will be omitted.

During the second period t2, the first level voltage V1 pth fingerprint initialization signal FIp is transmitted through the $p^{th}$ fingerprint initialization line FILp. The second sensing transistor RT2 is turned on by the first level voltage V1 $p^{th}$ fingerprint initialization signal FIp. Due to the turn-on of the second sensing transistor RT2, the sensing anode electrode of the light receiving element PD is connected to the third driving voltage line VIL. Therefore, the sensing anode electrode of the light receiving element PD is initialized to the third driving voltage of the third driving voltage line VIL.

During the third period t3, the second level voltage V2 $p^{th}$ fingerprint scan signal FSp is transmitted through the $p^{th}$ fingerprint scan line FSLp, and the second level voltage V2 $p^{th}$ fingerprint initialization signal FIp is transmitted through the $p^{th}$ fingerprint initialization line FILp. Accordingly, the first sensing transistor RT1 and the second sensing transistor RT2 are turned off during the third period t3. Accordingly, the voltage of the sensing anode electrode of the light receiving element PD increases according to light incident during the third period t3. For example, as the amount of light incident on the light receiving element PD increases, the voltage of the sensing anode electrode of the light receiving element PD increases.

As shown in FIGS. 16 and 17, after exposing the light receiving element PD to light during the third period t3 of the $(N-1)^{th}$ frame period FN-1, the voltage of the sensing anode electrode of the light receiving element PD is detected through the $q^{th}$ sensing line RLq during the first period t1 of the $N^{th}$ frame period FN. In addition, the voltage of the sensing anode electrode of the light receiving element PD is initialized to the third driving voltage of the third driving voltage line VIL during the second period t2 of the $N^{th}$ frame period FN. That is, before exposing the light receiving element PD to light, the voltage of the sensing anode electrode of the light receiving element PD is initialized to the third driving voltage. Therefore, the amount of the voltage change of the sensing anode electrode of the light receiving element PD due to the light incident during the third period t3 can be more accurately detected.

Figure 18:
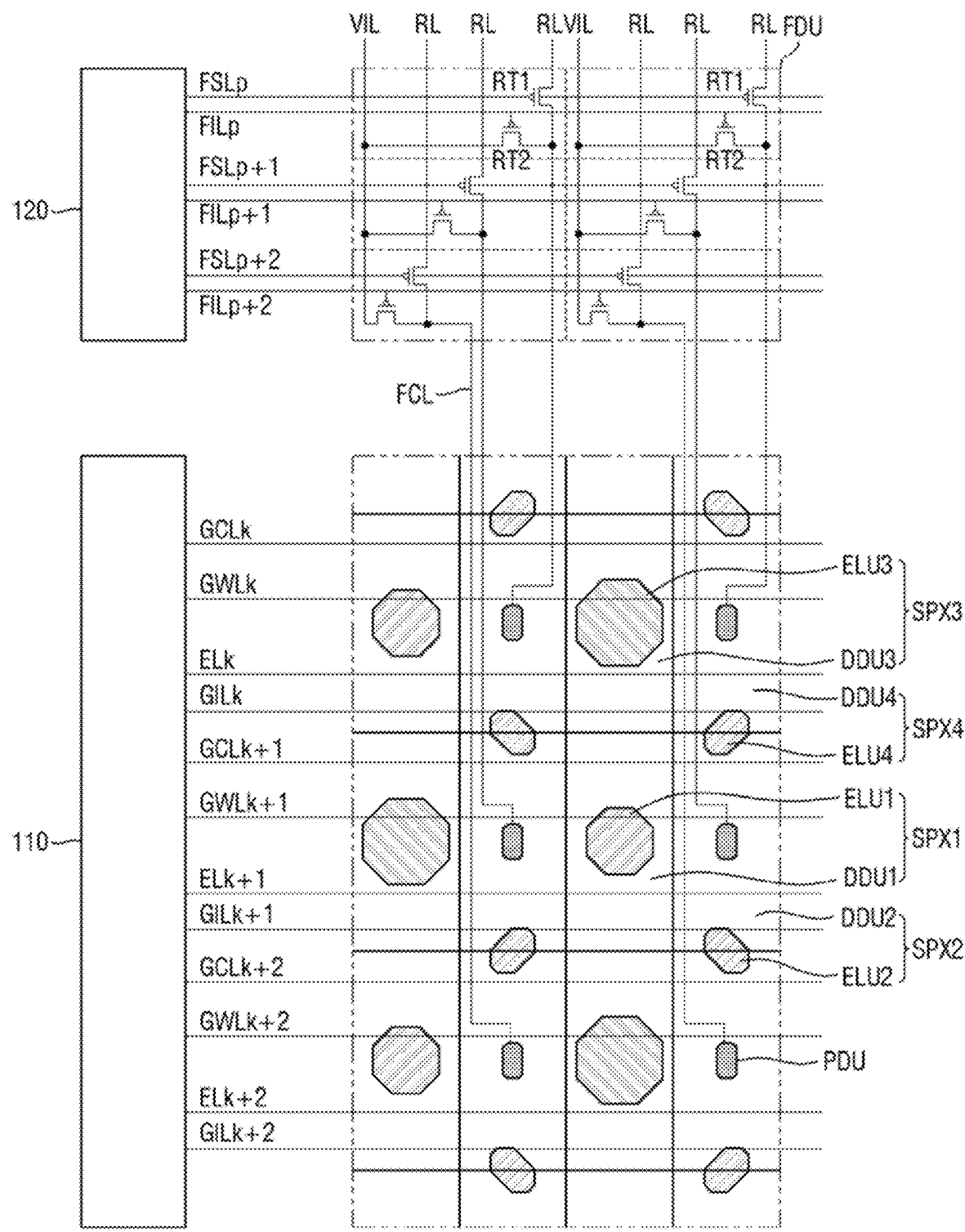
FIG. 18 illustrates light sensing portions of a fingerprint sensing area and fingerprint drivers according to an embodiment.

FIG. 18 illustrates light sensing portions of a fingerprint sensing area and fingerprint drivers of a fingerprint driving area according to an embodiment.

An embodiment of FIG. 18 differs from an embodiment of FIG. 12 in that the fingerprint driver FDU further includes the second sensing transistor RT2 controlled by the $p^{th}$ fingerprint initialization signal FIp of the $p^{th}$ fingerprint initialization line FILp. In FIG. 18, redundant description of parts already described for an embodiment of FIG. 12 will be omitted.

Referring to FIG. 18, in an embodiment, the fingerprint driver FDU connected to the $p^{th}$ fingerprint scan line FSLp and the $p^{th}$ fingerprint initialization line FILp is connected to the light sensing portion PDU that overlaps the second pixel driver DDU2 or the fourth pixel driver DDU4 connected to the $k^{th}$ display write line GWLk, the $k^{th}$ display initialization line GILk, the $k^{th}$ display control line GCLk, and the $k^{th}$ emission line ELk. In addition, the fingerprint driver FDU connected to the $(p+1)^{th}$ fingerprint scan line FSLp+1 and the $(p+1)^{th}$ fingerprint initialization line FILp+1 is connected to the light sensing portion PDU that overlaps the second pixel driver DDU2 or the fourth pixel driver DDU4 connected to the $(k+1)^{th}$ display write line GWLk+1, the $(k+1)^{th}$ display initialization line GILk+1, the $(k+1)^{th}$ display control line GCLk+1, and the (k+1)th emission line Elk+1.

Accordingly, the $k^{th}$ display write signal transmitted through the $k^{th}$ display write line GWLk and the $p^{th}$ fingerprint initialization signal transmitted through the $p^{th}$ fingerprint initialization line FILp are substantially the same. In addition, the $(k+1)^{th}$ display write signal transmitted through the $(k+1)^{th}$ display write line GWLk+1 and the $(p+1)^{th}$ fingerprint initialization signal transmitted through the (p+1)$^{th}$ fingerprint initialization line FILp+1 are substantially the same.

In addition, the $k^{th}$ display initialization signal transmitted through the $k^{th}$ display initialization line GILk and the pth fingerprint scan signal transmitted through the pth fingerprint scan line FSLp are substantially the same. In addition, the $(k+1)^{th}$ display initialization signal transmitted through the $(k+1)^{th}$ display initialization line GILk+1 and the $(p+1)^{th}$ fingerprint scan signal applied to the $(p+1)^{th}$ fingerprint scan line FSLp+1 are substantially the same.

As such, the $k^{th}$ display initialization signal transmitted through the $k^{th}$ display initialization line GILk and the pth fingerprint scan signal transmitted through the pth fingerprint scan line FSLp are substantially the same, and the $k^{th}$ display write signal transmitted through the kth display write line GWLk and the $p^{th}$ fingerprint initialization signal transmitted through the pth fingerprint initialization line FILp are substantially the same. The emission period t3 of the first to fourth light emitting portions ELU1 to ELU4 of the sub-pixels SPX1 to SPX4 connected to the $k^{th}$ display initialization line GILk and the $k^{th}$ display write line GWLk is set to be substantially equal to the period t3 during which the light receiving elements PD of the light sensing portions PDU adjacent thereto are exposed to light. For example, a period during which light reflected from the user's fingerprint is incident on the light receiving element PD of the light sensing portion PDU can be optimized with an emission period of the first to fourth light emitting portions ELU1 to ELU4 adjacent thereto.

The light receiving elements PD of the light sensing portions PDU and the second sensing transistors RT2 of the fingerprint drivers FDU are connected in one-to-one correspondence through the sensing connection lines FCL. One end of each of the sensing connection lines FCL is connected to the sensing anode electrode of the light receiving element PD of the light sensing portion PDU, and the other end of each of the sensing connection lines FCL is connected to the second electrode of the second sensing transistor RT2 of the fingerprint driver FDU.

As shown in FIG. 18, the light receiving elements PD of the light sensing portions PDU are formed in the display area DA together with the light emitting elements LEL of the emission areas, and are connected in one-to-one correspondence to the fingerprint drivers FDU disposed in the non-display area NDA using the sensing connection lines FCL. Accordingly, to provide a space in which the fingerprint drivers FDUs are disposed, there is no need to reduce a space in which the first to fourth pixel drivers DDU1 to DDU4 are disposed.

Figure 19:
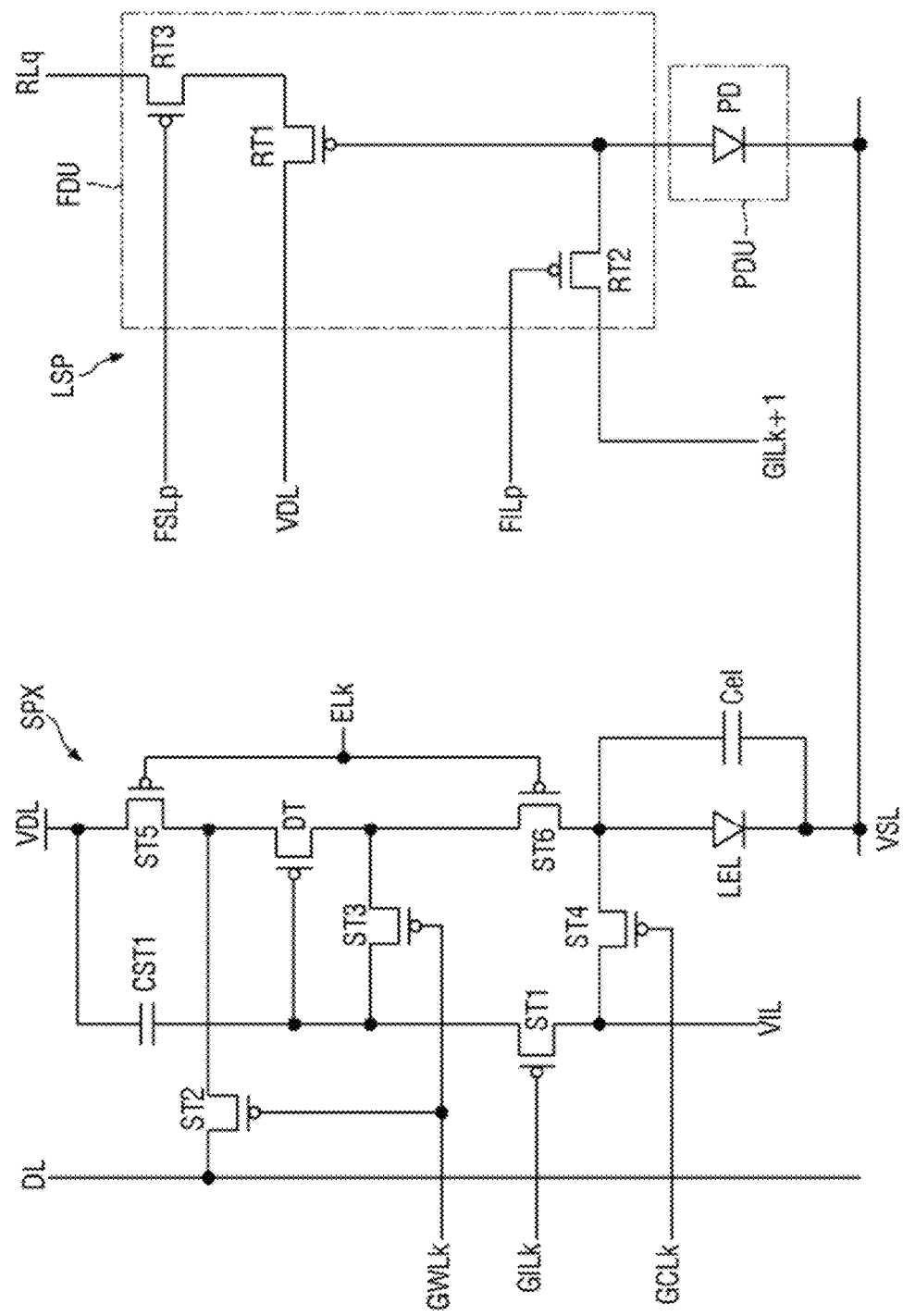
FIG. 19 is a circuit diagram of a light sensing pixel and a first display pixel of a display pixel according to an embodiment.

FIG. 19 is a circuit diagram of a light sensing pixel and a first display pixel of a display pixel according to an embodiment.

An embodiment of FIG. 19 differs from an embodiment of FIG. 6 in that the fingerprint driver FDU of the light sensing pixel LSP further includes first to third sensing transistors RT1, RT2, and RT3. In FIG. 19, redundant description of parts already described in the embodiment of FIG. 6 will be omitted.

Referring to FIG. 19, in an embodiment, the first sensing transistor RT1 controls a sensing current flowing from the first driving voltage line VDL to the $q^{th}$ sensing line RLq according to the voltage of the sensing anode electrode of the light receiving element PD. The gate electrode of the first sensing transistor RT1 is connected to the sensing anode electrode of the light receiving element PD through the sensing connection line FCL, the first electrode thereof is connected to the first driving voltage line VDL, and the second electrode thereof is connected to the first electrode of the third sensing transistor RT3.

The second sensing transistor RT2 is turned on by the fingerprint initialization signal of the $p^{th}$ fingerprint initialization line FILp to connect the sensing anode electrode of the light receiving element PD to the $(k+1)^{th}$ display initialization line GILk+1. Accordingly, a (k+1)th display initialization signal GIk+1 of the $(k+1)^{th}$ display initialization line GILk+1 is transmitted to the sensing anode electrode of the light receiving element PD. The $(k+1)^{th}$ display initialization signal GIk+1 of the $(k+1)^{th}$ display initialization line GILk+1 is substantially the same as the $k^{th}$ display write signal GWk of the $k^{th}$ display write line GWLk. The gate electrode of the second sensing transistor RT2 is connected to the $p^{th}$ fingerprint initialization line FILp, the first electrode thereof is connected to the sensing anode electrode of the light receiving element PD, and the second electrode thereof may be connected to the $(k+1)^{th}$ display initialization line GILk+1.

The third sensing transistor RT3 is turned on by the fingerprint scan signal of the $p^{th}$ fingerprint scan line FSLp to connect the second electrode of the first sensing transistor RT1 to the $q^{th}$ sensing line RLq. Accordingly, the sensing current according to the voltage of the sensing anode electrode of the light receiving element PD flows through the $q^{th}$ sensing line RLq, and thus a sensing voltage is transmitted through the $q^{th}$ sensing line RLq. That is, the magnitude of the sensing voltage in the $q^{th}$ sensing line RLq is based on the voltage of the sensing anode electrode of the light receiving element PD. The gate electrode of the third sensing transistor RT3 is connected to the $p^{th}$ fingerprint scan line FSLp, the first electrode thereof is connected to the second electrode of the first sensing transistor RT1, and the second electrode thereof is connected to the $q^{th}$ sensing line RLq.

Hereinafter, the operation of the light sensing pixel LSP during the first period t1, the second period t2, and the third period t3 will be described with reference to FIGS. 17 and 19.

During the first period t1, the first level voltage V1 $p^{th}$ fingerprint scan signal FSp is transmitted through the pth fingerprint scan line FSLp. The third sensing transistor RT3 is turned on by the first level voltage V1 $p^{th}$ fingerprint scan signal FSp. Due to the turn-on of the third sensing transistor RT3, the sensing current of the first sensing transistor RT1 flows to the qth sensing line RLq according to the sensing anode electrode of the light receiving element PD. For example, the magnitude of the sensing voltage in the $q^{th}$ sensing line RLq is based on the voltage of the sensing anode electrode of the light receiving element PD. As the voltage of the sensing anode electrode of the light receiving element PD increases, the sensing voltage of the $q^{th}$ sensing line RLq increases. Therefore, the fingerprint driving circuit 400 calculates the voltage of the sensing anode electrode of the light receiving element PD by detecting the sensing voltage through the $q^{th}$ sensing line RLq.

During the second period t2, the first level voltage V1 pth fingerprint initialization signal FIp is transmitted through the $p^{th}$ fingerprint initialization line FILp. The second sensing transistor RT2 is turned on by the first level voltage V1 pth fingerprint initialization signal FIp. Due to the turn-on of the second sensing transistor RT2, the sensing anode electrode of the light receiving element PD is connected to the third driving voltage line VIL. Therefore, the sensing anode electrode of the light receiving element PD is initialized to the third driving voltage of the third driving voltage line VIL.

During the third period t3, the second level voltage V2 $p^{th}$ fingerprint scan signal FSp is transmitted through the $p^{th}$ fingerprint scan line FSLp, and the second level voltage V2 $p^{th}$ fingerprint initialization signal FIp is transmitted through the $p^{th}$ fingerprint initialization line FILp. Accordingly, the second sensing transistor RT2 and the third sensing transistor RT3 are turned off during the third period t3. Accordingly, the voltage of the sensing anode electrode of the light receiving element PD increases according to light incident during the third period t3. For example, as the amount of light incident on the light receiving element PD increases, the voltage of the sensing anode electrode of the light receiving element PD increases.

As shown in FIGS. 17 and 19, after exposing the light receiving element PD to light during the third period t3 of the $(N-1)^{th}$ frame period FN-1, the sensing current of the first sensing transistor RT1 flows to the $q^{th}$ sensing line RLq according to the sensing anode electrode of the light receiving element PD during the first period t1 of the $N^{th}$ frame period FN, thereby detecting the sensing voltage of the $q^{th}$ sensing line RLq. In addition, the voltage of the sensing anode electrode of the light receiving element PD is initialized to the third driving voltage of the third driving voltage line VIL during the second period t2 of the $N^{th}$ frame period FN. For example, before exposing the light receiving element PD to light, the voltage of the sensing anode electrode of the light receiving element PD is initialized to the third driving voltage.

Figure 20:
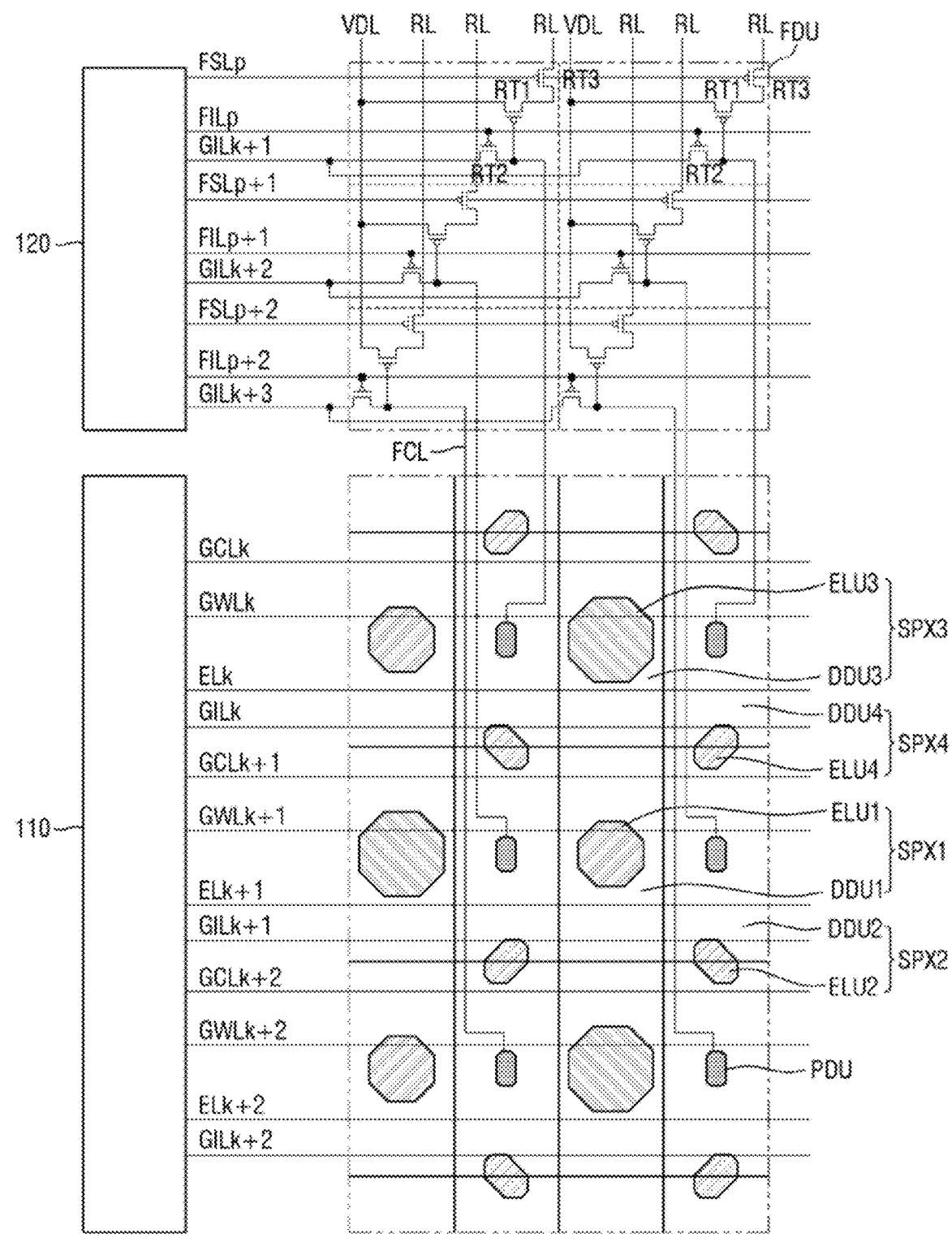
FIG. 20 illustrates light sensing portions of a fingerprint sensing area and fingerprint drivers according to an embodiment.

FIG. 20 illustrates light sensing portions of a fingerprint sensing area and fingerprint drivers of a fingerprint driving area according to an embodiment.

An embodiment of FIG. 20 differs from an embodiment of FIG. 18 only in that the fingerprint driver FDU includes the first to third sensing transistors RT1, RT2, and RT3.

Figure 21:
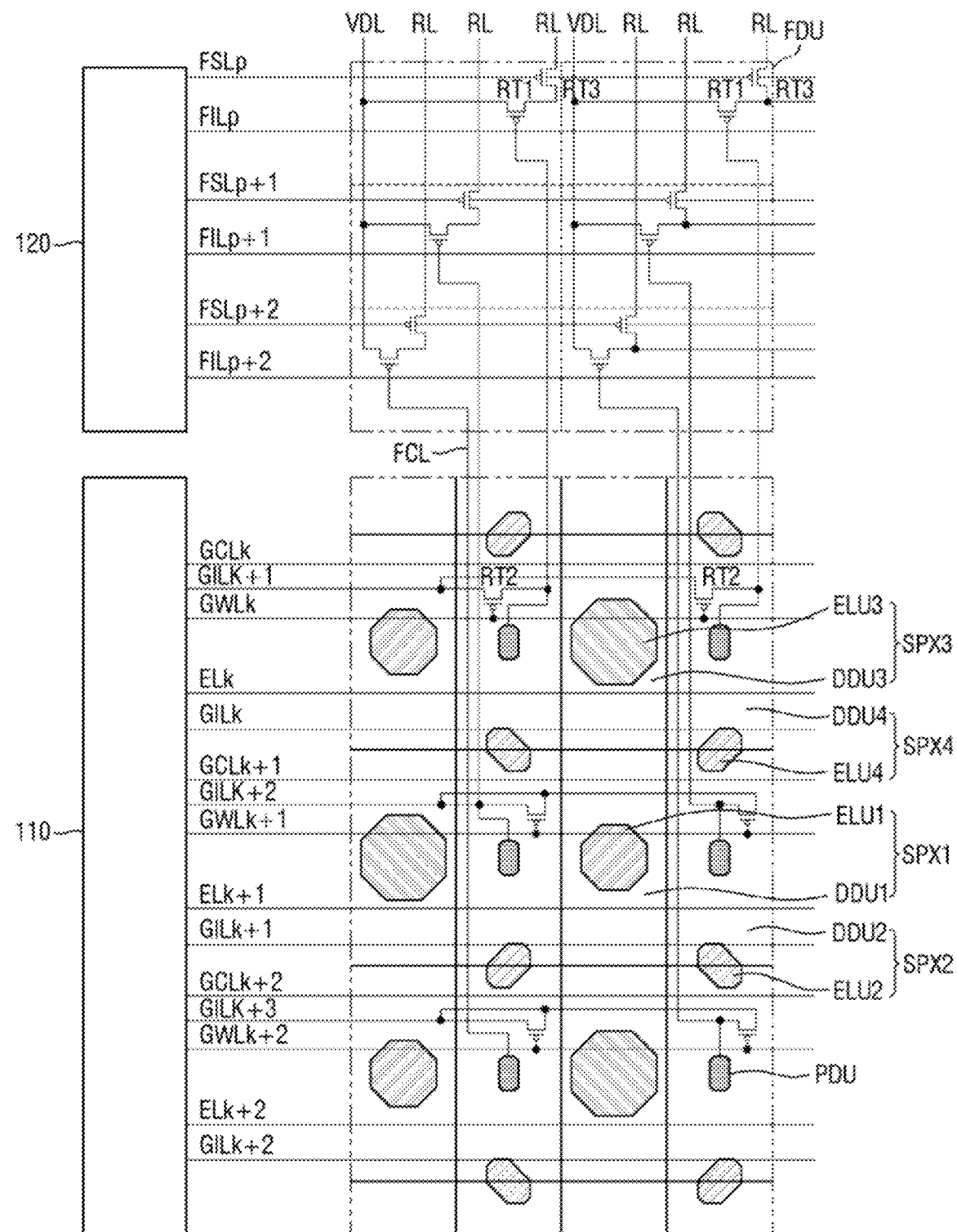
FIG. 21 illustrates light sensing portions of a fingerprint sensing area and fingerprint drivers according to an embodiment.

FIG. 21 illustrates light sensing portions of a fingerprint sensing area and fingerprint drivers of a fingerprint driving area according to an embodiment.

An embodiment of FIG. 21 differs from an embodiment of FIG. 20 in that the second sensing transistor RT2 of the fingerprint driver FDU is disposed in the fingerprint sensing area FSA together with the light sensing portion PDU that includes the light receiving element PD.

Referring to FIG. 21, in an embodiment, when the first to fourth pixel drivers DDU1 to DDU4 are reduced in the fingerprint sensing area FSA, an area is provided where the second sensing transistor RT2 is disposed. The second sensing transistor RT2 is formed similarly to the driving transistor DT or the first to sixth transistors ST1 to ST6 in the thin film transistor layer TFTL.

Although FIG. 21 shows that the second sensing transistor RT2 is disposed in the fingerprint sensing area FSA, embodiments of the present disclosure are not necessarily limited thereto. For example, in an embodiment, the first sensing transistor RT1 of the fingerprint driver FDU is disposed in the fingerprint sensing area FSA. Alternatively, in an embodiment, the first sensing transistor RT1 and the second sensing transistor RT2 of the fingerprint driver FDU are disposed in the fingerprint sensing area FSA. Alternatively, in an embodiment, the first sensing transistor RT1 and the third sensing transistor RT3 of the fingerprint driver FDU are disposed in the fingerprint sensing area FSA.

Figure 22:
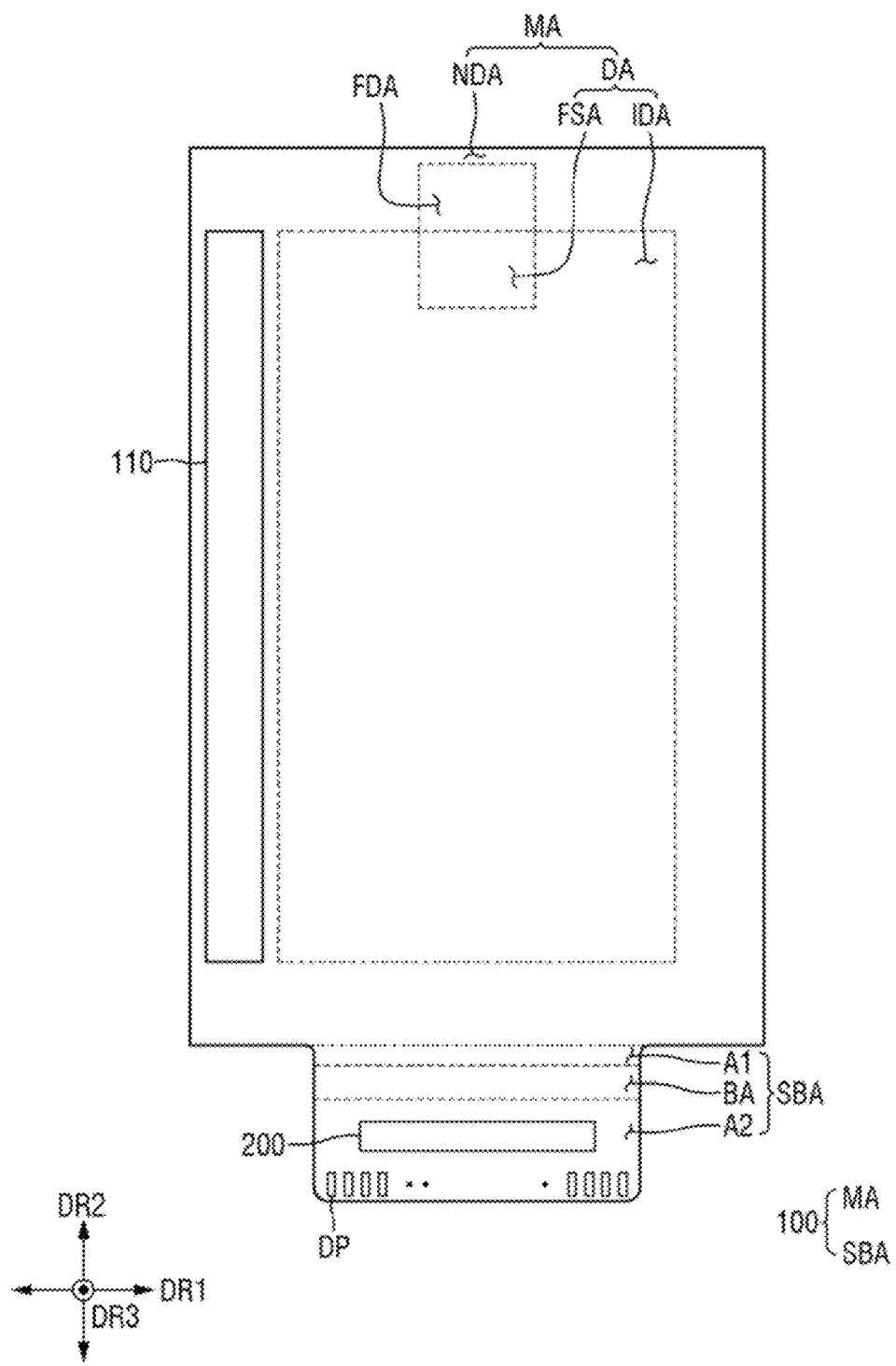
FIG. 22 is a layout diagram of a display panel and a display driving circuit according to an embodiment.
Figure 23:
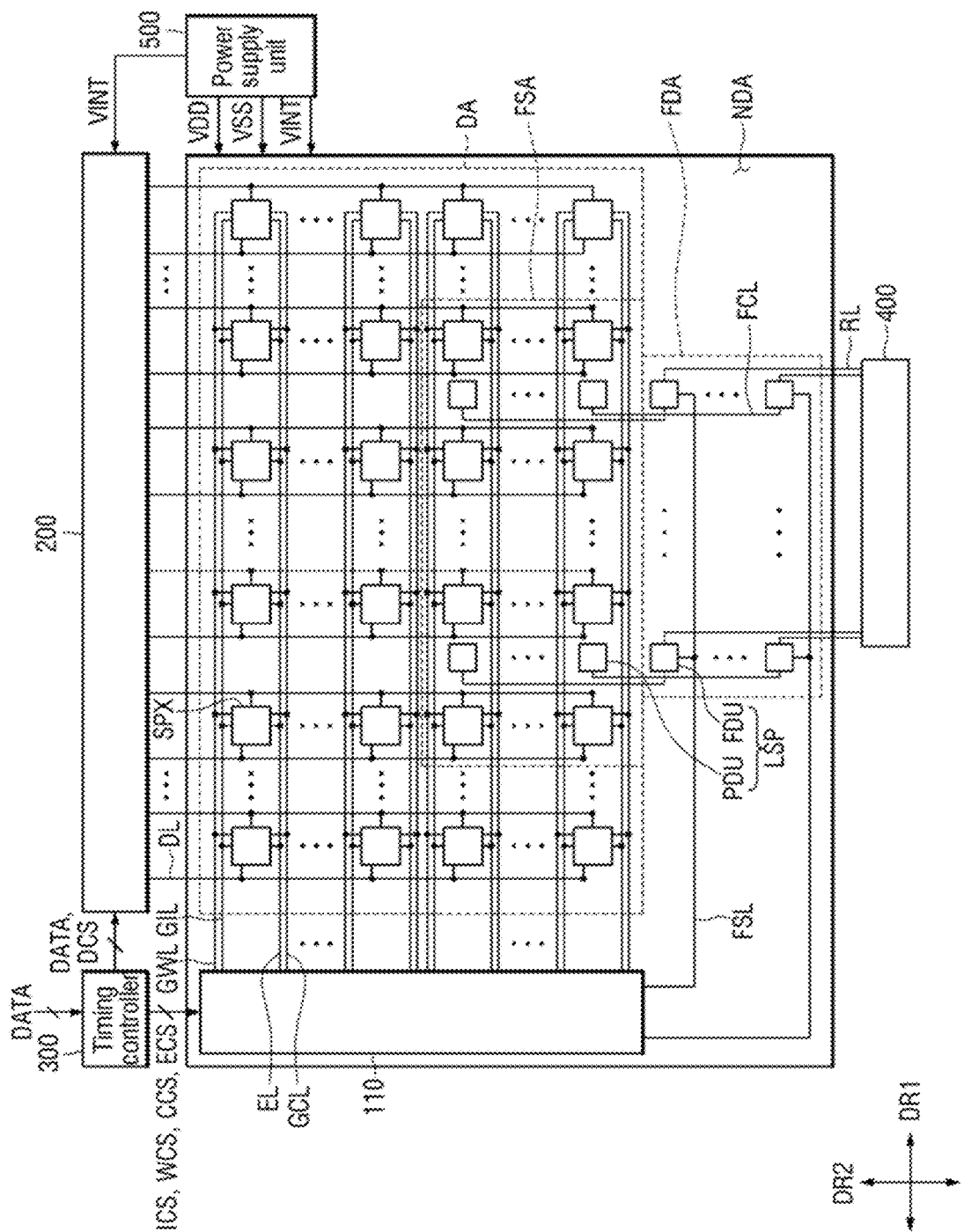
FIG. 23 is a block diagram of a display device according to an embodiment.
Figure 24:
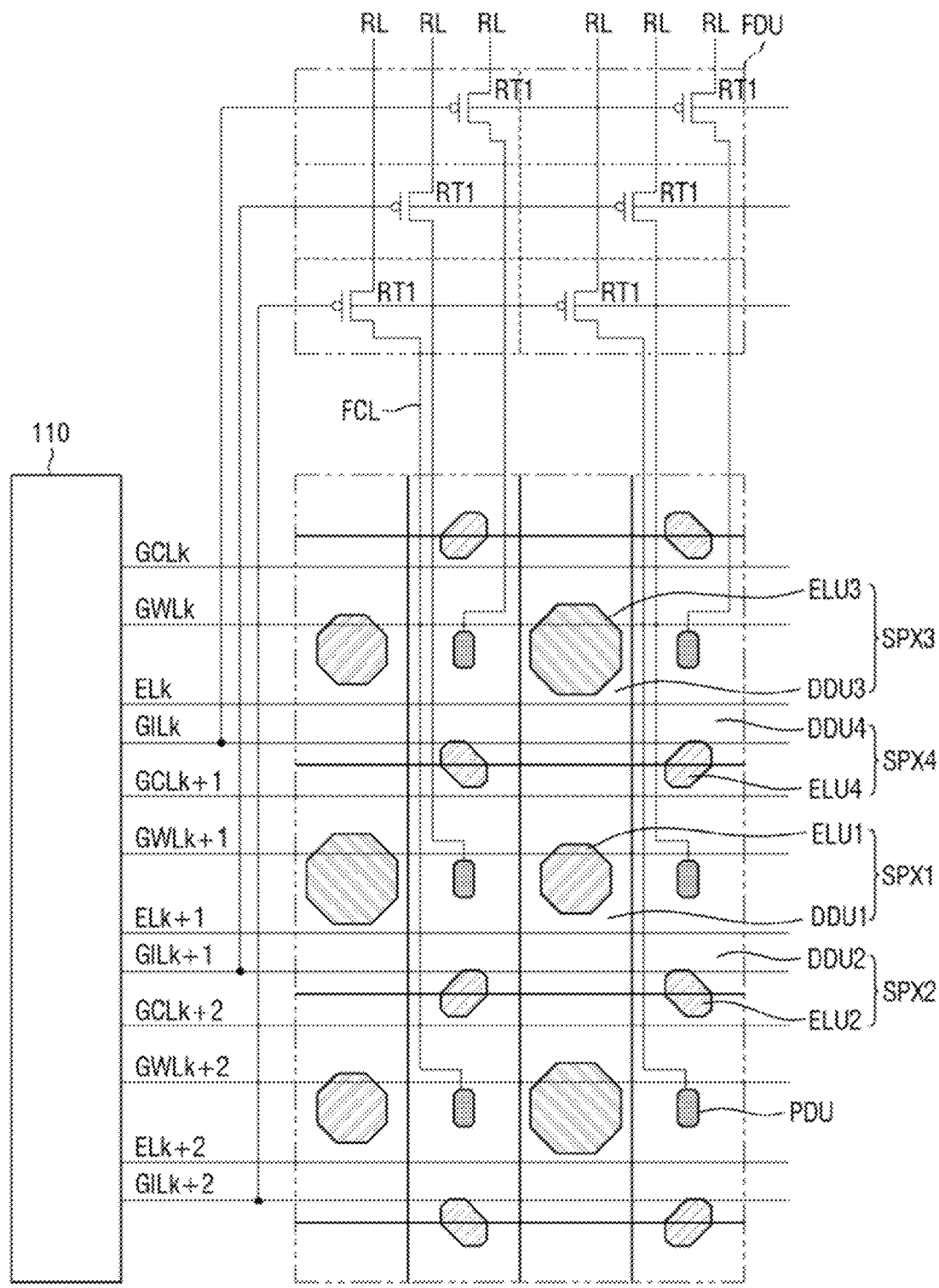
FIG. 24 illustrates light sensing portions of a fingerprint sensing area and fingerprint drivers according to an embodiment.

FIG. 22 is a layout diagram of a display panel and a display driving circuit according to an embodiment. FIG. 23 is a block diagram of a display device according to an embodiment. FIG. 24 illustrates light sensing portions of a fingerprint sensing area and fingerprint drivers according to an embodiment.

An embodiment of FIGS. 22, 23 and 24 differs from an embodiment of FIGS. 2 and 5 in that the fingerprint scan driver 120 is omitted and the fingerprint driver FDU of the fingerprint driving area FDA is connected to the display scan driver 110. In FIGS. 22 to 24, redundant description of parts already described for an embodiment of FIGS. 2 and 5 will be omitted.

Specifically, in an embodiment, when the fingerprint driver FDU includes the first sensing transistor RT1 as shown in FIG. 24, the $p^{th}$ fingerprint scan signal of the $p^{th}$ fingerprint scan line FSLp connected to the gate electrode of the first sensing transistor RT1 is substantially the same as the $k^{th}$ display initialization signal of the $k^{th}$ display initialization line GILk. Therefore, as shown in FIG. 24, the fingerprint driver FDU is connected to the $k^{th}$ display initialization line GILk connected to the display scan driver 110, instead of the $p^{th}$ fingerprint scan line FSLp.

Figure 25:
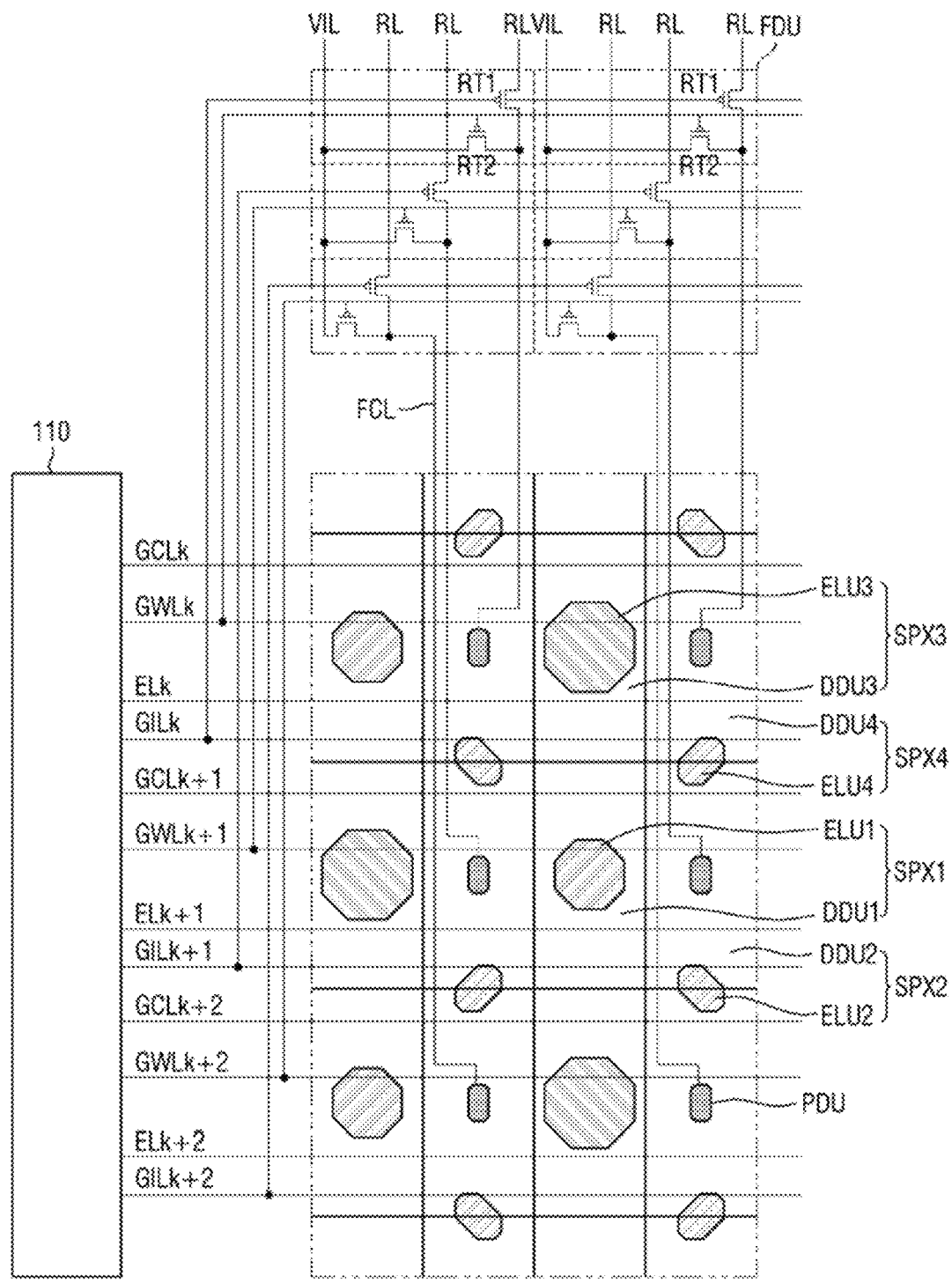
FIG. 25 illustrates light sensing portions of a fingerprint sensing area and fingerprint drivers according to an embodiment.

Alternatively, in an embodiment, as shown in FIG. 25, the fingerprint driver FDU includes the first sensing transistor RT1 and the second sensing transistor RT2. The $p^{th}$ fingerprint scan signal of the $p^{th}$ fingerprint scan line FSLp connected to the gate electrode of the first sensing transistor RT1 is substantially the same as the $k^{th}$ display initialization signal of the $k^{th}$ display initialization line GILk. In addition, the $p^{th}$ fingerprint initialization signal of the $p^{th}$ fingerprint initialization line FSLp connected to the gate electrode of the second sensing transistor RT2 is substantially the same as the $k^{th}$ display write signal of the $k^{th}$ display write line GWLk. Therefore, as shown in FIG. 25, the fingerprint driver FDU is connected to the $k^{th}$ display initialization line GILk connected to the display scan driver 110, instead of the $p^{th}$ fingerprint scan line FSLp and the $p^{th}$ fingerprint initialization line FILp.

Figure 26:
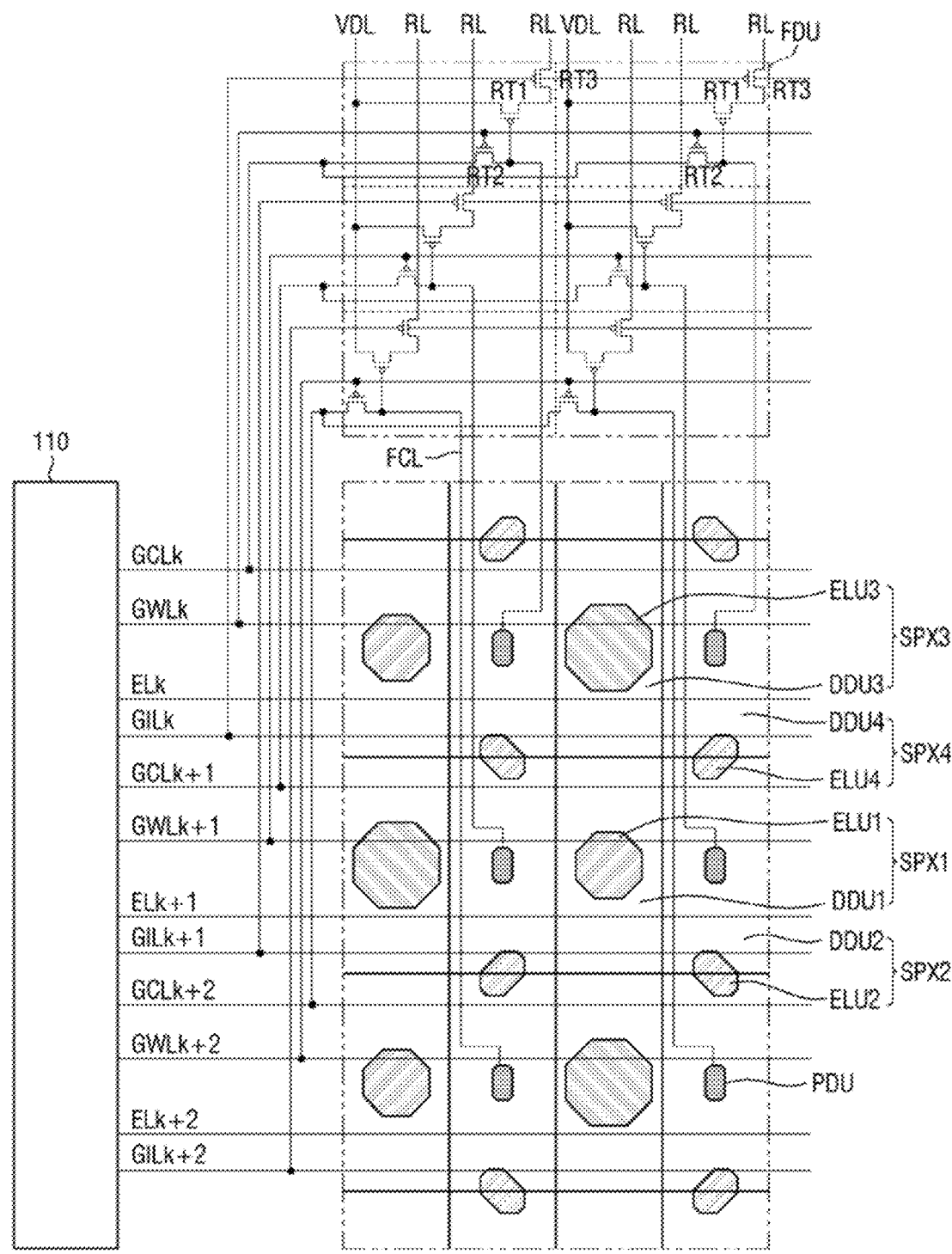
FIG. 26 illustrates light sensing portions of a fingerprint sensing area and fingerprint drivers according to an embodiment.

Alternatively, in an embodiment, as shown in FIG. 26, the fingerprint driver FDU includes the first sensing transistor RT1, the second sensing transistor RT2, and the third sensing transistor RT3. The pth fingerprint initialization signal of the pth fingerprint initialization line FSLp connected to the gate electrode of the second sensing transistor RT2 is substantially the same as the $k^{th}$ display write signal of the $k^{th}$ display write line GWLk. In addition, the pth fingerprint scan signal of the $p^{th}$ fingerprint scan line FSLp connected to the gate electrode of the third sensing transistor RT3 is substantially the same as the $k^{th}$ display initialization signal of the $k^{th}$ display initialization line GILk. Therefore, as shown in FIG. 26, the fingerprint driver FDU is connected to the $k^{th}$ display initialization line GILk connected to the display scan driver 110, instead of the pth fingerprint scan line FSLp and the pth fingerprint initialization line FILp.

Figure 27:
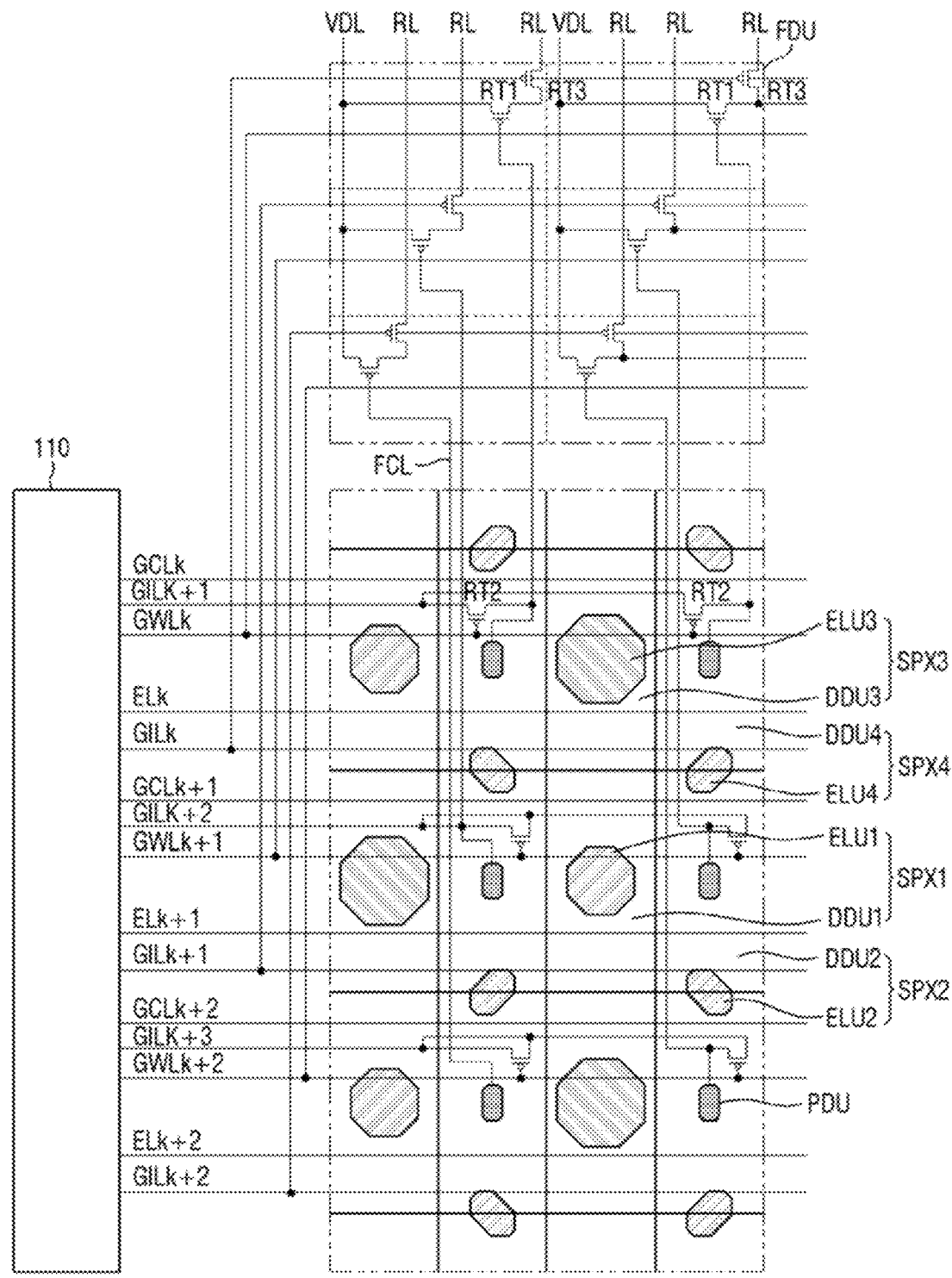
FIG. 27 illustrates light sensing portions of a fingerprint sensing area and fingerprint drivers according to an embodiment.

Alternatively, in an embodiment, as shown in FIG. 27, the second sensing transistor RT2 of the fingerprint driver FDU is disposed in the fingerprint sensing area FSA together with the light sensing portion PDU. When the first to fourth pixel drivers DDU1 to DDU4 are reduced in the fingerprint sensing area FSA, an area is provided in which the second sensing transistor RT2 is disposed. The second sensing transistor RT2 is formed similar to the driving transistor DT or the first to sixth transistors ST1 to ST6 in the thin film transistor layer TFTL.

Although FIG. 27 shows that the second sensing transistor RT2 is disposed in the fingerprint sensing area FSA, embodiments of the present disclosure are not necessarily limited thereto. For example, in an embodiment, the first sensing transistor RT1 of the fingerprint driver FDU is disposed in the fingerprint sensing area FSA. Alternatively, in an embodiment, the first sensing transistor RT1 and the second sensing transistor RT2 of the fingerprint driver FDU are disposed in the fingerprint sensing area FSA. Alternatively, in an embodiment, the first sensing transistor RT1 and the third sensing transistor RT3 of the fingerprint driver FDU are disposed in the fingerprint sensing area FSA.

While embodiments of the present disclosure have been particularly shown and described with reference to the figures, it will be understood by those of ordinary skill in the art that various changes in form and detail may be made therein without departing from the spirit and scope of embodiments of the present disclosure as defined by the following claims. Embodiments of the present disclosure described herein should be considered in a descriptive sense only and not for purposes of limitation.

What is claimed is:

1. A display device, comprising:
    a substrate of a display panel that includes a display area that displays an image and a non-display area disposed around the display area;
    display pixels that each include a light emitting element disposed in the display area and a pixel driver connected to the light emitting element;
    light sensing pixels that each include a light receiving element and a fingerprint driver connected to the light receiving element, wherein the fingerprint driver includes at least one transistor, the light receiving element is disposed in the display area, and the at least one transistor of the fingerprint driver is disposed in the non-display area;
    a connection line connected to an anode electrode of the light receiving element and to the at least one transistor of the fingerprint driver;
    a fingerprint scan driver disposed in the non-display area and that outputs a fingerprint scan signal to the at least one transistor of the fingerprint driver through a fingerprint scan line; and
    a sensing line disposed in the non-display area and that connects the at least one transistor of the fingerprint driver to a fingerprint detecting circuit that detects a fingerprint based on sensing voltages received through the sensing line,
    wherein the pixel driver further comprises a driving transistor that controls a driving current that flows through the light emitting element according to a data voltage transmitted to a gate electrode and a first transistor that connects the gate electrode of the driving transistor to a driving voltage line through which a driving voltage is transmitted according to a display initialization signal, and wherein the fingerprint driver includes a first sensing transistor that connects the connection line to the sensing line according to the fingerprint scan signal of the fingerprint scan line and a second sensing transistor that connects the connection line to the driving voltage line through which the driving voltage is transmitted according to a fingerprint initialization signal of a fingerprint initialization line.

2. The display device of claim 1, wherein the fingerprint driver is disposed on a first side of the display area.

3. The display device of claim 2, further comprising:
a display scan driver disposed in the non-display area and that outputs scan signals to the pixel driver.

4. The display device of claim 3, wherein the display scan driver is disposed on a second side of the display area.

5. The display device of claim 4, wherein the fingerprint scan driver is disposed at a corner where the first side and the second side of the display area meet.

6. The display device of claim 4, wherein the fingerprint scan driver is disposed at a corner where the first side and the second side of the display area meet and on the first side of the display area.

7. The display device of claim 3, wherein the fingerprint scan driver is disposed on the first side of the display area.

8. The display device of claim 1, wherein the pixel driver further comprises:
a second transistor that connects a source electrode of the driving transistor to a data line according to a display write signal; and
a third transistor that connects an anode electrode of the light emitting element to the driving voltage line according to a display control signal.

9. The display device of claim 8, wherein the fingerprint scan signal is identical to the display initialization signal.

10. The display device of claim 8, wherein the fingerprint scan signal is identical to the display control signal.

11. The display device of claim 8, wherein the first sensing transistor is disposed in the non-display area.

12. The display device of claim 8, wherein the second sensing transistor is disposed in the non-display area.

13. The display device of claim 8, wherein the fingerprint initialization signal is identical to the display write signal.

14. An electronic device, comprising:
a substrate of a display panel that includes a display area that displays an image and a non-display area disposed around the display area;
light sensing pixels that each include a light receiving element and a fingerprint driver connected to the light receiving element, wherein the fingerprint driver includes a plurality of transistors, the light receiving element is disposed in the display area, at least one of the plurality of transistors of the fingerprint driver is disposed in the non-display area, and another one of the plurality of transistors is disposed in the display area; and
a connection line connected to an anode electrode of the light receiving element and to the at least one of the plurality of transistors of the fingerprint driver;
a fingerprint scan driver disposed in the non-display area and that outputs fingerprint scan signals to the at least one of the plurality of transistors of the fingerprint driver through a fingerprint scan line; and
a sensing line disposed in the non-display area and that connects the at least one of the plurality of transistors of the fingerprint driver to a fingerprint detecting circuit that detects a fingerprint based on sensing voltages received through the sensing line,
wherein the fingerprint driver includes:
a first sensing transistor that connects the connection line to the sensing line according to the fingerprint scan signals of the fingerprint scan line; and
a second sensing transistor that connects the connection line to a driving voltage line through which a driving voltage is transmitted according to a fingerprint initialization signal of a fingerprint initialization line, and
wherein the connection line is in direct contact with the anode electrode of the light receiving element and an electrode of the at least one of the plurality of transistors of the fingerprint driver.

* * * * *